(12) United States Patent
Schroeder et al.

(10) Patent No.: US 10,307,313 B2
(45) Date of Patent: *Jun. 4, 2019

(54) EQUIPMENT MOUNTING SYSTEM

(71) Applicant: FERNO-WASHINGTON, INC., Wilmington, OH (US)

(72) Inventors: Timothy Paul Schroeder, Mason, OH (US); James C. West, Midland, OH (US); Robert C. Chinn, Cumming, GA (US); Peter Smolan, Trencin (SK); Michal Vacula, Zvolen (SK); Ladislav Turek, Trencin (SK)

(73) Assignee: FERNO-WASHINGTON, INC., Wilmington, OH (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/326,819

(22) PCT Filed: Aug. 8, 2014

(86) PCT No.: PCT/US2014/050392
§ 371 (c)(1),
(2) Date: Jan. 17, 2017

(87) PCT Pub. No.: WO2016/010568
PCT Pub. Date: Jan. 21, 2016

(65) Prior Publication Data
US 2017/0209318 A1 Jul. 27, 2017

Related U.S. Application Data

(60) Provisional application No. 62/026,515, filed on Jul. 18, 2014.

(51) Int. Cl.
*A47B 97/00* (2006.01)
*A61G 3/00* (2006.01)
(Continued)

(52) U.S. Cl.
CPC .............. *A61G 3/00* (2013.01); *A47B 96/067* (2013.01); *A47F 5/0838* (2013.01);
(Continued)

(58) Field of Classification Search
CPC ....... B60P 7/0815; A61G 3/00; F16M 13/022; F16M 11/041; F16M 11/14
(Continued)

(56) References Cited

U.S. PATENT DOCUMENTS

| 269,985 A | 1/1883 | Joseph |
| 619,174 A | 2/1899 | Harry, II |

(Continued)

FOREIGN PATENT DOCUMENTS

| CH | 432266 A | 3/1967 |
| DE | 2000967 B | 7/1971 |

(Continued)

OTHER PUBLICATIONS

Non-Final Office Action dated Jun. 7, 2017, pertaining to U.S. Appl. No. 15/435,373, filed Feb. 17, 2017.
(Continued)

*Primary Examiner* — Todd M Epps
(74) *Attorney, Agent, or Firm* — Dinsmore & Shohl, LLP

(57) ABSTRACT

An equipment mounting system includes a quick mount track (11) with tapered edges (3611, 3612) couple to a surface or structure. The quick mount track includes a backing plate (15), one or more mounting points positioned such that any forces exerted on a mount (50) coupled to the quick mount track is transferred directly through the quick mount track to the one or more mounting points. The quick mount track also includes a flush mounting surface (3610) that creates and maintains a seal between the quick mount track and the surface, and a chase (3605) is disposed in the quick mount track and defined by the flush mounting sur-
(Continued)

face. A plurality of diamond contoured target regions (13) and a plurality of half diamond contour regions in the backing plate aid in coupling the mount to the quick mount track.

15 Claims, 79 Drawing Sheets

(51) Int. Cl.
| | |
|---|---|
| *F16M 13/02* | (2006.01) |
| *B60P 7/08* | (2006.01) |
| *B64C 1/20* | (2006.01) |
| *F21V 23/04* | (2006.01) |
| *F21V 33/00* | (2006.01) |
| *A47F 5/08* | (2006.01) |
| *A47B 96/06* | (2006.01) |
| *F16M 11/04* | (2006.01) |
| *F16M 11/14* | (2006.01) |
| *F16M 11/20* | (2006.01) |
| *F21Y 115/10* | (2016.01) |
| *F21W 131/301* | (2006.01) |

(52) U.S. Cl.
CPC .......... *A47F 5/0853* (2013.01); *B60P 7/0815* (2013.01); *B64C 1/20* (2013.01); *F16M 11/041* (2013.01); *F16M 11/14* (2013.01); *F16M 11/2078* (2013.01); *F16M 13/02* (2013.01); *F16M 13/022* (2013.01); *F21V 23/04* (2013.01); *F21V 33/0012* (2013.01); *F21W 2131/301* (2013.01); *F21Y 2115/10* (2016.08)

(58) Field of Classification Search
USPC ........................................................ 248/503
See application file for complete search history.

(56) References Cited

U.S. PATENT DOCUMENTS

| | | |
|---|---|---|
| 716,852 A | 12/1902 | Baker et al. |
| 1,178,360 A | 4/1916 | Tudor et al. |
| 1,263,918 A | 4/1918 | Miller et al. |
| 1,288,010 A | 12/1918 | Isaac et al. |
| 1,576,034 A | 3/1926 | Butt et al. |
| 1,702,937 A | 2/1929 | Friedemann et al. |
| 1,817,962 A | 8/1931 | Breuer et al. |
| 2,391,051 A | 12/1945 | Windsor et al. |
| 2,456,024 A | 12/1948 | Schofield et al. |
| 2,473,364 A | 6/1949 | Dickinson et al. |
| 2,480,322 A | 8/1949 | Cozzoli et al. |
| 2,556,076 A | 6/1951 | Evans et al. |
| 2,644,591 A | 7/1953 | McMahan et al. |
| 2,685,912 A | 8/1954 | Evans et al. |
| 2,688,504 A | 9/1954 | Parker et al. |
| 3,042,221 A | 7/1962 | Rasmussen et al. |
| 3,116,773 A | 1/1964 | Kikas |
| 3,204,998 A | 9/1965 | Stollenwerk et al. |
| 3,358,300 A | 12/1967 | Smith et al. |
| 3,375,936 A | 4/1968 | Kessler et al. |
| 3,392,848 A | 7/1968 | McConnell et al. |
| 3,451,580 A | 6/1969 | Husby |
| 3,591,121 A | 7/1971 | Parris |
| 3,605,637 A * | 9/1971 | Prete, Jr. ............... B60P 7/0815 410/105 |
| 3,606,619 A | 9/1971 | Stollenwerk et al. |
| 3,613,900 A | 10/1971 | Chiu |
| 3,718,886 A | 2/1973 | Hoffmeister |
| 3,770,234 A | 11/1973 | Fovall et al. |
| 3,840,265 A | 10/1974 | Stirling et al. |
| 3,846,944 A | 11/1974 | Lambert |
| 3,973,818 A | 8/1976 | Soquenne |
| 4,114,947 A | 9/1978 | Nelson |
| 4,170,335 A | 10/1979 | King |
| 4,173,382 A | 11/1979 | Booty |
| 4,178,032 A | 12/1979 | Hone et al. |
| 4,210,355 A | 7/1980 | Legueu et al. |
| 4,230,432 A | 10/1980 | Howell |
| 4,256,424 A * | 3/1981 | Knox ..................... B64D 9/003 410/104 |
| 4,386,642 A | 6/1983 | Durbin |
| 4,397,432 A | 8/1983 | Resetar et al. |
| 4,423,817 A | 1/1984 | Monjo-Rufi et al. |
| 4,425,978 A | 1/1984 | Star |
| 4,458,864 A | 7/1984 | Colombo et al. |
| 4,513,866 A | 4/1985 | Thomas |
| 4,568,050 A | 2/1986 | Radoy et al. |
| 4,576,319 A | 3/1986 | Brown |
| 4,602,756 A | 7/1986 | Chatfield et al. |
| 4,677,794 A | 7/1987 | Parron et al. |
| 4,763,360 A | 8/1988 | Daniels et al. |
| 4,783,034 A | 11/1988 | Ostrander et al. |
| 4,853,555 A | 8/1989 | Wheat et al. |
| 4,915,435 A | 4/1990 | Levine |
| 4,974,377 A | 12/1990 | Dominitz et al. |
| 5,007,608 A | 4/1991 | Carroll, Jr. et al. |
| 5,157,409 A | 10/1992 | Hamin |
| 5,207,303 A | 5/1993 | Oswalt et al. |
| 5,383,629 A | 1/1995 | Morgan et al. |
| 5,425,520 A | 6/1995 | Masumoto |
| 5,490,703 A | 2/1996 | Hewko et al. |
| 5,615,848 A | 4/1997 | Ceriani et al. |
| 5,732,867 A | 3/1998 | Perkins |
| 5,732,965 A | 3/1998 | Willey |
| 5,738,306 A | 4/1998 | Moss et al. |
| 5,755,478 A | 5/1998 | Kamiya et al. |
| 5,779,296 A | 7/1998 | Hewko et al. |
| 5,785,277 A | 7/1998 | Manning et al. |
| 5,815,629 A | 9/1998 | Finzel et al. |
| 5,833,095 A | 11/1998 | Russell et al. |
| 5,850,891 A | 12/1998 | Olms et al. |
| 5,865,314 A | 2/1999 | Jacober |
| 5,886,674 A | 3/1999 | Yoshimi |
| 5,988,409 A | 11/1999 | Gusdorf et al. |
| 6,000,509 A | 12/1999 | Chisholm |
| 6,157,350 A | 12/2000 | House et al. |
| 6,241,109 B1 | 6/2001 | Kautz et al. |
| 6,244,400 B1 | 6/2001 | Bowers |
| 6,273,366 B1 | 8/2001 | Sprenger et al. |
| 6,296,094 B1 | 10/2001 | Knecht |
| 6,367,603 B1 | 4/2002 | Tiramani et al. |
| 6,585,188 B2 | 7/2003 | Alli |
| 6,595,379 B1 | 7/2003 | Powell |
| 6,618,018 B1 | 9/2003 | Sylvester et al. |
| 6,726,075 B1 | 4/2004 | Patel et al. |
| 6,746,138 B1 | 6/2004 | Neeld et al. |
| 6,762,727 B2 | 7/2004 | Rochford et al. |
| 6,789,714 B1 | 9/2004 | Benson et al. |
| 6,945,414 B1 | 9/2005 | Stevens et al. |
| 7,000,810 B1 | 2/2006 | Farmer |
| 7,048,242 B2 | 5/2006 | Oddsen |
| 7,097,204 B2 | 8/2006 | Jessup et al. |
| 7,234,619 B2 | 6/2007 | Hicks et al. |
| 7,328,926 B1 | 2/2008 | Myers et al. |
| 7,502,226 B2 | 3/2009 | Searby et al. |
| 7,507,005 B1 | 3/2009 | Mier-Langner |
| 7,600,619 B2 | 10/2009 | Sapyta |
| 7,654,834 B1 | 2/2010 | Mier-Langner et al. |
| 7,669,945 B2 | 3/2010 | Blersch et al. |
| 7,677,400 B2 | 3/2010 | Bayazit et al. |
| 7,798,323 B1 | 9/2010 | McCann et al. |
| 7,946,771 B2 | 5/2011 | Boneschanscher et al. |
| 7,984,889 B2 | 7/2011 | Whitley et al. |
| 8,167,131 B2 | 5/2012 | Anderson |
| 8,172,077 B1 | 5/2012 | Gray |
| 8,276,795 B1 | 10/2012 | Dean et al. |
| 8,387,783 B2 | 3/2013 | Zack et al. |
| 8,505,794 B2 | 8/2013 | Ardigo |
| 3,636,154 A1 | 1/2014 | Chinn |
| 8,701,952 B1 | 4/2014 | Tripp |
| 8,807,376 B1 | 8/2014 | Mastors |

(56) References Cited

U.S. PATENT DOCUMENTS

| | | | |
|---|---|---|---|
| 8,864,004 | B2 | 10/2014 | Crawford et al. |
| 8,992,238 | B2 | 3/2015 | Chinn |
| 9,078,501 | B2 | 7/2015 | Johnson |
| 9,282,794 | B2 | 3/2016 | Farrelly |
| 9,379,504 | B2 | 6/2016 | Chinn |
| 9,611,975 | B2 | 4/2017 | Chinn et al. |
| 9,861,178 | B1 | 1/2018 | Vanman et al. |
| 9,944,217 | B2 * | 4/2018 | Schroeder ............ B60P 7/0815 |
| 2003/0143052 | A1 | 7/2003 | Fehrle et al. |
| 2004/0178309 | A1 | 9/2004 | Crowley et al. |
| 2004/0253856 | A1 | 12/2004 | Hoffmann |
| 2005/0039644 | A1 | 2/2005 | Sheahan et al. |
| 2005/0232519 | A1 | 10/2005 | Grimes |
| 2006/0243766 | A1 | 11/2006 | Lan |
| 2006/0255221 | A1 | 11/2006 | Tseng |
| 2007/0056921 | A1 | 3/2007 | Lo |
| 2007/0097617 | A1 | 5/2007 | Searby et al. |
| 2008/0023976 | A1 | 2/2008 | Myers et al. |
| 2008/0121730 | A1 | 5/2008 | Calkin |
| 2008/0169739 | A1 | 7/2008 | Goldenberg |
| 2008/0302553 | A1 | 12/2008 | Ross et al. |
| 2009/0014584 | A1 | 1/2009 | Rudduck et al. |
| 2009/0014602 | A1 | 1/2009 | Frost |
| 2009/0140112 | A1 | 6/2009 | Carnevali |
| 2009/0165208 | A1 | 7/2009 | Reed et al. |
| 2010/0307649 | A1 | 12/2010 | Santos Dominguez |
| 2011/0147428 | A1 | 6/2011 | Crawford et al. |
| 2012/0006873 | A1 | 1/2012 | Chinn |
| 2012/0126075 | A1 | 5/2012 | Chinn et al. |
| 2013/0081233 | A1 * | 4/2013 | Lu ................... B60P 7/0815 24/185 |
| 2013/0193179 | A1 | 8/2013 | Davidson |
| 2014/0016503 | A1 | 1/2014 | Altekar et al. |
| 2014/0226315 | A1 | 8/2014 | Nicieja et al. |
| 2014/0227892 | A1 | 8/2014 | Chinn |
| 2014/0263502 | A1 | 9/2014 | Byham |
| 2014/0374564 | A1 | 12/2014 | Schroeder et al. |
| 2015/0344089 | A1 | 12/2015 | Bopanna |
| 2016/0031382 | A1 | 2/2016 | Chinn et al. |
| 2017/0020249 | A1 | 1/2017 | Schroeder et al. |
| 2017/0021775 | A1 | 1/2017 | Spector et al. |
| 2017/0158145 | A1 | 6/2017 | Chinn et al. |
| 2017/0202330 | A1 | 7/2017 | Schroeder et al. |
| 2017/0209318 | A1 | 7/2017 | Schroeder et al. |
| 2018/0073676 | A1 | 3/2018 | Schroeder et al. |

FOREIGN PATENT DOCUMENTS

| | | | |
|---|---|---|---|
| DE | 3209091 | A1 | 9/1983 |
| DE | 3209092 | A1 | 9/1983 |
| DE | 3230905 | A1 | 2/1984 |
| DE | 68910460 | U1 | 12/1989 |
| DE | 19716046 | A1 | 10/1998 |
| DE | 202006020143 | U1 | 1/2008 |
| DE | 102009039471 | A1 | 3/2011 |
| DE | 102010024544 | A1 | 12/2011 |
| EP | 0021526 | A2 | 1/1981 |
| EP | 105675 | A2 | 4/1984 |
| EP | 260726 | A2 | 3/1988 |
| EP | 0583491 | A1 | 2/1994 |
| EP | 583492 | A1 | 2/1994 |
| EP | 972616 | A2 | 1/2000 |
| EP | 1790521 | A1 | 5/2007 |
| EP | 1863119 | A1 | 12/2007 |
| EP | 2206623 | A1 | 7/2010 |
| EP | 2451418 | B1 | 5/2013 |
| EP | 2614804 | A1 | 7/2013 |
| EP | 2614805 | A1 | 7/2013 |
| FR | 1085340 | A | 1/1955 |
| FR | 2481110 | A1 | 10/1981 |
| FR | 2647323 | A1 | 11/1990 |
| FR | 2649007 | A1 | 1/1991 |
| GB | 1530794 | A | 11/1978 |
| GB | 2401541 | A | 11/2004 |
| GB | 2452083 | A | 2/2009 |
| WO | 9115178 | A1 | 10/1991 |
| WO | 9927881 | A1 | 6/1999 |
| WO | 0059446 | A1 | 10/2000 |
| WO | 2001087665 | A1 | 11/2001 |
| WO | 2006122351 | A1 | 11/2006 |
| WO | 2011006163 | A2 | 1/2011 |

OTHER PUBLICATIONS

Extended European Search Report from EP Application No. 13163002.2 dated Jun. 11, 2013.
Extended European Search Report from EP Application No. 13163007.1 dated Jun. 11, 2013.
International Search Report and Written Opinion dated Nov. 3, 2011, pertaining to International Application No. PCT/US2010/041724.
International Search Report and Written Opinion dated Jun. 27, 2014, pertaining to International Application No. PCT/US2014/015898.
Office Action dated Jul. 29, 2014, pertaining to Russian Application No. 2012101216.
International Preliminary Report on Patentability, pertaining to International Application No. PCT/US2010/041724 dated Jan. 19, 2012.
Examination Report, pertaining to Australian Application No. 2010271194 dated Nov. 27, 2013.
Office Action pertaining to Chinese Application No. 201080038769.2 dated Jan. 24, 2014.
International Search Report and Written Opinion dated Apr. 16, 2013, pertaining to International Application No. PCT/US2013/026129 dated Apr. 16, 2013.
International Preliminary Report on Patentability, pertaining to International Application No. PCT/US2013/026129 dated Aug. 28, 2014.
Examination Report, pertaining to Australian Application No. 2013203990 dated Aug. 18, 2014.
International Search Report and Written Opinion, pertaining to PCT/2014/012492 dated Apr. 3, 2014.
Preliminary Rejection, pertaining to Korean Application No. 10-2012-7003477 dated Jul. 27, 2015.
Examination Report, pertaining to Canadian Application No. 2767547 dated Jul. 7, 2015.
Examination Report, pertaining to EP Patent Application No. 13163007.1 dated Nov. 17, 2014.
Examination Report, pertaining to Australian Patent Application No. 2014203593 dated Feb. 20, 2015.
Examination Report, pertaining to Australian Patent Application No. 2014203595 dated Jul. 23, 2015.
International Preliminary Report on Patentability, pertaining to International Application No. PCT/US2014/012492 dated Aug. 20, 2015.
International Search Report and Written Opinion dated Mar. 3, 2015, pertaining to International Application No. PCT/US2014/050288.
International Search Report and Written Opinion dated Mar. 3, 2015, pertaining to International Application No. PCT/US2014/050306.
International Search Report and Written Opinion dated Sep. 29, 2015, pertaining to International Application No. PCT/US2014/050392.
Examination Report dated Feb. 5, 2016, pertaining to European Patent Application No. 14703501.8.
Examination Report dated Mar. 1, 2016, pertaining to EP Patent Application No. 14/707550.1.
Official Action dated Feb. 29, 2016, pertaining to Egyptian Patent Application No. PCT/NA/50/2012.
Office Action dated Dec. 22, 2015, pertaining to Chinese Patent Application No. 201410247226.1.
Office Action dated Dec. 16, 2015, pertaining to Japanese Patent Application No. 2015-020347.
Notice of Allowance dated Jan. 20, 2016, pertaining to U.S. Appl. No. 14/633,797.

(56) References Cited

OTHER PUBLICATIONS

International Search Report dated Aug. 8, 2006 pertaining to Australian Patent Application No. PCT/AU2006/000645.
Search Report dated Jan. 22, 2018, pertaining to Singapore Patent Application No. 10201708460R, 2 pages.
Written Opinion dated Jan. 22, 2018, pertaining to Singapore Patent Application No. 10201708460R, 7 pages.
Office Action dated May 18, 2018 Pertaining to U.S. Appl. No. 15/283,981, 11 pages.
Office Action dated May 18, 2018 Pertaining to U.S. Appl. No. 15/326,805 10 pages.
Search Report and Written Opinion dated Jul. 3, 2018 pertaining to Singapore Patent App. No. 10201708458T, 9 Pages.
Non-final Office Action dated Nov. 1, 2018 pertaining to U.S. Appl. No. 15/326,847.
Extended European Search Report pertaining to European Patent Application No. 18189787.7 dated Oct. 22, 2018.

* cited by examiner

EQUIPMENT MOUNTING SYSTEM

CROSS-REFERENCE TO RELATED APPLICATIONS

This application claims the benefit of U.S. Provisional Application No. 62/026,515, filed Jul. 18, 2014, and titled "Equipment Mounting System." This application is related to: U.S. Provisional Application 61/763,045, filed Feb. 11, 2013, and titled "Equipment Mounting System;" PCT Application NO. US 2014/015,897, filed Feb. 11, 2014, and titled "Equipment Mounting System;" U.S. application Ser. No. 14/455,471, filed Aug. 8, 2014, now U.S. Pat. No. 9,944,217, and titled "Equipment Mounting System;" and PCT Application No. PCT/US14/050288, filed Aug. 8, 2014, and titled "A Crash-Ready, Portable, Compartmentalization Device."

TECHNICAL FIELD

The present specification generally relates to equipment mounting systems for mounting equipment in various configurations on a structure and, more specifically, a track mounting system for mounting equipment in vehicles and on structures.

BACKGROUND

The mounting of equipment and devices onto structures such as, for example, a wall, is dependent on the manufacturer's mounting locations on those structures for securing such equipment and devices. This may require individual adaptation for each piece of equipment or device to mount to these specific locations which may be time consuming and labor intensive. Furthermore, if the piece of equipment or device is desired to be moved, the amount of time and effort is increased to re-mount the piece of equipment or device in a new location. The amount of effort to individual adapt the equipment and devices increases for mobile applications.

Accordingly, a need exists for alternative approaches to secure and easily relocate equipment or devices throughout and around, for example, a vehicle for mobile applications or on a wall for structural applications.

SUMMARY

An equipment mounting system includes a quick mount track with tapered edges couple to a surface or structure. The quick mount track includes a backing plate, one or more mounting points positioned such that any forces exerted on a mount coupled to the quick mount track is transferred directly through the quick mount track to the one or more mounting points. The quick mount track also includes a flush mounting surface that creates and maintains a seal between the quick mount track and the surface, and a chase is disposed in the quick mount track and defined by the flush mounting surface. A plurality of diamond contoured target regions and a plurality of half diamond contour regions in the backing plate aid in coupling the mount to the quick mount track.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The following text sets forth a broad description of numerous different embodiments of the present disclosure. The description is to be construed as illustrative only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

Figure 1:
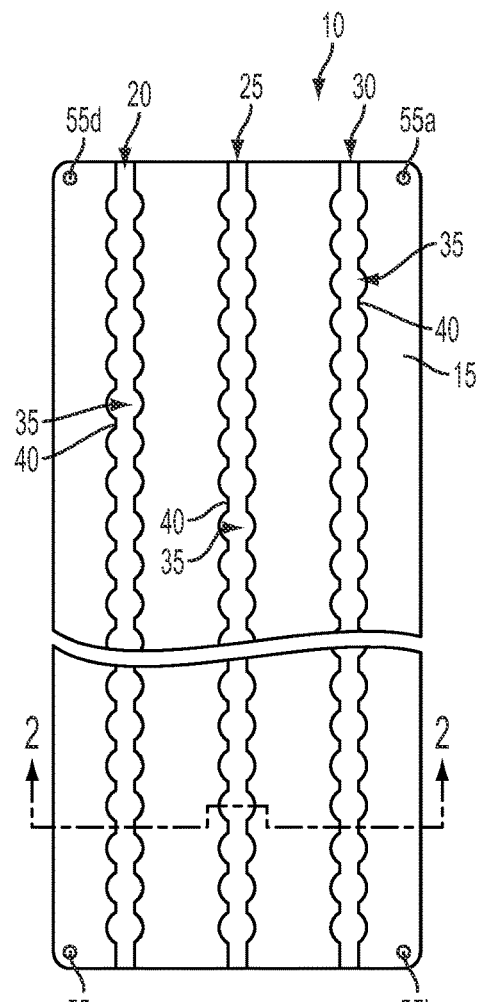
FIG. 1 depicts an isometric vie of a track according to one or more embodiments shown and described herein.
Figure 2:
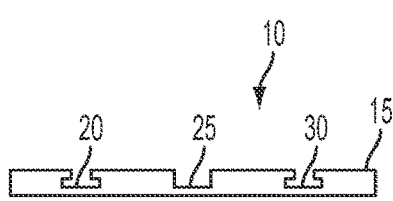
FIG. 2 depicts a cross-section of the track according to one or more embodiments shown and described herein.

Referring now to FIGS. 1 and 2, one embodiment of a track 10 for use in an equipment mounting system or similar track system is illustrated. While multiple tracks can be used, only one track 10 will be described as multiple tracks of the same equipment mounting system may have the same or substantially the same features. Furthermore the size, shape, and/or configuration of the track 10 can vary depending on the size of a surface for installation and the equipment to be mounted to the track 10. The track 10 includes a backing plate 15 that may have an elongated, rectangular shape (or any other suitable shape) and three slots that extend at any length along the backing plate 15. The three slots may be first outer slot 20, a center slot 25, and a second outer slot 30. The slots are best viewed in FIG. 2 as T-shaped apertures running the length of or substantially the length of the backing plate 15. The three slots are substantially parallel to each other. Each slot 20, 25 and 30 may have a series of open regions 35 that are adjacent to necked-down regions 40. In some embodiments, the open regions 35 are symmetrical such that they are spaced equidistant apart and are aligned in widthwise rows along the length of the backing plate 15. For example, two open regions 35 in the first outer slot 20 and two open regions 35 in the second outer slot 30 may be spaced about 127 milli-meter (mm) (5 inches) apart. The 127 mm spacing may span any number of open regions 35 in the slot (first outer slot 20 or second outer slot 30). To illustrate the flexible spacing, every third open region may be space 127 mm apart. In yet another example, every fourth open region 35 may be spaced 127 mm apart. The 127 mm spacing is for example purposes only and any desired spacing of the open regions 35 may be used. As another example, the open regions 35 of one or more of the slots 20, 25 and 30 may not all be equidistant and/or may not be aligned in rows with the other enlarged open regions of the other slots.

The track 10 may include one or more mounting holes 55a, 55b, 55c, and 55d. The mounting holes 55a, 55b, 55c, and 55d may be used to secure the track 10 to a surface using a fastening device. Fastening devices include, but are not limited to, screws, buttons, snap buttons, bolts, rivets, nails, cotter pins, adhesive, Velcro (hook and loop fastener), weld, epoxy, or any similar devices that mechanically joins or affixes two or more objects together.

Figure 3:
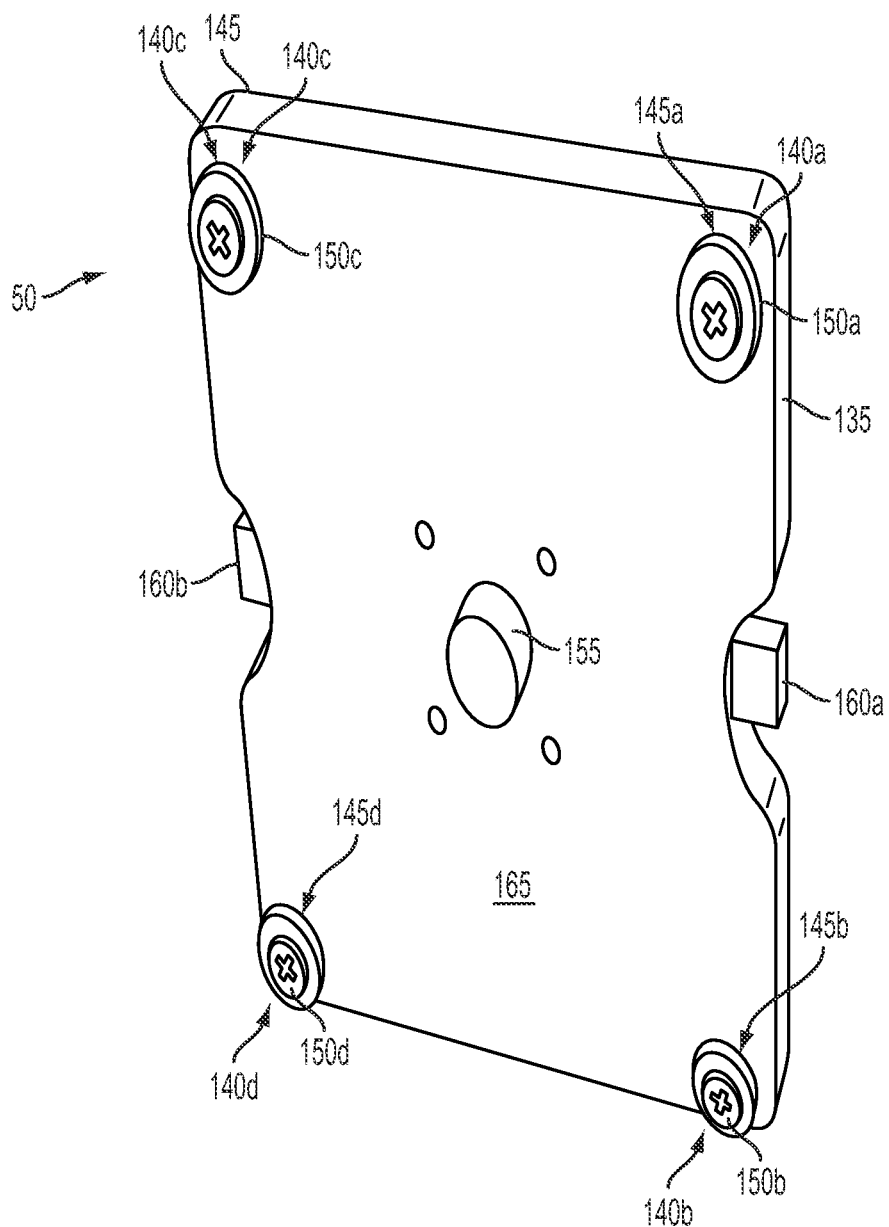
FIG. 3 depicts an isometric back view of a mount according to one or more embodiments shown and described herein.

FIG. 3 is an isometric back view of a mount 50. The mount 50 may take on many different shapes and sizes and shown in the figures and described below. The mount 50 is an interface between a piece of equipment and the track. The mount may have any number of mounting studs 140 affixed to it to support the weight of the piece of equipment or device attached to it. More mounting studs may be affixed to increase the load bearing capacity of the mount 50. The mount 50 may include apertures to reduce the weight of the mount 50. The mount 50 may also include The mount 50 has a mounting plate 135, a back surface 165, a front surface 195, and four mounting studs 140a, 140b, 140c, and 140d. The back surface 165 is on the opposite side of mount 50 from the front surface 195. The mount 50 is operable to be removably connected and/or attached to the track 10 or a fixed position plate. Each mounting stud 140a, 140b, 140c, and 140d includes a respective stem portion 145a, 145b, 145c, and 145d and a respective enlarged head portion 150a, 150b, 150c, and 150d. A locking pin 155 may be biased (e.g., by a spring, resilient material, or other biasing means) outward towards an extended lock position for engaging the track 10 of FIG. 1, and more specifically the corresponding locking pin aperture on the fixed position plate, a locking pin aperture 981 as found in FIG. 9, or the open region 35 of one of the center slot 25 of the track 10. Alternatively to the locking pin 155 engaging only the center slot 25, the locking pin 155 may be positioned on the mounting plate 135 to engage the first outer slot 20, the second outer slot 25, or both. The locking pin 155 may be retracted using either individually or in combination a right locking pin release lever 160*b* or a left locking pin release lever 160*a* which is operatively connected to a release mechanism 190 of FIG. 7. It should be understood that both locking pin releases locking pin levers 160*a* and/or 160*b* may be oriented in any direction in order to avoid obstructions with other equipment or devices and yet still allow the release of the mount 50 from the track 10. Furthermore, in some embodiments, two or more release levers may need to be actuated in order to release the mount 50 from the track 10. Such an embodiment may provide for additional security by preventing unwanted movement of the mounting plate 135 when one of the locking pin releases locking pin release levers 160*a* or 160*b* is accidentally actuated. The front surface 195 may have any device and/or equipment attached to it.

Figure 9:
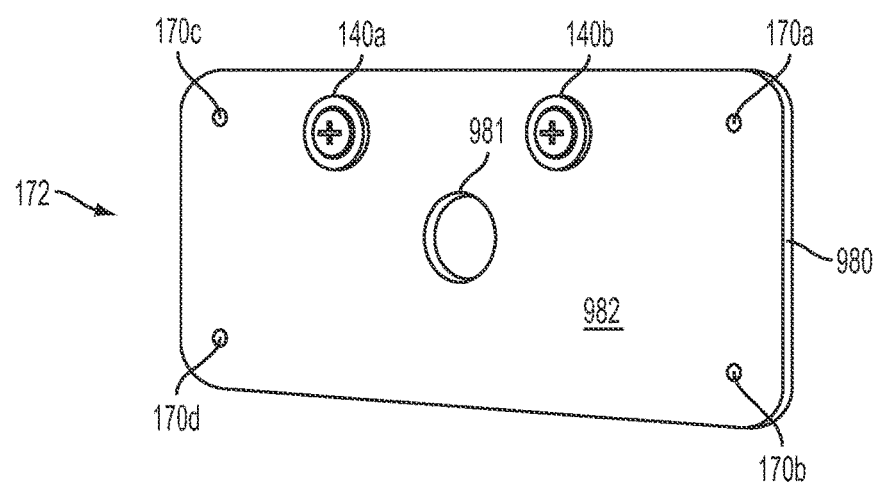
FIG. 9 depicts one example of an equipment interface according to one or more embodiments shown and described herein.

The mount 50 may be affixed to either the track 10 or the fixed position plate (not shown) using an interference fit, a friction fit, or the locking pin 155 engaging either an open region 35 or a locking pin aperture 981 of FIG. 9. For example, the mounting studs 140 may rest at the bottom of the necked down portion of the keyhole slots (not shown) of the fix position plate to attach the mount 50 to the fixed position plate. In another example, the locking pin 155 may exert a biasing force against the track 10 or the fixed position plate for the interference fit between the mount 50 and the track 10 or fixed position plate. In yet another example, the locking pin 155, as described above, may be used to immobilize the mount 50 in relation to either the track 10 or the fixed position plate by engaging either a locking pin aperture 981 or an open region 35. It should be understood that the track 10 and/or the fixed position plate are non-limiting examples of securing the mount 50.

Figure 4:
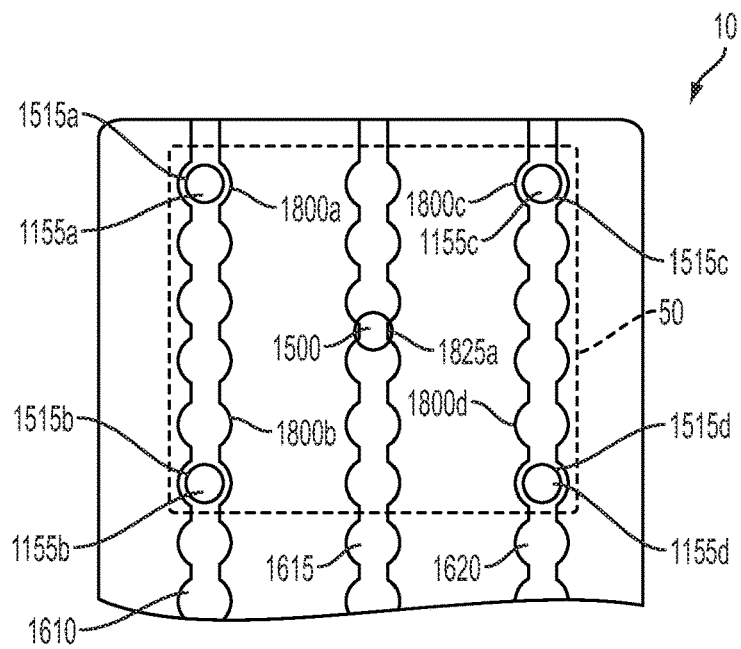
FIG. 4 depicts an in-phase configuration of the track and a mounting plate according to one or more embodiments shown and described herein.

Referring to FIG. 4, the track 10 and the mounting plate 135 illustrate an in-phase configuration that is used to lock the mounting plate 135 to the track 10. Referring to FIG. 4, when the enlarged head portions 1515*a*, 1515*b*, 1515*c* and 1515*d* of the mounting studs 1155*a*, 1155*b*, 1155*c* and 1155*d* of the mounting plate 135 are inserted within the enlarged head opening 1800*a*, 1800*b*, 1800*c* and 1800*d* of the slots 1610 and 1620, the locking pin 1500 is prevented from entering the slot 1615 due to its alignment with the necked-down portion 1825*a*. In some embodiments, placing the enlarged head portions 1515*a*, 1515*b*, 1515*c* and 1515*d* in the slots 1610 and 1620 causes the locking pin 1500 to retract from its outwardly biased, extended position.

Figure 5:
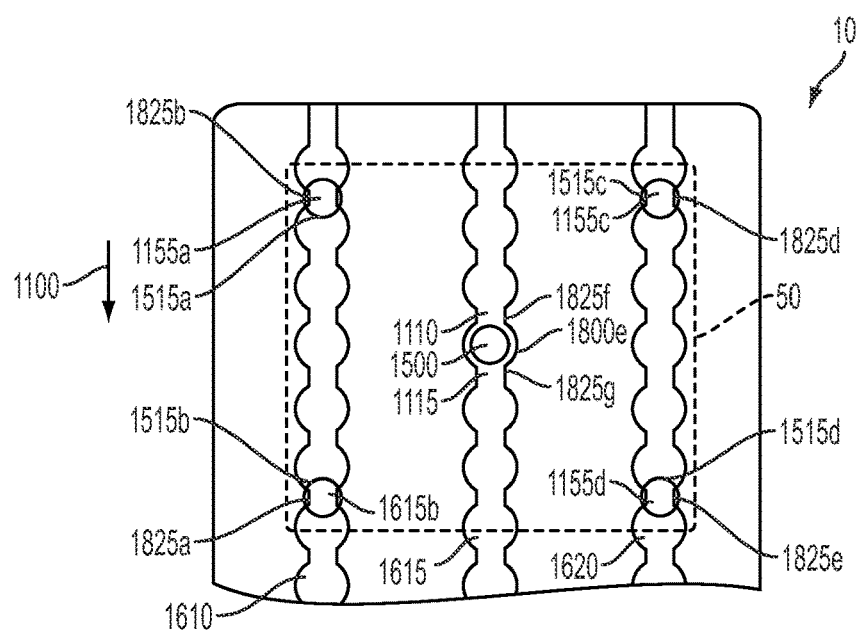
FIG. 5 depicts an out-of-phase configuration of the track and the mounting plate according to one or more embodiments shown and described herein.

Referring to FIG. 5, the track 10 and the mounting plate 135 illustrate an out-of-phase configuration. The stem portions 1510 (not shown) of the mounting studs 1155*a*, 1155*b*, 1155*c* and 1155*d* are sized to slide through the necked down portion 1825 while the enlarged head portions 1515*a*, 1515*b*, 1515*c* and 1515*d* remain in the slots 1610 and 1620. Movement of the mounting plate 135 downwardly (or upwardly) in the direction of arrow 1100 aligns the enlarged head portions 1515*a*, 1515*b*, 1515*c* and 1515*d* with necked-down regions 1825*b*, 1825*c*, 1825*d* and 1825*e* of the slots 1610 and 1620 and aligns the locking pin 1500 with the enlarged head opening 1800*e* of the slot 1615. The width of the locking pin 1500 may be greater than the upper passageway 1110 and the lower passageway 1115 through the necked-down regions 1825*f* and 1825*g* adjacent the enlarged head opening 1800*e*, which prevents further movement of the mounting plate 135 once the locking pin 1500 passes through the enlarged head opening 1800*e* and into the slot 1615. In embodiments where the locking pin 1500 is biased toward its extended position, the locking pin 1500 may snap into its extended position automatically once the locking pin 1500 is aligned with the enlarged head opening 1800*e*. An operator can retract the locking pin 1500 out of the slot 1615 by actuating any of the locking pin releases 1160/1175 described above and again move the mounting plate 135 along the track 10 to a different elevation.

While FIGS. 4 and 5 illustrate a mounting plate 135 being secured to the track 10 using four mounting studs 1155*a*, 1155*b*, 1155*c*, and 1155*d* and one locking pin 1500, it should be appreciated that any other number of studs and locking pins may alternatively be employed. Such an embodiment may allow for a secured connection under increased loads by providing more points of contact between the mounting plate 135 and the track 10. In another embodiment, the mounting plate 135 may incorporate eight studs 1155 evenly distributed about the mounting plate 135. In yet another embodiment, any other number of studs 1155 may be disposed on the mounting plate 125 that allows for a releasable connection with the track 10. The enlarged head portions 1515 are sized to be received through open regions 1625 of the slots 1610, 1615, and 1620 to be captured behind necked-down regions 1630 of the slots 1610, 1615, 1620, while the stem portions 1510 are sized to pass by the necked-down regions 1630 of the slots 610, 115, 1620.

The fixed position plate is an alternative to the track 10 of FIG. 1. A mount 50 of FIG. 3 may be removably coupled to the fixed position plate. The fixed position plate may include any suitable mounting structure or fastening device for securing it to a surface. In this illustrative embodiment, the fixed position plate incorporates four mounting holes, to secure the fixed position plate to the surface. The fixed position plate also includes slots in the form of keyhole slots, each with an enlarged head opening and a necked-down portion. The enlarged head opening of the keyhole slots are sized and arranged to receive the enlarged head portions of the mounting studs there through and the necked-down portions are sized to allow the stem portions to slide therein with the enlarged head portions captured within the necked-down portions. The capture of the enlarged head portions may be accomplished by an interference fit between the mounting studs and the necked down portions of the first outer slot, or the center slot, or the second outer slot. A locking pin aperture may be provided that is sized to receive the locking pin when the locking pin is aligned with the locking pin aperture. The keyhole slots and the locking pin aperture are located as a mirror image of the mounting studs of the mount.

Figure 6:
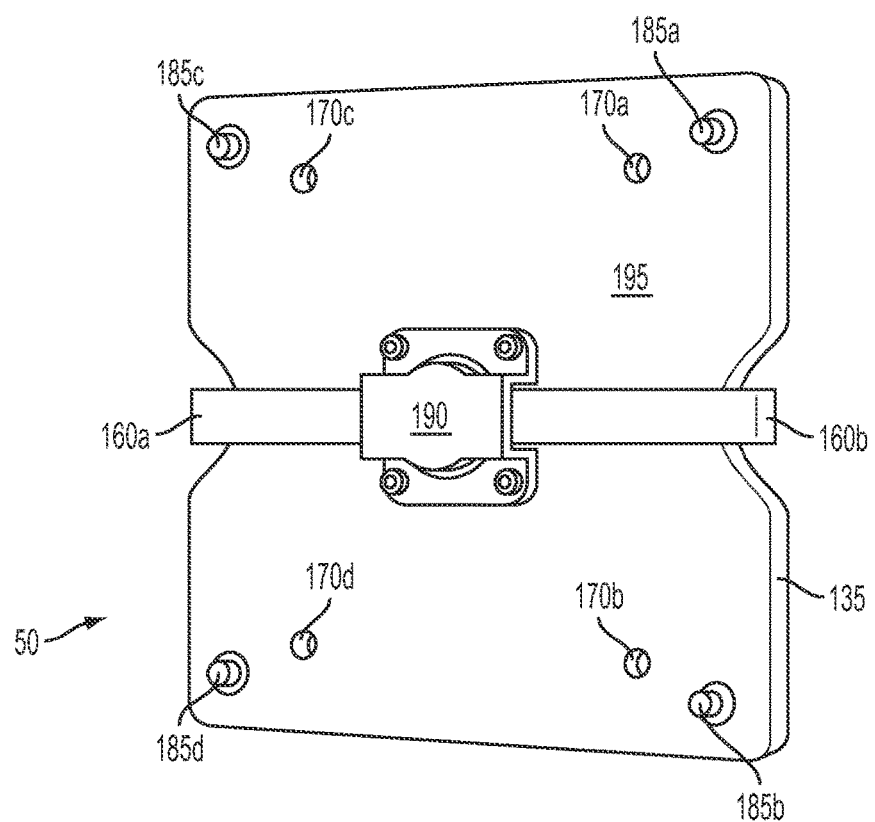
FIG. 6 depicts an isometric front view showing the front surface of another embodiment of the mount according to one or more embodiments shown and described herein.

FIG. 6 is an isometric front view showing the front surface 195 of another embodiment of the mount 50. The mounting plate 135 has equipment mounting holes 170*a*, 170*b*, 170*c*, and 170*d* used to attach the mounting plate 135 to a piece of equipment (not shown) by any of the fastening devices listed above. Although FIG. 6 only depicts four equipment mounting holes 170*a*, 170*b*, 170*c*, and 170*d*, any amount of equipment mounting holes 170, in any configuration, may be used to accommodate the equipment or device to be mounted. The stud nuts 185*a*, 185*b*, 185*c*, and 185*d* are used to secure the mounting studs 140*a*, 140*b*, 140*c*, and 140*d* to the mounting plate 135. The stud nuts 185*a*, 185*b*, 185*c*, and 185*d* may be any securing device and are not limited to a nut. The release mechanism 190 is secured to the mounting plate 135 and has gearing inside to pull in or push out the locking pin (e.g., locking pin 155 shown in FIG. 7) when one or both of the locking pin releases 160*a* and/or 160*b* are actuated. In another embodiment, the release mechanism 190 may include gearing to actuate the locking pin 155 against the bias of a spring. One example of how the release mechanism 190 works may be found in FIG. 7. The piece of equipment is secured to the front surface 195 of the mounting plate 135.

Figure 7:
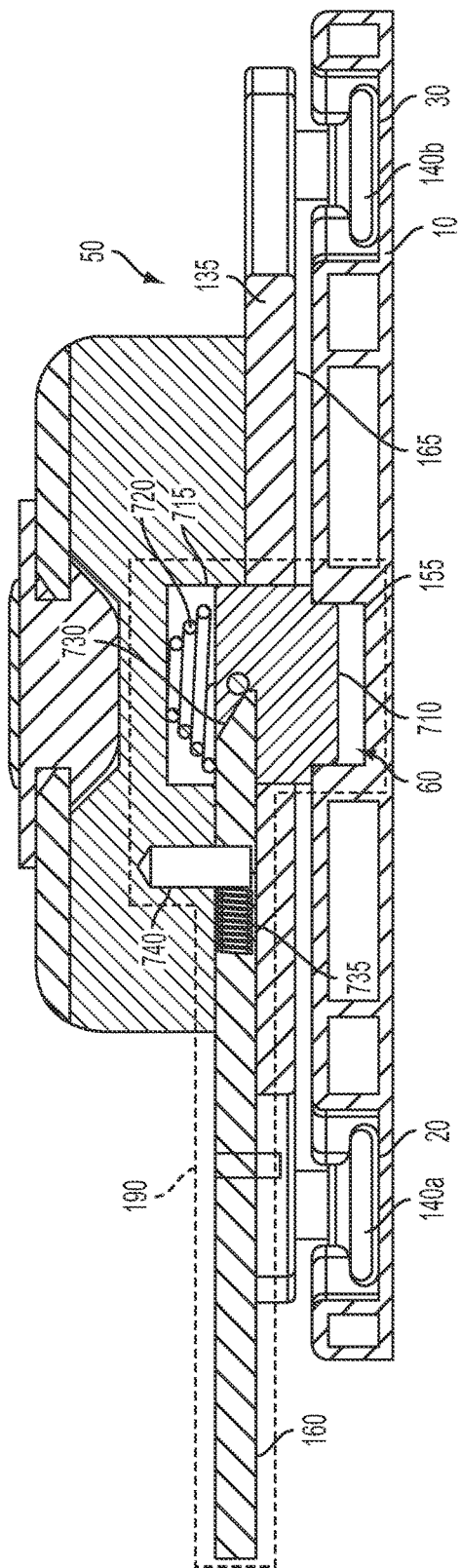
FIG. 7 depicts the inner workings of the release mechanism according to one or more embodiments shown and described herein.

FIG. 7 depicts one embodiment of the inner workings of the release mechanism 190. The locking pin 155 is shown in the extended position and extending into the locking pin aperture 60 of the track 10. The track 10 may be the embodiment shown in FIG. 28a. The release mechanism 190 may be secured in a housing 715. A spring 720 provides the biasing force to extend the locking pin 155 in the extended position. The locking pin 155S may include a lift pin 725 that is disposed through a center of the locking pin 155. The lift pin 725 may be disposed such that to provide a mechanical neutral balance point for moving the locking pin 155 without the locking pin 155 tilting or jamming within the housing 715.

A locking pin release 160 may be used to exert a force on the locking pin 155 and against the biasing force of the spring 720 to transition the locking pin 155 from the extended position to a retracted position. The retracted position is where the distal end 710 of the locking pin 155 is flush with the back surface 165 of the mounting plate 135. The locking pin release 160 may have a ramp section 730 that, when the locking pin release 160 is transitioned towards the locking pin 155, an upward force is exerted on the lift pin 725 to retract the locking pin 155. In other words, when the locking pin release 160 is actuated, the locking pin 155 is transitioned to a retracted position. The locking pin release 160 may include a return spring 735 to provide a biasing force to return the locking pin release 160 to a locked position after actuation. The locked position is the position of the locking pin release 160 in which the mount 50 will lock into position via the locking pin 155 engaging the locking pin aperture 60.

FIG. 7 also illustrates the engagement of the mounting studs 140 (i.e. 140a and 140b) with the first outer slot 20 and the second outer slot 30.

Figure 8:
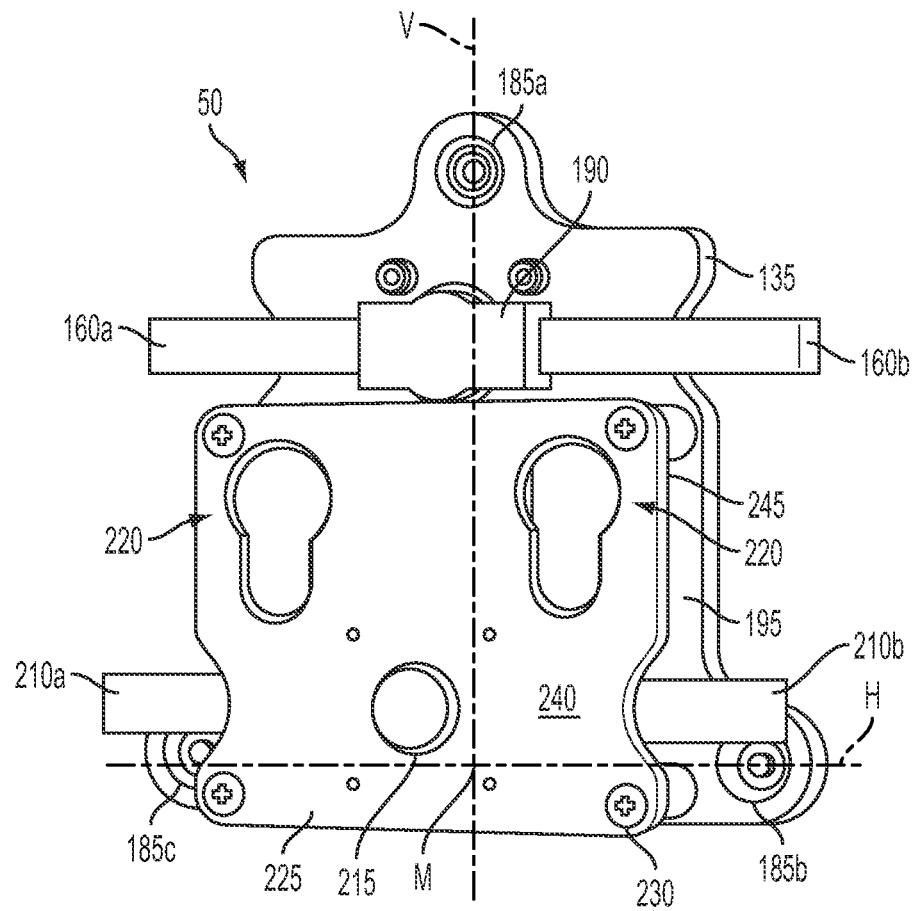
FIG. 8 depicts another embodiment of the mount according to one or more embodiments shown and described herein.

Referring generally to FIG. 8, the mount 50 may include an adaptor, described in greater detail below, coupled to the front surface 195 of the mounting plate 135 The adaptor releasably couples with an equipment interface of a piece of equipment. The adaptor allows a user to secure the mount 50 to the track without the bulk and/or weight of the piece of equipment making the securing of the mount 50 difficult. In other words, the mount 50 may be mounted directly to a piece of equipment and the engagement of the mount 50 with the track 10 may be complicated by the size, shape, weight, or other factors of the piece of equipment. The adaptor is secured to the mount 50. An equipment interface, described below, is used to couple the piece of equipment to the adaptor.

FIG. 8 depicts another embodiment of the mount 50. In this illustrative embodiment, the adaptor is a second mounting plate 225 attached to the mounting plate 135. This embodiment allows adaptors (described below), or other equipment, to be mounted to the track 10. The mounting plate 135 may have any number of mounting studs 140 required to secure the mount 50 to the track 10. If the mount 50 is required to secure a heavy load, additional mounting studs 140 may be added to increase the load capacity of the mount 50. In this embodiment, the mounting plate 135 has three stud nuts 185a, 185b, and 185c used to secure three mounting studs 140a, 140b, and 140c to the mounting plate 135. The three mounting studs 140a, 140b, and 140c may be in a triangle configuration as shown in FIG. 8. Mounting studs 185b and 185c lie along a horizontal axis H and mounting stud 185a lies along a vertical axis V. A midpoint M is the point along the horizontal axis H and is equidistant between mounting studs 185b and 185c. The vertical axis passes through the midpoint M. Mounting stud 185a is positioned to engage the open area 35 of the center slot 25 when mounting studs 185b and 185c engage an open area 35 of the second outer slot 30 and the first outer slot 20 respectively of the track 10. The locking pin associated with the release mechanism 190 may also engage the open areas 35 of the center slot 25. The stud nuts 185a, 185b and 185c may be any securing device and are not limited to a nut. The release mechanism 190 is secured to the mounting plate 135 and has gearing inside to pull in or push out the locking pin (e.g., locking pin 155 shown in FIG. 7) when one or both of the locking pin releases 160a or 160b are actuated. The second mounting plate 225 is secured to the front surface 195 of the mounting plate 135 using a fastener 230 threaded into the equipment mounting holes 170 (not shown). It should be understood that the use of the fastener 230 is a non-limiting example of a type of hardware that can be used to attach the second mounting plate 225 to the mounting plate 135, in this case a screw. Other illustrative examples of fasteners include, but are not limited fastening devices, and any other fastening mechanisms. The second mounting plate 225 may include two keyholes 220 disposed there through for mounting equipment, devices, adaptors, and/or other items.

In one embodiment, the second mounting plate 225 may have a first surface 240 and a second surface 245, the first surface 240 is opposite the second surface 245. A second release mechanism (not shown) is coupled to the second surface 245. The second release mechanism is the same in operation and configuration as the release mechanism 190 of FIG. 7. The second release mechanism includes a second locking pin (not shown) disposed through the second mounting plate 225 and extending outwardly from the first surface 240 in an extended position. A second lock bias spring (not shown) which biases the second locking pin 215 in the extended position, and at least one second locking pin release (i.e. 210a and 210b) operatively coupled to the second locking pin 215 and when actuated, retracts the second locking pin 215 toward the second mounting plate 225 into a retracted position and when released, allows the second lock bias spring to bias the second locking pin 215 in the extended position.

FIG. 9 illustrates one example of an equipment interface 172 used to couple with the adaptor (i.e. second mounting plate 225) described above. A connect plate 980 may be used as the support structure for the equipment interface 172. Equipment mounting apertures 170a, 170b, 170c, and 170d may be used to secure a piece of equipment to the equipment interface 172. Although four mounting apertures are shown, any number of mounting apertures may be used to properly secure a piece of equipment to the equipment interface 172. The connect plate may also include a locking pin aperture 981 disposed through the connect plate and at least one mounting stud coupled to the back surface of the mounting plate, individual ones of the at least one mounting stud (i.e. 140a and 140b) that includes a stem portion that extends outwardly from a connect surface 982 and an enlarged head portion disposed at a distal end of respective stem portions. The one or more mounting studs 140a and 140b, slidably couple with individual ones of the at least one keyhole slots (i.e. 220 of FIG. 8) to secure the connect plate 980 to the second mounting plate 225. When in the locked position, the second locking pin 215 engages the lock pin aperture 981 to restrict relative movement between the connect plate 980 and second mounting plate 225.

In another embodiment of an equipment interface 172, the connect plate 980 may include two mounting studs 140a and 140b and a locking pin aperture 981 as described above as well as a plurality of thumb screws (not shown). The thumb screws may be used to easily attach a piece of equipment (not shown) without the need for separate mounting hardware, i.e. bolts, screws, etc. The thumb screws may be of any configuration as required by the equipment to be mounted may be used.

In another embodiment of an equipment interface 172, the equipment interface 172 may serve as an interface between two types of adaptors. For example, the connect plate 980 may have, on a first side, one or more mounting studs 140 and a locking pin aperture 981 and a bowl adaptor (described below) on a second side.

Another example of an equipment interface 172 is a surface mount (not shown). The surface mount may be secured to the track 10 via the mount 50 directly or via the adaptor described above. The surface mount is secured to the mount 50 via four fasteners 230. The surface mount has a handle to aid in removing the surface mount from the track when the locking pin release is actuated. The handle 265 may also be used to hang an IV bag, wrap cords around, or mount additional pieces of equipment to. A plurality of holes may be drilled into a body of the surface mount to reduce the weight of the overall unit and organize and secure cords and other devices by routing them through the plurality of holes. In this non-limited embodiment, the plurality of holes are placed and sized where they will effectively reduce weight without weakening the structure of the body. A storage compartment is included to hold a power cord of a piece of equipment mounted to the surface mount.

In another embodiment, if the surface mount is directly mounted to the mount, the surface mount is not functioning as an equipment interface and may include an adaptor mounted to the body of the surface mount to secure a piece of equipment. The piece of equipment may incorporate the equipment interface such as a tongue and groove interface. The piece of equipment, the surface mount, and the mount would work as one unit. A mount fastener attaches the mount to the surface mount.

In yet another example of an equipment interface a Sequal Eclipse mount may be used to mount a Sequal Eclipse piece of equipment (not shown). Weight saving holes are place throughout the Sequal Eclipse mount to save weight and material. Constraint tabs and a constraint arm are used to keep the Sequal Eclipse equipment from moving and secure the Sequal Eclipse equipment to the Sequal Eclipse mount. A pair of individual tie down mounts are coupled to a tie down to capture the Sequal Eclipse equipment in the Sequal Eclipse mount. One of the tie down mounts may be attached to a tie down mast that elevates the tie down mount above the Sequal Eclipse equipment. A cord holder with an access window is positioned below a deck where the Sequal Eclipse equipment rests on. The cords from the Sequal Eclipse equipment are stored in the card holder and are accessible through the access window. Sequal Eclipse fasteners are shown and used to secure the Sequal Eclipse equipment to the Sequal Eclipse mount. For example, six Sequal Eclipse fasteners may be used but they are not limited to six.

In another embodiment, if the Sequal Eclipse mount is directly mounted to the mount, the Sequal Eclipse mount is not functioning as an equipment interface. The piece of equipment, the Sequal Eclipse mount, and the mount would work as one unit. A mount fastener attaches the mount to the Sequal Eclipse mount.

In yet another example of an equipment interface an equipment holder may be used to hold portable equipment that is not mounted to the mount/track. For example, a portable ultrasound machine, thermometer, calculator, etc. may be held in place by the equipment holder. The equipment holder comprises a body with two retention tabs, two sidewalls, and a floor. The floor and the sidewalls retain the piece of equipment in the equipment holder. A hole is centered in the floor to facilitate weight savings and to allow the passage of cords or other devices through the body. The two retention tabs constrain any upper lateral movement of the piece of equipment.

In another embodiment, if the equipment holder is directly mounted to the mount, the equipment holder is not functioning as an equipment interface. The piece of equipment, the equipment holder, and the mount would work as one unit. In yet another embodiment, a mount fastener may be used to attach the equipment holder directly to the track without the need for a mount. An example of this technology may be found in FIG. 22. A pull pin is biased in a retention position by a spring and an offset frame. The pull pin has a head that may mimic the shape of the mounting stud to allow the equipment holder to be secured to track, or to a fixed position plate. The offset frame may be used to provide a pressure surface to counteract the pressure exerted by the spring on the head when the head is engaged with the track. The offset frame also provides an offset from the track so the pressure is not exerted directly on the body of the equipment holder.

Focusing now on the mounting studs, another embodiment may include a single track stud. The single track stud is used to mount a piece of equipment to the track 10 of FIG. 1 mounted in a structure or vehicle. The single track stud comprises a mount head, a retaining collar, and a collar. The mount head is circular is shape with a threaded body extending from its center. The retaining collar and friction collar are rotated onto the threaded body. The collar has a collar engagement surface. The mount head has a mount head engagement surface. When the mount head is inserted into the track 10, the collar, may be rotated in a clockwise direction to enable the collar engagement surface and the mount head engagement surface to apply pressure to the track 10 to secure the single track stud from moving on the track 10.

The single track stud is a versatile stud that enables a variety of configurations of single track stud locations on the piece of equipment. The only limitation to those configurations is that the single track stud locations must align with the slots (i.e. 20, 25, 30) and open regions 35 on the track 10. When the single track stud is secured to the piece of equipment, the retaining collar is rotated counter clockwise to apply pressure against the piece of equipment to ensure the threaded body does not rotate out of the piece of equipment during use. The single track stud may include a spring to provide the biasing force needed to apply the pressure against the track 10.

Figure 10A:
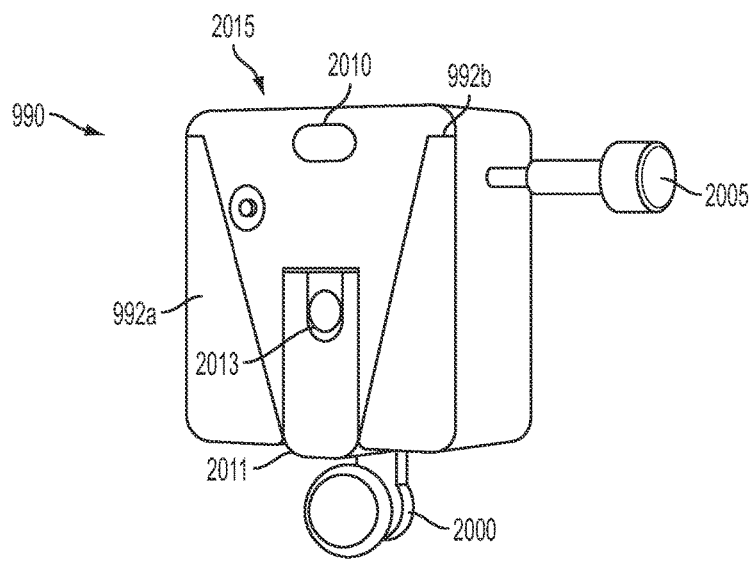
FIGS. 10A and 10B depict a universal adaptor according to one or more embodiments shown and described herein.
Figure 10B:
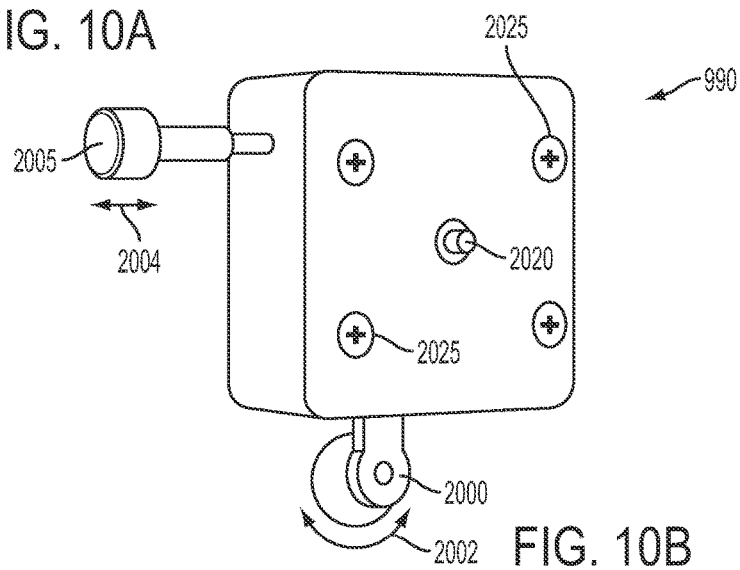

FIGS. 10A and 10B, depict another embodiment of the adaptor as a universal adaptor 990. A receiver groove 2015 may allow the universal adaptor 990 to sliceable couple with a piece of equipment or other item with a tongue 2026 of FIG. 10C that corresponds to the receiver groove 2015. The receiver groove 2015 is bounded by a plurality of guides 992a and 992b. The plurality of guides 992a and 992b matedly couple with the tongue 2026 and mimic a tongue and groove coupler. A receiver equipment lock 2010 secures the tongue 2026 to the universal adaptor 990. A receiver equipment release 2005, when actuate as shown by the arrows 2004, disable the receiver equipment lock 2010 to allow the piece of equipment or tongue 2026 to be slidably decoupled from the universal adaptor 990. A receiver locking pin 2020 may be biased (e.g., by a spring, resilient material, or other biasing means) outward towards an extended, lock position for engaging the associated track 10, and more specifically the corresponding locking pin aperture 60 on the track 10. The receiver locking pin 2020 may be retracted using a receiver mount release 2000. A plurality of receiver studs 2025 may extend outwardly from one side of the universal adaptor 990. The plurality of receiver studs 2025 may operate similarly to the mounting studs 140 of FIG. 7 to secure the universal adaptor 990 to the track 10, fixed position plate 130, or similar mounting surface. The receiver mount release 2000 actuates the snubber function as described below. The snubber function is actuated along the arrows 2002.

Figure 10C:
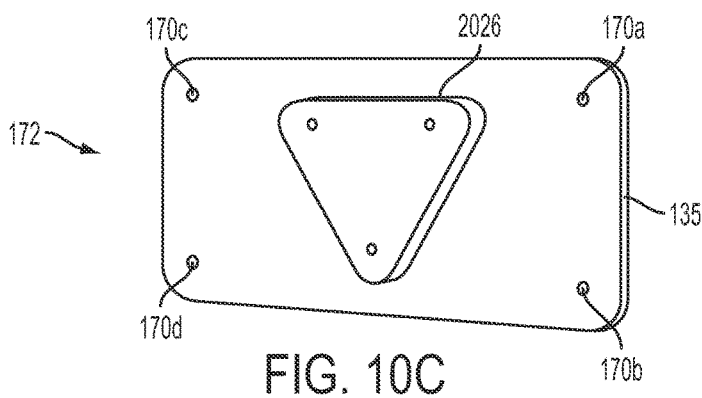
FIG. 10C depicts another embodiment of the equipment interface according to one or more embodiments shown and described herein.

FIG. 10C depicts another embodiment of the equipment interface 172. Equipment mounting apertures 170a, 170b, 170c, and 170d may be used to secure a piece of equipment to the equipment interface 172. The tongue 2026 is configured to releasably couple with the receiver groove 2015 of FIG. 10A.

Figure 11:
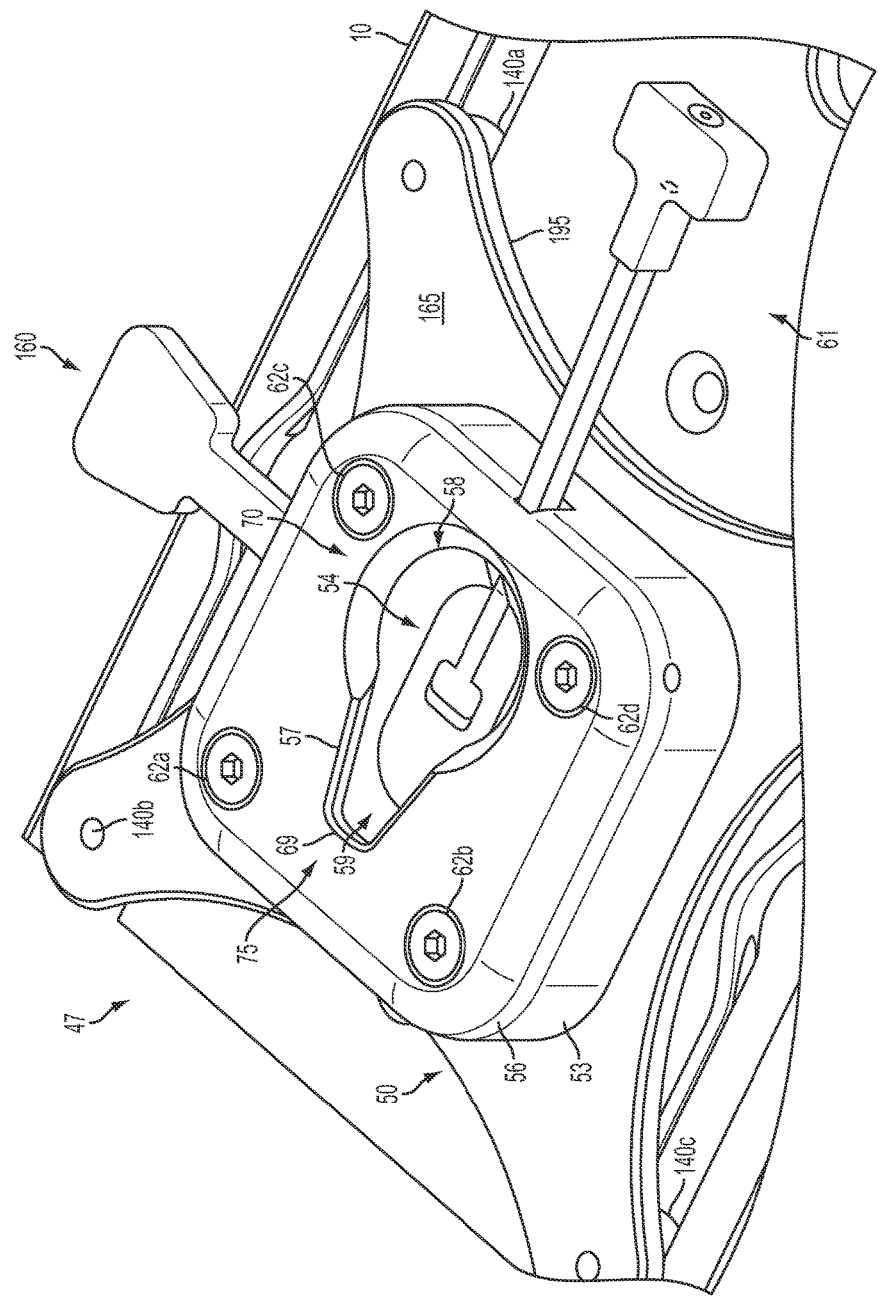
FIG. 11 depicts a wedge mount of a self-aligning mounting system according to one or more embodiments shown and described herein.

FIG. 11 depicts wedge mount 47 of a self-aligning mounting system. The wedge mount includes the mounting plate 135, the back surface 165, the front surface 195, and four mounting studs 140a, 140b, 140c, and 140d (not shown). The back surface 165 is on the opposite side of mount 50 from the front surface 195. A first collar 53 is coupled to the back surface and includes a bowl aperture 54. A capture plate 56 is coupled to the first collar 53 and includes a keyhole slot aperture 57 that partially covers the bowl aperture 54. The keyhole slot aperture 57 has a narrow end 75 and a wide end 70. The bowl aperture 54 and the keyhole slot aperture 57 define a landing area 58 and a capture area 59. The landing area 58 is defined as where the keyhole slot aperture 57 and the bowl aperture 54 are about the same size and the capture area 59 is defined as where the keyhole slot aperture 57 is smaller than the bowl aperture 54. A wedge release 61 is coupled to the first collar 53 and a wedge bias spring 102 (FIG. 13) is coupled between the first collar 53 and the wedge release 61 to bias the wedge release 61 in a locked position. At least one mounting stud (i.e. 140a, 140b, 140c, and 140d) is coupled to the front surface 195, each mounting stud includes a stem portion that extends outwardly from the back surface 168 and an enlarged head portion disposed at a distal end of stem portion. A locking pin release 160 is coupled to the mount 50 and, referring to FIG. 7, includes a locking pin 155 disposed through the mounting plate 135 and extending outwardly from the back surface 165 in an extended position. A spring 720 biases the locking pin 160 in the extended position and at least one locking pin released 160 operatively coupled to the locking pin 160 and when actuated, retracts the locking pin 160 into the mounting plate 135 in a retracted position and when released, allows the spring 720 to bias the locking pin 160 in the extended position.

Figure 12:
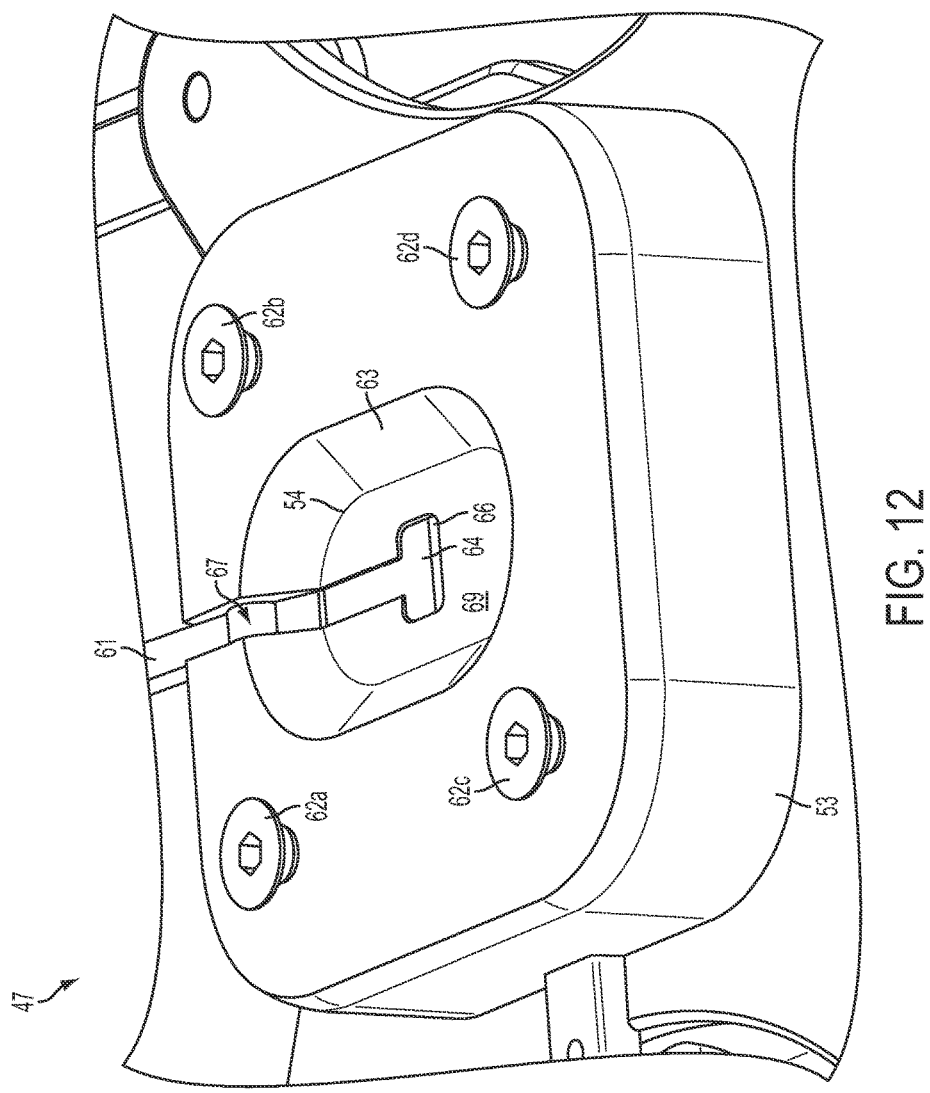
FIG. 12 depicts the first collar of the wedge mount according to one or more embodiments shown and described herein.

Referring to FIGS. 11 and 12, one or more fastening devices 62a, 62b, 62c, and 62d, may be used to secure the capture plate 56 and first collar 43 to the mounting plate 135. The fastening devices 62a, 62b, 62c, and 62d may also be used to secure the locking pin release 160 and associated parts to the mounting plate 135. Although four fastening devices 62a, 62b, 62c, and 62d are shown, it should be understood that more or less number of fastening devices may be used. The mount 50, as shown, is in a "X" shape that aids in weight reduction and also in observing the engagement of the one or more mounting studs 140 with the slots (20, 25, and 30) of the track 10. The wedge mount 47 may be mounted as an adaptor as described above instead of the structure associated with the second mounting plate 225.

FIG. 12 illustrates the first collar 53 of the wedge mount 47. The wedge release 61 has a blade 64 that used to increase the surface area of the engagement surface 66. This increase area aids in retaining a wedge interface 72 (FIG. 14) within the bowl aperture 54 and underneath the capture plate 56. The wedge release 61 pivots around a pivot point 67. Referring back to FIG. 11, the wedge release 61 has a handle 68 to aid in actuating the wedge release 61 between an unlocked position and a locked position. The bowl aperture 54 has a plurality of guide walls 63 that are used to center the wedge interface 72 when it is placed within the bowl aperture 54. The guide walls 63 surround the bowl aperture 54 and may be of any inclination to facilitate the centering of the wedge interface 72.

Figure 13:
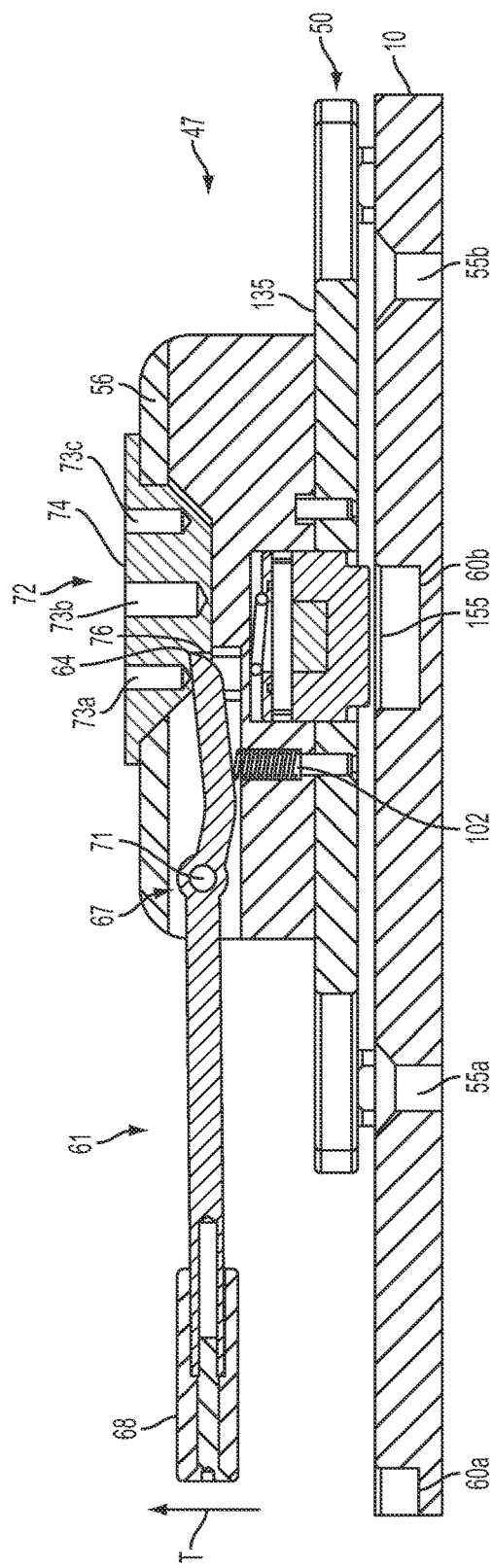
FIG. 13 depicts a cross-sectional view of the wedge mount according to one or more embodiments shown and described herein.

FIG. 13 depicts a cross-sectional view of the wedge mount 47 where the cross-section is taken right down the center of the center slot 25 of FIG. 1 of the track 10. The wedge interface 72 is shown seated in the wedge mount 47 with the wedge release 61 in the locked position. The wedge released 61 is biased into the locked position by the wedge bias spring 102. The blade 64 engages an engagement trough 76 in an equipment plate 74 of the wedge interface 72. The pivot point 67 is shown with a pin 71 used as the fulcrum point. The handle 68 would be actuated in an upward direction along arrow T to actuate the wedge release 61 from the locked position to the unlocked position. In the unlocked position, and referring to FIG. 12, the blade is flush with a bottom surface 69 of the bowl aperture 54. Comparing FIG. 12 to FIG. 13, the capture plate 56 provides a protective cover for the pivot point 67 of the wedge release 61. Mounting holes 55a and 55b are shown in the center slot 25 of the track 10, alternating with the locking pin apertures 60a and 60b. The wedge interface 72 may have one or more fastening aperture 73a, 73b, and 73c in the equipment plate 74.

Referring to FIGS. 13 and 7, FIG. 13 is the viewed perpendicularly to FIG. 7. The locking pin 155 is shown in the retracted position in FIG. 13 whereas the locking pin 155 is shown in the extended position in FIG. 7

Figure 14:
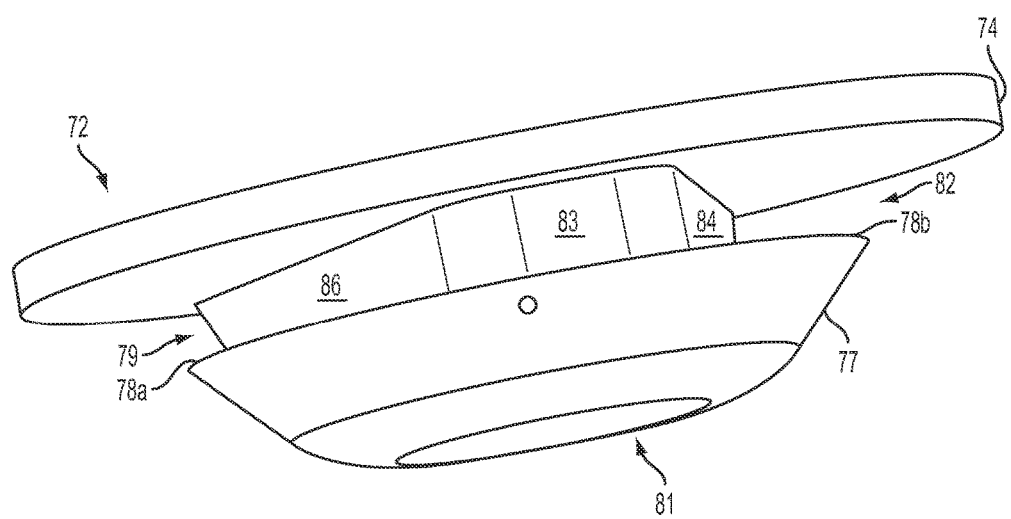
FIG. 14 depicts a front view of a wedge interface according to one or more embodiments shown and described herein.

FIG. 14 depicts a front view of the wedge interface 72. The wedge interface 72 may include the equipment plate 74, a bowl 77, a plurality of capture guides 78a and 78b, and a wedge 79. The equipment plate 74 provides the mounting point for securing the wedge interface 72 to a piece of equipment (not shown). The equipment plate 74 also provides one of two barriers to capture the keyhole slot aperture 57 of the capture plate 56 as shown in FIG. 11. The other barrier is the plurality of capture guides 78a and 78b. The capture space 82, between the equipment plate 74 and the plurality of capture guides 78a and 78b has a tolerance to allow the wedge interface 72 to slidably couple with the capture plate 56 and not allow a lot of undue motion between the wedge interface 72 and the capture plate 56. The wedge 79 is situated between and couples the equipment plate 74 and the plurality of capture guides 78a and 78b together. The wedge 79 has a lead-in surface 83 which is configured to engage the keyhole slot aperture 57 and aid in rotational alignment of the wedge interface 72 and the wedge mount 47. In other words, the lead-in surface 83 is configured to rotational align the wedge interface 72 and the wedge mount 47 by ensuring the lead-in surface 83 is the only part of the wedge interface 72 that may enter the capture area 59 of the keyhole slot aperture 57. The wedge 79 also includes a first incline surface 84 and a second incline surface 85. The first incline surface 84 and the second incline surface 85 are opposite each other and are coupled to the lead-in surface 83.

Figure 15:
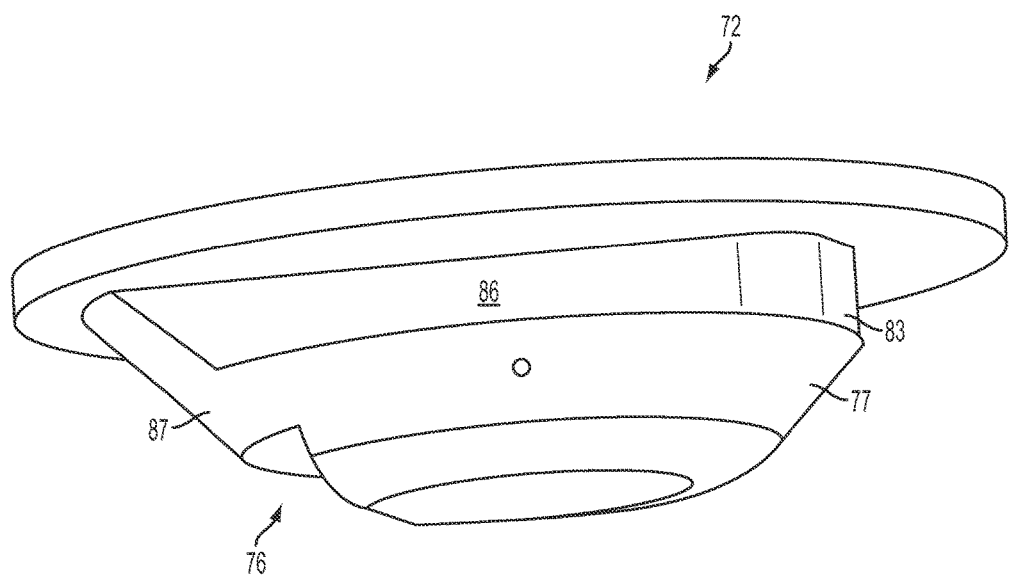
FIG. 15 depicts a side view of the wedge interface according to one or more embodiments shown and described herein.

FIG. 15 is a side view of the wedge interface 72. The engagement trough 76 is shown as a notch on the bowl 77. The exit surface 87 has a slope that follows the same angle of the slope of the bowl 77. The slope allows the bowl 77 to center the wedge interface 72 in the landing area 58 as shown in FIG. 11.

A method to secure a piece of equipment to a wall may include securing a medical device (not shown) to a wedge interface 72. The wedge interface 72 may include an equipment plate 74, a bowl 77 with a plurality of capture guides 78a and 78b, and a wedge 79 coupled between the equipment plate 74 and the bowl 77. A track 10, the minitrack 12, or quick mount track 11 may be coupled to a wall (not shown) or other surface or structure. The mounting of a wedge mount 47 to the track 10 or 11 may be done by aligning one or more mount studs 140a, 140b, 140c, and 140d on the wedge mount 47 with one or more diamond contoured target regions 13 and slidably coupling the wedge mount 47 to a locked position where a locking pin 155 engages a locking pin aperture 60. The wedge mount 47 with an back surface 165 and a front surface 195. The wedge mount 47 includes a first collar 53 coupled to the front surface 195 and includes a bowl aperture 54, a capture plate 56 coupled to the first collar 53 and includes a keyhole slot aperture 57 with a wide end 70 and a narrow end 75 that partially covers the bowl aperture 54, the wide end 70 of the keyhole slot aperture 57 and corresponding bowl aperture 54 define a landing area 58 and the narrow end 75 of the keyhole slot aperture 57 and corresponding bowl aperture 54 define a capture area 59. A wedge release 61 is coupled to the first collar 53. A wedge bias spring 102 is coupled between the first collar 53 and the wedge release 61 to bias the wedge release 61 in a locked position. At least one mounting stud 140a, 140b, 140c, and 140d, are coupled to the back surface 165, each mounting stud 140a, 140b, 140c, and 140d may include a stem portion that extends outwardly from the back surface 165 and an enlarged head portion disposed at a distal end of stem portion. Aligning the wedge interface 72 to the wedge mount 47 is accomplished by pressing the bowl 77 into the landing area 58 through the wide end 70 of the keyhole slot aperture 57 and into bowl aperture 54 and allowing a plurality of guide walls 63 of the bowl aperture 54 to engage a plurality of sloped sides of the bowl 77 which force the wedge interface 72 into alignment with the wedge mount 47. Coupling of the equipment plate 74 with the wedge mount 47 is accomplished by slidably moving the wedge 79 of the equipment plate 74 into the capture area 59 at the narrow end 75 of the keyhole slot aperture 57 until the capture plate 56 is secured between the equipment plate 74 and the plurality of capture guides 78. Locking the wedge interface 72 into the wedge mount 47 is accomplished by the wedge bias spring 102 biasing the wedge release 61 in the locked position. Unlocking the wedge interface 72 from the wedge mount 47 is accomplished by actuating the wedge release 61 into an unlocked position and uncoupling the wedge interface 72 from the wedge mount 47 by slidably moving the wedge 79 of the wedge interface 72 out of the narrow end 75 of the keyhole slot aperture 57 until the capture plate 56 is in the wide end 70 of keyhole slot aperture 57. Removing the wedge interface 72 and hence the piece of equipment from the wedge mount 47 is accomplished by pulling the bowl 77 out of the bowl aperture 54. It is to be noted that vision of the alignment of the bowl 77 and landing area 58 is not required. The sloped surface or sides of the bowl 77 allow the wedge interface 72 to center itself and the piece of equipment in the landing area 58. The capture plate 56 also has a set of sloped surface surrounding the keyhole slot aperture 57 that further guide the bowl 77 into the landing area 58.

Figure 16A:
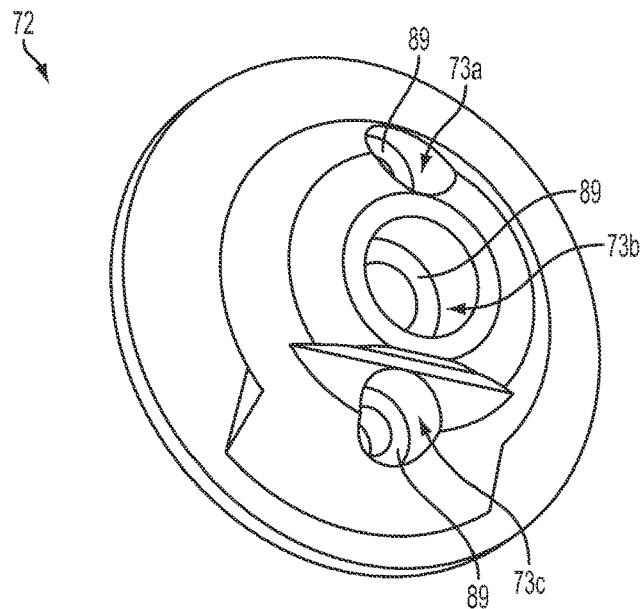
FIG. 16A depicts an isometric view of the wedge interface according to one or more embodiments shown and described herein.

FIG. 16a depicts an isometric view of the wedge interface 72. The one or more fastening apertures 73a, 73b, and 73c may have a taper or ledge 89 to them to allow a fastening device, described above, to secure the wedge interface 72 to the piece of equipment.

Figure 16B:
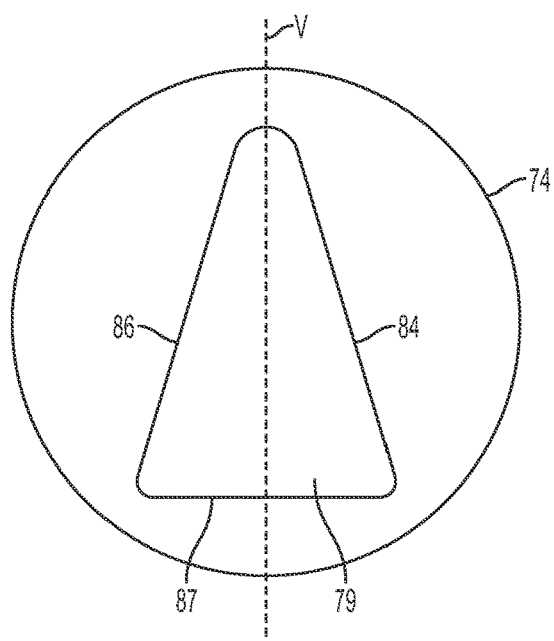
FIG. 16B depicts a bottom view of the wedge interface with a bowl removed according to one or more embodiments shown and described herein.

FIG. 16b depicts a bottom view of the wedge interface 72 with the bowl 77 removed. The first incline surface 84 and the second incline surface 85 provide in increasing or decreasing thickness of the wedge 79 as you move along the vertical axis V. The shape of the wedge 79 may about match the shape of the keyhole slot aperture 57 in the capture area 59 as shown in FIG. 11. Therefore, as the wedge 79 is inserted into the capture area 59, either the first incline surface 84 or the second incline surface 85 will contact the keyhole slot aperture 57 first and provide a momentum to rotate the wedge interface 72 to align the wedge 79 with the narrow end 75 of the keyhole slot aperture 57. When the wedge interface 72 is seated and the wedge release 61 is in the locked position, the first incline surface 84 and the second incline surface 85 will contact both sides of the narrow end 75 of the keyhole slot aperture 57. A contact surface 81 will contact the bottom 69 of the bowl aperture 54. An exit surface 87 is wider than the lead-in surface 83 and wider than the narrow end 75 of the keyhole slot aperture 57.

Figure 17:
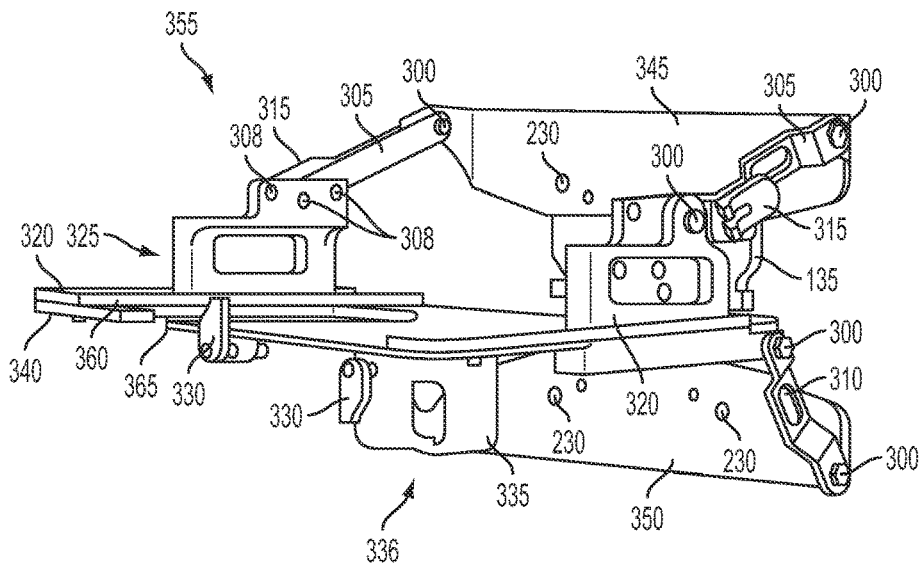
FIG. 17 depicts a folding tray in a use position according to one or more embodiments shown and described herein.
Figure 18:
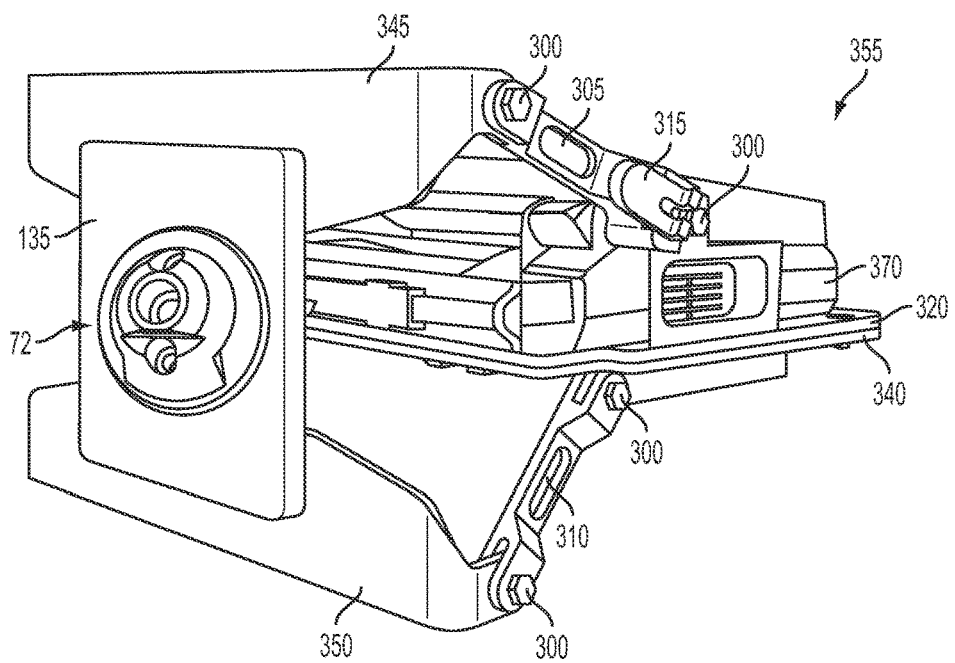
FIG. 18 depicts another isometric of the folding tray in the use position according to one or more embodiments shown and described herein.

FIGS. 17 and 18 are isometric views of a folding tray 355. The folding tray 355 incorporates a tray 340 which may be moved between a storage position, parallel to the mounting plate 135 and a use position, perpendicular to the mounting plate 135. The tray 340 may hold, secure, and/or support items or equipment such as, for example, a lap top computer. When in the use position, the tray 340 may position the equipment such that a user may operate the equipment. When in the store position, the tray 340 is positioned such that both the equipment and itself are oriented parallel with the mounting plate 135 and thus in a more compacted position.

FIGS. 17 and 18 depict the folding tray 355 in the use position. Two sets of upper arms 305 and lower arms 310 are connected to an upper support 345 and a lower support 350 via a set of hinges 300. The upper arms 305 and lower arms 310 are connected to the tray 340 via a set of hinges 300 and are used to support the tray 340 in both the storage and use positions. A left and right slot 325 are affixed to the upper portion 360 of the tray 340 and are used in conjunction with a pair of cams 330 and a pair of non-skid pads 320 to secure a piece of equipment 370. The pair of non-skid pads 320 may be used to keep the piece of equipment 370 in place through a friction fit between the pair of non-skid pads 320 and the slot 325. The pair of non-skid pads 320 also have a dynamic modulus that allows for the absorption of vibrations transmitted through the folding tray 355. A set of lock tabs 315 are used to prevent the upper arms 305 and lower arms 310 from moving from the storage to the use position and vice versa. A guide element 335 is attached to a lower portion 365 of the tray 340. In this non-limited embodiment, the guide element 335 is an oblong piece with an open slot 336 to allow for the insertion of cords or other items. The upper support 345 and lower support 350 are secured to the mounting plate 135 of the mount 50 via four fasteners 230. In this non-limiting embodiment, the fasteners 230 are bolts used to secure the folding tray 355 to the mounting plate 135. The upper and lower support 345 and 350 respectfully may be adjusted to allow for different angles of the tray 340 from perpendicular to the mounting plate 135 by moving hinge 300 to a different adjustment hole 308.

The mounting plate 135 may have a variety of equipment interfaces attached as well as mounting studs and locking pin 155 as shown in FIG. 3. In FIG. 18, the wedge interface 72 is shown coupled to the mounting plate 135 for releasably coupling with a wedge mount 47 as shown in FIG. 11.

Figure 19:
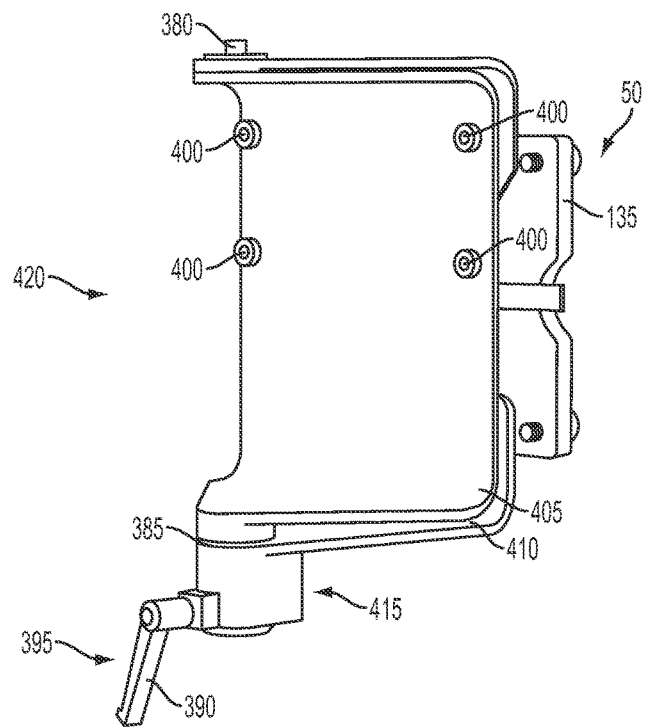
FIG. 19 depicts an isometric view of a swivel mount according to one or more embodiments shown and described herein.
Figure 20:
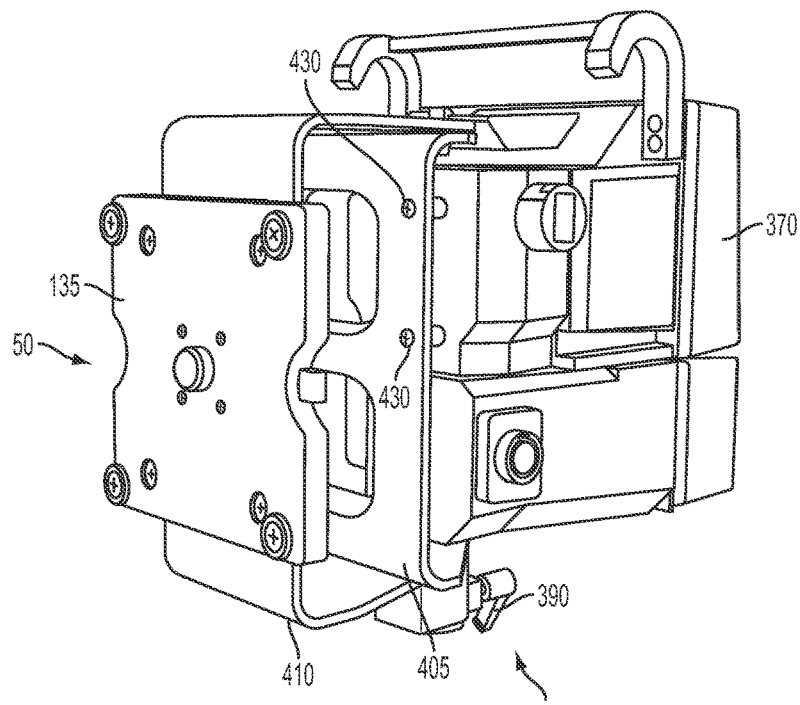
FIG. 20 depicts another isometric view of the swivel mount according to one or more embodiments shown and described herein.

FIGS. 19 and 20 are isometric views of a swivel mount 420. The swivel mount 420 comprises a swivel body 405 and a swivel frame 410. The swivel frame 410 is attached to the mounting plate 135 of the mount 50. The swivel frame 410 connects to the swivel body 405 through two hinges, an upper hinge 380 and a lower hinge 385, axially aligned along a longitudinal axis. The upper hinge 380 and the lower hinge 385 may allow the swivel body 405 to rotate up to 360 degrees in the swivel frame 410 about the longitudinal axis. The swivel body 405 may be locked from rotating via a lock body 415. The lock body 415 is a friction lock and comprises a threaded rod (not shown) that applies friction to the lower hinge 385 when a lock handle 390 is rotated. When friction is applied to the lower hinge 385, the swivel body 405 is held in place in an angular position relative to the swivel frame 410, enabling the swivel body 405 to be locked in any angular position about the longitudinal axis. Four swivel mounting holes 400 are located in the swivel body 405. The swivel mounting holes 400 are used to secure a piece of equipment 425 to the swivel body 405 via any fastening device 430 such as those set forth herein.

Figure 21:
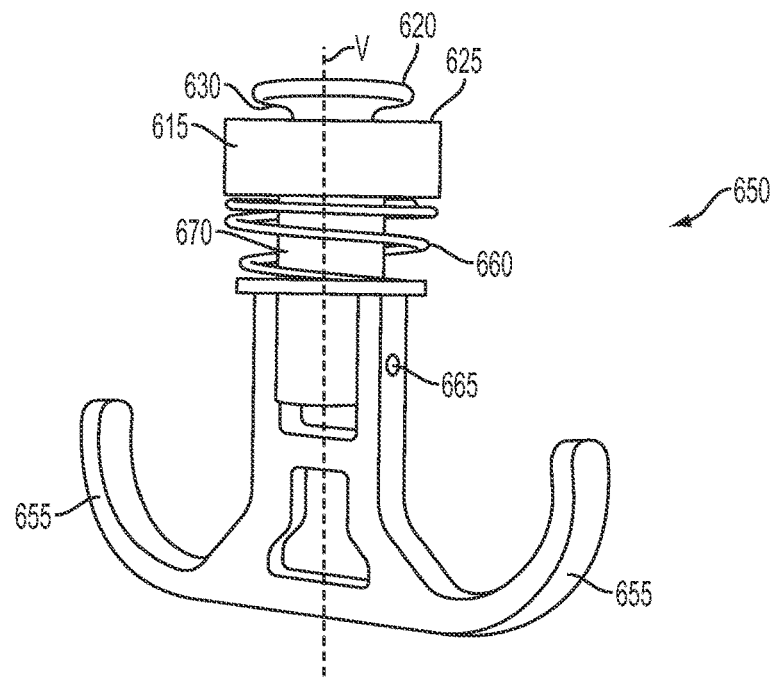
FIG. 21 depicts an overhead IV hook in a use position according to one or more embodiments shown and described herein.

FIG. 21 depicts an overhead IV hook 650 in a use position. The overhead IV hook 650 has two IV hooks 655. They are connected to a central shaft 670 via a locking hinge 665. The locking hinge is able to lock the two IV hooks 655 in either the use position or a storage position as shown in FIG. 21B. The locking hinge locks by a ball bearing biased into an indentation in a rotational element of the hinge, or by a tight fit within the hinge to cause friction to maintain the current position of the overhead IV hook 650. A release spring 660, the collar 615, and the central shaft 670 are co-axially aligned along a vertical axis V. The release spring 660 is biased between the locking hinge 665 and the collar 615. The central shaft 670 is connected to the mount head 620. The overhead IV hook 650 is pressed against the track (e.g., track 10, FIG. 1) and aligned with one of the mounting holes (e.g., mounting holes 55, FIG. 1) on the track. As the overhead IV hook 650 is pressed against the track, the collar 615 compresses the release spring 600, the mount head 620 protrudes into the mounting holes and the overhead IV hook 650 is slid down into the necked down portion (not shown) and released. The collar engagement surface 625 and the mounting head engagement surface 630 clamp the track and secure the overhead IV hook 650 into place.

Figure 22:
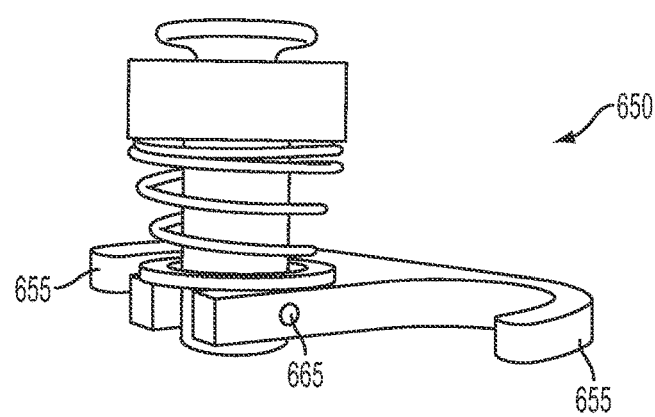
FIG. 22 depicts the overhead IV hook in the storage position according to one or more embodiments shown and described herein.

FIG. 22 depicts the overhead IV hook 650 in the storage position, e.g., the IV hooks 655 are rotated into a position parallel to the mounting plate (not shown). The locking hinge 665 maintains the storage position until moved to the use position (FIG. 21). In another embodiment, the IV hook 655 may be a utility hook, a tie down ring, a cleat, an eyelet, or a hook and loop fastener.

Figure 23A:
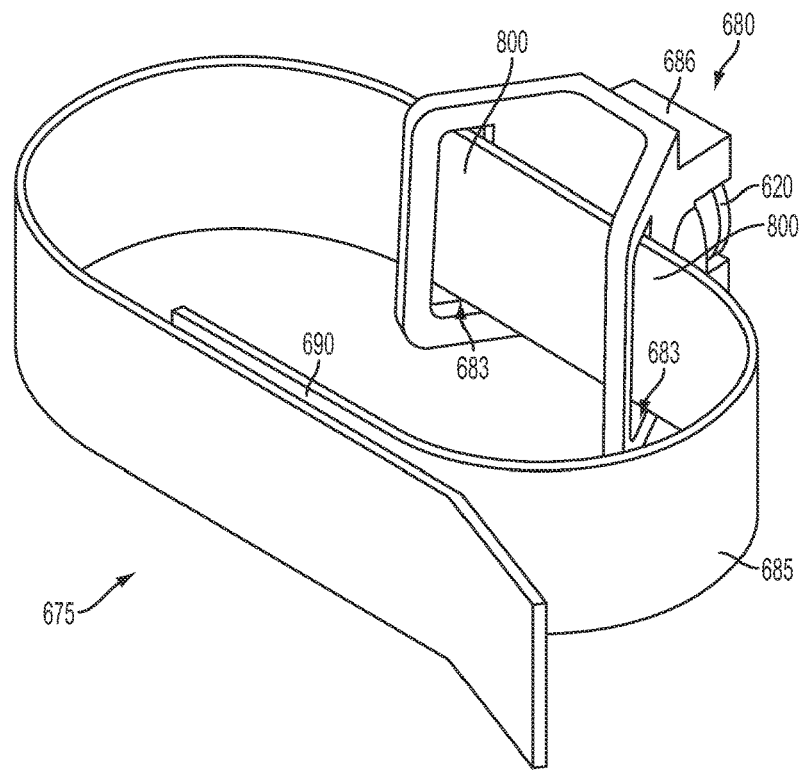
FIGS. 23A and 23B depicts an IV bag Velcro® wrap according to one or more embodiments shown and described herein.
Figure 23B:
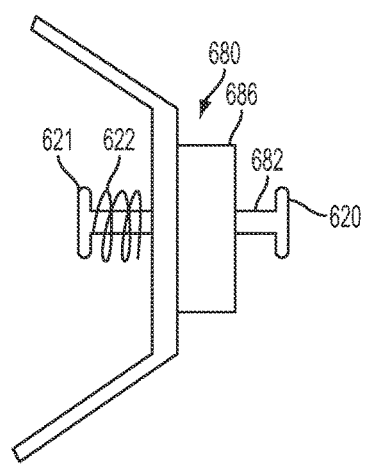

FIGS. 23A and 23B depict an IV bag Velcro® wrap 675 with a belt mount 680 and a belt 685. The belt 685 is threaded through two loop holes 800 to attach the belt 685 to the belt mount 680. The belt mount 680 may include a shaft aperture disposed through the belt mount 680, at least one belt loop aperture 683, and a plurality of pressure arms 686 which are substantially parallel to each other. A second mount head 620 is coupled to a distal end a second shaft 682. A tab head 621 is coupled at the proximal end of the second shaft 682, the second shaft 682 is situated through the shaft aperture. A second bias spring 622 is coupled between the tab head 621 and belt mount 680, the second bias spring 622 biases the second mount head 620 against the belt mount 680. The belt 685 is coupled through the at least one belt loop aperture 683 and used to secure an IV bag (not shown) wherein the second bias spring 622 is compressed by actuating the tab head 621 towards the belt mount 680 which will extend the second mount head 620 out past the plurality of pressure arms 686 and allow the IV bag Velcro® wrap to slidably engage a slot (20, 25, and/or 30) on the track 10.

The belt 685 can be made from any type of pliable material to include leather, rope (natural or synthetic), plastic products such as polymers, vinyl or rubber, and metal products such as thin aluminum band. The belt 685 is looped upon itself and secured using a secure strip 690. In one embodiment, the secure strip 690 may be hook and loop (e.g., Velcro®) and can also be other types of fasteners such as buttons, snaps, etc. The IV bag Velcro® wrap 675 is used in conjunction with or without the overhead IV hook found in FIGS. 21 and 22. The IV bag Velcro® wrap is used to secure an IV bag (not shown) from hanging loosely. The overhead IV hook 650 may be part of a kit including the track 10 from FIG. 1, the minitrack 12 of FIG. 38, or a quick mount track 11 from FIG. 28A, the IV bag Velcro® wrap 675, and the overhead IV hook 650.

Figure 24:
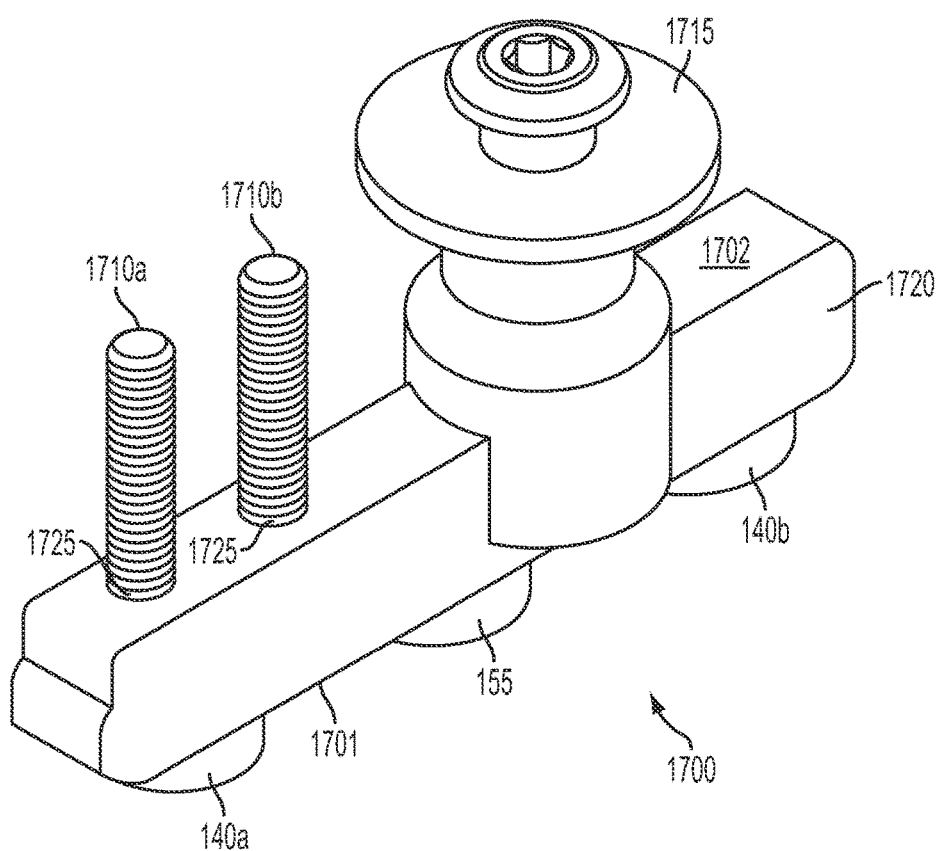
FIG. 24 depicts an equipment track mount according to one or more embodiments shown and described herein.

FIG. 24 depicts an equipment track mount 1700 including a rail 1720 with a track side 1701 and an equipment side 1702, a plurality of mount studs 140a and 140b coupled to the rail 1720. Individual ones of the plurality of mounting studs 140a and 140b may include a stem portion that extends outwardly from the track side 1701 and an enlarged head portion disposed at a distal end of respective stem portions. One or more threaded rods 1710a and 1710b coupled to the equipment side 1702, a locking pin 155 is disposed through the rail 1720 and extending outwardly from the track side 1701 in an extended position. A lock bias spring (not shown) is used to bias the locking pin 155 in the extended position. A control knob 1715 is coupled to the equipment side 1702 and operatively coupled to the locking pin 155 and when actuated, retracts the locking pin 155 into the rail 1720 and when released, allows the lock bias spring to bias the locking pin 155 in the extended position.

The equipment track mount 1700 is a universal mount that may be used on a variety of equipment to secure them to the equipment mounting system. The equipment track mount 1700 has two mounting studs 140a and 140b positioned on the rail 1720 to engage the first outer slot 20 and the second outer slot 30 of the track 10 of FIG. 1, the minitrack 12 of FIG. 38, or the quick mount track 11 of FIG. 28A. Alternatively, each mounting stud 140a and 140b is spaced evenly to enable the equipment track mount 1700 to be secured either vertically or horizontally on the track 10, the minitrack 12, or quick mount track 11. In one embodiment, the studs 1710 are threaded. The attachment points 1725 are areas of the rail 1720 where the attachment of a piece of equipment (not shown) is accomplished by fastening devices. In this embodiment, the stud 1710 is a threaded stud to allow the piece of equipment to be secured to the single track mount 700 by a nut.

Figure 25:
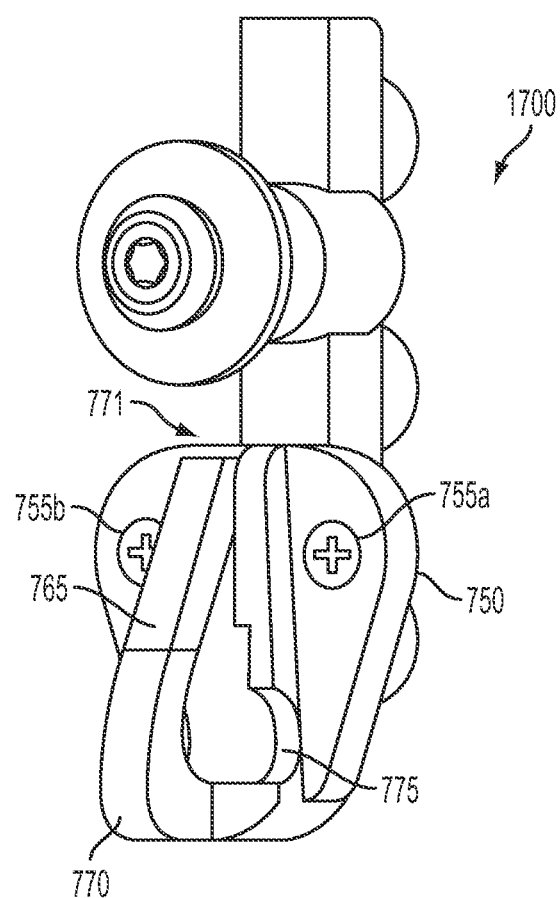
FIG. 25 depicts a retention hook according to one or more embodiments shown and described herein.

FIG. 25 depicts a retention hook 760 and equipment track mount 1700. A support plate 750 is attached the equipment track mount 1700 by screws 755a and 755b. The retention hook 760 a hook 770 and cradle 775 to capture and support the weight of an IV bag (not shown) or a strand of material just a handle of a bag or rope. A retention clip 765 is used to ensure the IV bag does not slip off the retention hook 760 and is hingedly coupled at base 771 of the hook 770. The retention hook 760 can suspend any item with a loop of correct size to slip over the retention hook 760 and fit under the retention clip 765 and in the cradle 775.

In another embodiment, a double mount plate (not shown) may be coupled to the threaded rods 1710*a* and 1710*b* of the equipment track mount 1700. The double mount plate may be a plate material that positions two or more retention hooks 760 side by side. This would allow more than one item to be hung or alternatively, allow for one heavy item to be hung by threading a strand of material through both hooks.

In yet another embodiment, a task light or lamp assembly may be secured to the equipment track mount 1700 and used to provide lighting in an enclosed area. The task light is attached to a lamp assembly mount via a clamp and a post (not shown) inserted into a flexible neck of the task light or lamp assembly. The lamp assembly mount is attached to the equipment track mount via the use of two nuts on the threaded rods 1710*a* and 1710*b*. The task light embodiment is not limited to a light. The flexible neck may allow the attachment of other instrument besides a light such as, for example, a magnifying glass, flashlight, mirror, reflector, or a clip or claw to hold another instrument.

Figure 26:
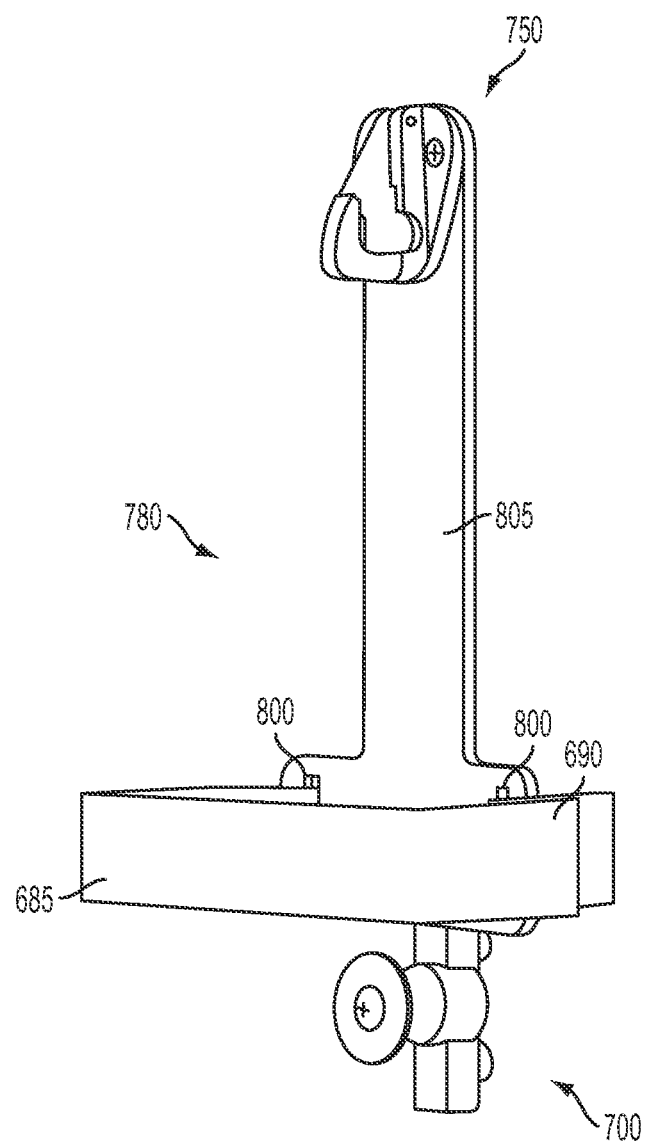
FIG. 26 depicts an IV bag mount according to one or more embodiments shown and described herein.

FIG. 26 depicts an IV bag mount 780 with a retention hook 760 at the top of a mast 805. The mast 805 may be attached to the belt mount 680 of the IV bag Velcro® wrap 675 from FIG. 23. The mast may be attached to the single track mount 700. The IV bag (not shown) is hung from the retention hook 760 and secured against the mast 805 via the belt 685 threaded through two loop holes 800 and the secure strip 690.

Figure 27:
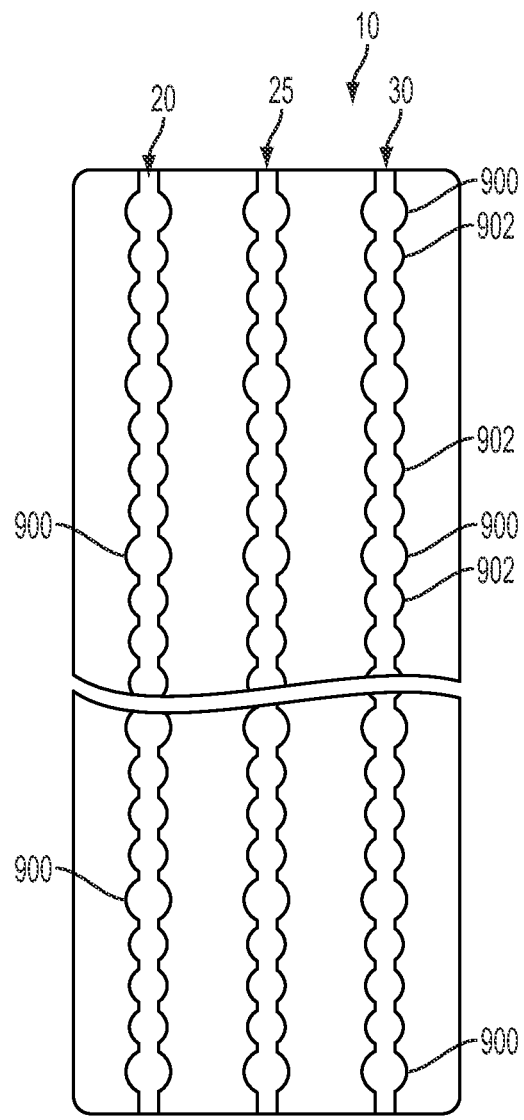
FIG. 27 depicts the track with a plurality of target open regions and non-target open regions according to one or more embodiments shown and described herein.

FIG. 27 depicts the track 10 with a plurality of target open regions 900 and non-target open regions 902. The first outer slot 20 and the second outer slot 30 may include the target open regions 900 to accommodate the mounting stud 140 of FIG. 3 or similar studs as for example the second mount head 620 of FIG. 21. In some embodiments, the target open regions 900 allow the mount 50 with a piece of equipment attached to it to slidably couple with the track 10 without the need for line of sight alignment of the mounting studs 140 with the open regions 35 of FIG. 1. The target open region 900 are larger in diameter and/or size than the non-target open regions 902, which allows for more variability in the orientation of the mount 50 to the track 10 and still enables the correct engagement between the track 10 and the mount 50. In alternative embodiments (not shown), the track 10 may not include the non-target open regions 902. It may include only a certain number of the target open regions 900 along slots 20 and 30 and a neck down region running between the certain number of target open regions 900. An example of this embodiment is found in FIGS. 28A and 28B.

Figure 28A:
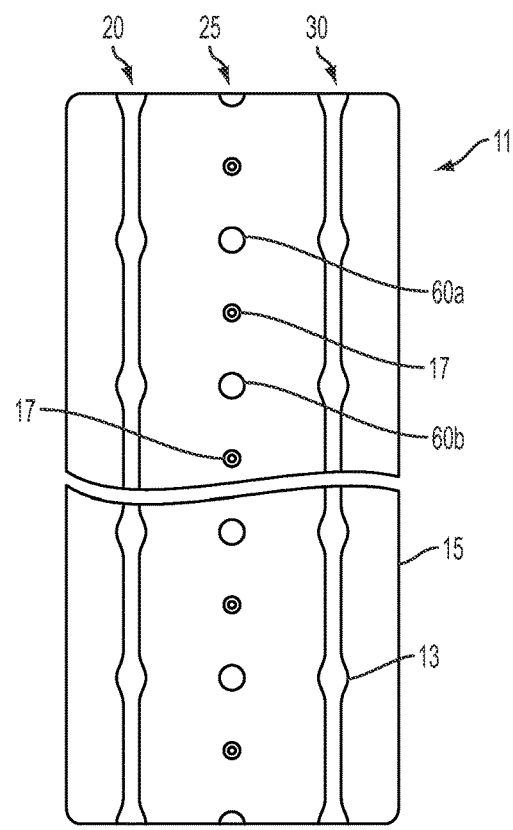
FIGS. 28A and 28B depicts a quick release track according to one or more embodiments shown and described herein.
Figure 28B:
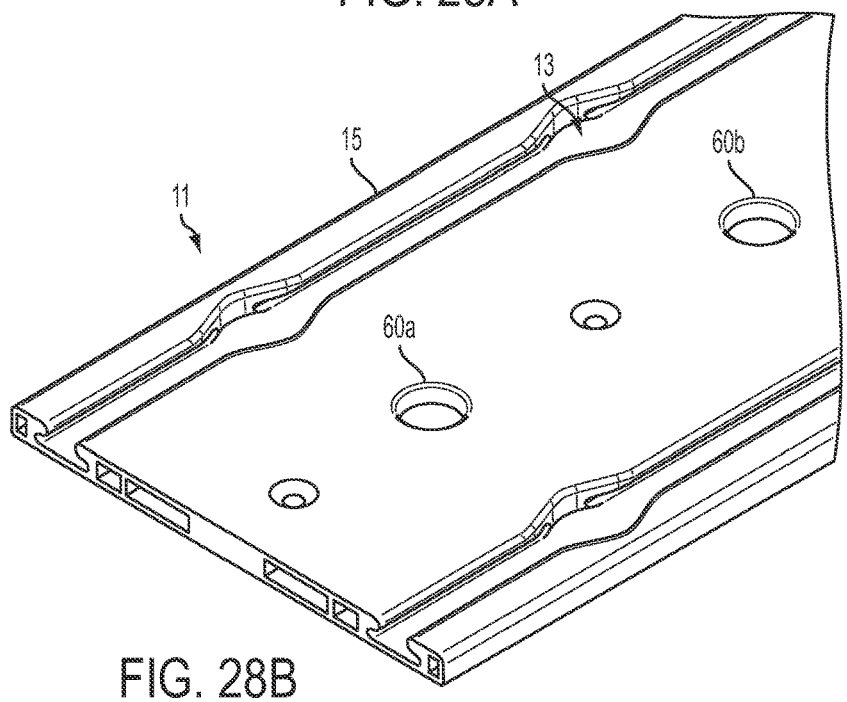

FIGS. 28A and 28B depict the quick mount track 11. The quick mount track 11 includes a backing plate 15 with a center slot 25, a first outer slot 20, and a second outer slot 30. The first outer slot 20 and the second outer slot 30 comprise a plurality of diamond contoured target regions 13 that allow a round head of a t-shaped stud or mounting stud 140 of FIG. 3 to engage the first outer slot 20 and the second outer slot 30 at an angle to the backing plate 15. The center slot 25 has a plurality of locking pin apertures 60 (e.g. 60*a* and 60*b*) in the backing plate 15. The locking pin apertures 60 are in horizontal alignment with the plurality of diamond contoured target regions 13. the plurality of diamond contoured target regions 13 allow a mount 50 of FIG. 3 to be mounted to the quick mount track 11 with a degree of misalignment that may come from the inability to see and align the mount 50 to the open regions 35 of the track 10 of FIG. 1. The mount 50 may be rotated slightly in relation to the quick mount track 11 and still the mounting studs 140 will engage the plurality of diamond contoured target regions 13. As the mounting studs 140 are inserted into plurality of diamond contoured target regions 13, the mount 50 will align to be parallel with quick mount track 11. In other words, the plurality of diamond contoured target regions 13 allow for some rotation in the mount 50 and still enable a successful engagement of the first outer slot 20 and the second outer slot 30.

Furthermore, the plurality of diamond contoured target regions 13 will allow for mount 50 to be inserted into the quick mount track 11 at an angle to the backing plate 15. In other words, a user may insert the mounting studs 140*a* and 140*b* into the first outer slot 20 first before rocking or aligning the mount 50 so that the mounting studs 140*c* and 140 *d* engage the second outer slot 30. This functionality allows for a user to mount a heavy or bulky piece of equipment with the need for a second user's help and allow for some misalignment (both rotation and angle) of the mount 50 in relation to the backing plate 15. The backing plate 15 may also have a plurality of mounting locations 17 to allow for fastening devices 3939 (FIG. 80) to secure the quick mount track 11 to a surface, wall, or structure.

Figure 29:
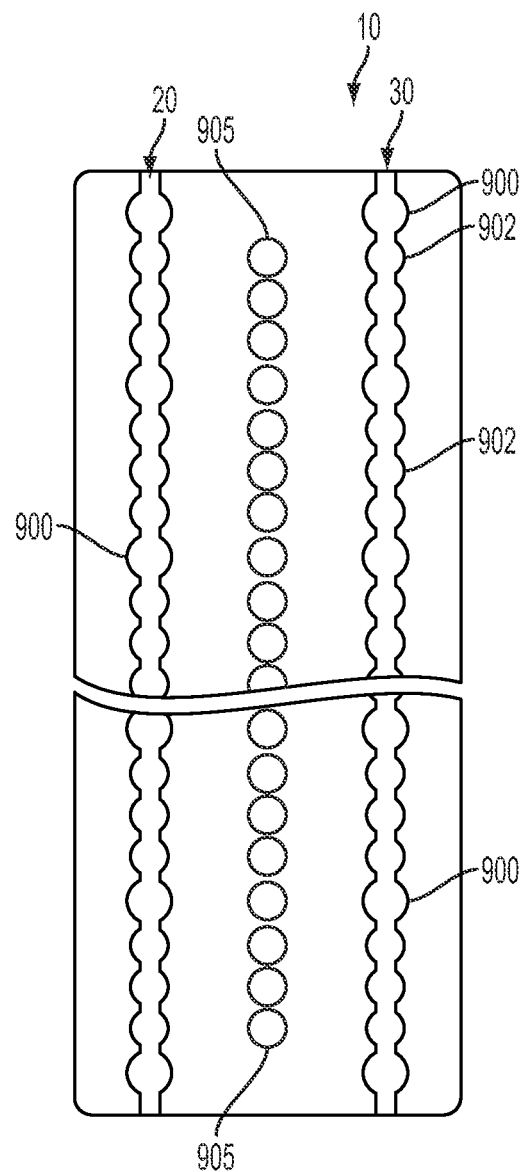
FIG. 29 depicts the track with a plurality of lock holes according to one or more embodiments shown and described herein.

FIG. 29 depicts the track 10 with a plurality of lock holes 905. The center slot 25 as shown in FIG. 1 may be replaced with the plurality of lock holes 905 to allow the locking pin 155 of FIG. 3 to slidably couple an individual lock hole 905 to secure the mount 50 to the track 10. In some embodiments, the first outer slot 20 and the second outer slot 30 may have the plurality of target open regions 900 as shown in FIG. 27, but they are not required or the plurality of diamond contoured target regions 13 as shown in FIGS. 28A and 28B.

Figure 30:
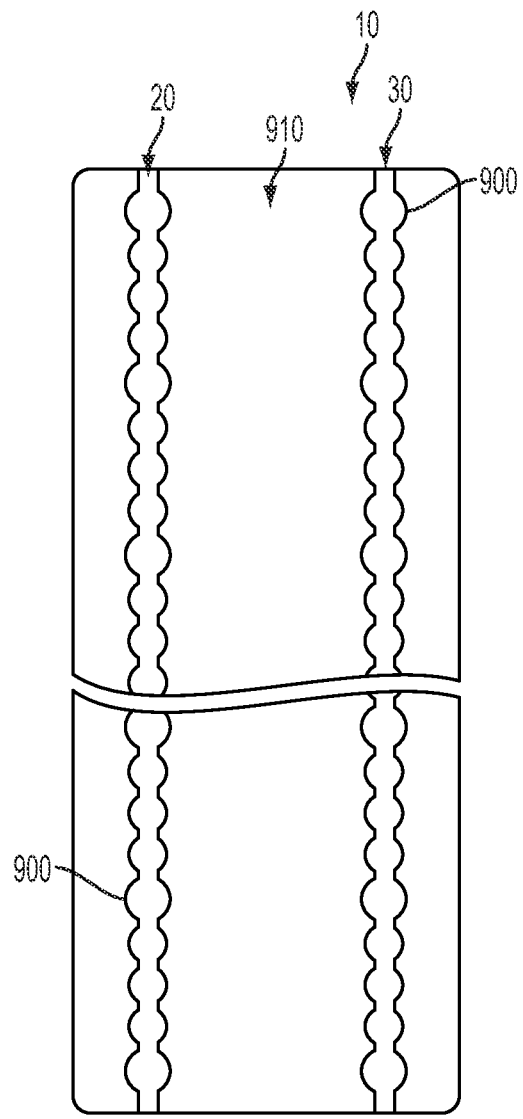
FIG. 30 depicts the track without a center slot according to one or more embodiments shown and described herein.

FIG. 30 depicts the track 10 without a center slot 25 as shown in FIG. 1. The first outer slot 20 and the second outer slot 30 may have the plurality of target regions 900 but they are not required as shown in FIG. 27 or the plurality of diamond contoured target regions 13 as shown in FIGS. 28A and 28B. A flat surface 910 allows for the locking pin 155 of FIG. 7 to apply a biasing force to an even surface to create an interference fit between the mounting studs 140 and the necked-down regions 40 of the first outer slot 20 and the second outer slot 30. The biasing force exerts a force to separate the mount 50 from the track 10. The interference fit or friction fit of the mounting stud 140 pressing against the slots (20, 25, and 30), is a fastening device that fastens two parts by friction after the parts are pushed together. Furthermore, the snubber function outlined below in FIG. 37 may also provide the necessary force to secure the mount 50 to the track 10 of FIG. 30.

Figure 31:
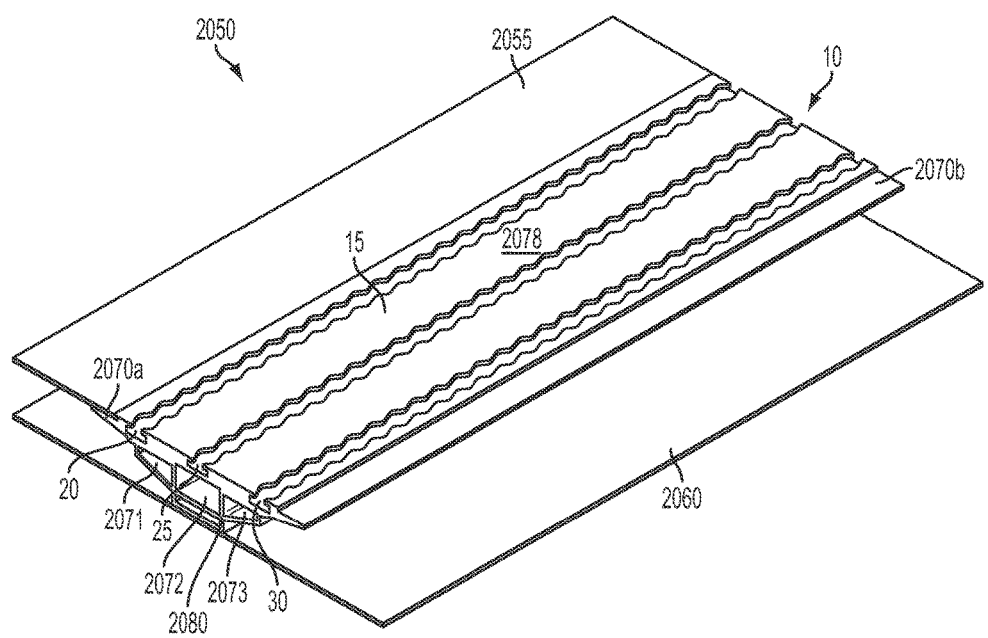
FIG. 31 depicts a wall assembly incorporating the track according to one or more embodiments shown and described herein.
Figure 38:
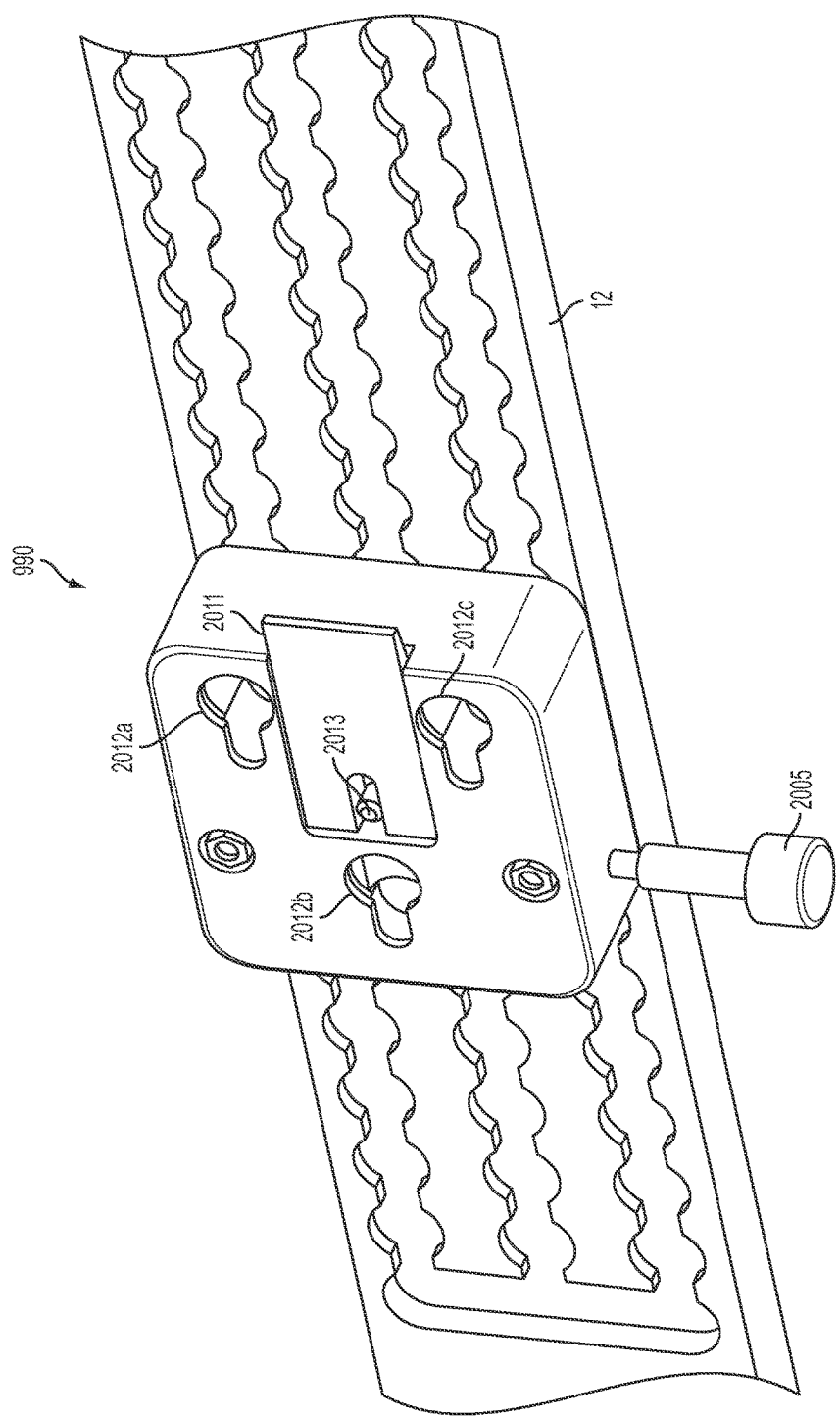
FIG. 38 depicts another embodiment of universal adaptor according to one or more embodiments shown and described herein.

FIG. 31 depicts a wall assembly 2050 incorporating the track 10 of FIG. 1, the minitrack 12 of FIG. 38, or the quick mount track 11 of FIG. 28. The track 10 may include a plurality of tabs 2070*a* and 2070*b*. The plurality of tabs 2070*a* and 2070*b* are shown running the long dimension of the track 10 but it should be understood that the plurality of tabs 2070*a* and 2070*b* may also run the short dimension of the track 10. The plurality of tabs 2070*a* and 2070*b* may support a wall covering 2055 and keep the wall covering 2055 flush with the face surface 2078 of the backing plate 15. The wall covering 2055 may be made of any material and may be fastened to the plurality of tabs 2070*a* and 2070*b* through welding, adhesives, or the fastening devices described above. An outer wall covering 2060 may also be made of any material and may be fastened to a support structure 2080 through welding, adhesives, or the fastening devices described above. The support structure 2080 is coupled to the backing plate 15 and provide strength and rigidity to support the backing plate 15, the wall coverings 2055, and the outer wall covering 2060. The support structure 2080 may also be part of a frame of a larger wall assembly 2050. A first outer channel 2071, a center channel 2072, and a second outer channel 2073 may be part of the support structure 2080 and provide conduits for electrical wiring, plumbing, and other services that may be provided by the wall assembly 2050.

A backing plate 15 with a face surface 2078 and a back surface, the face surface is opposite of the back surface. The backing plate 15 includes a first outer slot 20 with a plurality of open regions and a plurality of necked down regions connecting the plurality of open regions, a second outer slot 30 with the plurality of open regions and the plurality of necked down regions connecting the plurality of open regions, and a center slot 25 with a plurality of locking pin apertures in the backing plate, the locking pin apertures are in horizontal alignment with the plurality of open regions of the first outer slot 20 and the second outer slot 25. The backing plate 15 also includes a first trim tab 2070a along a first outer edge of the backing plate 15 to support a first wall covering 2055 flush with the face surface 2078 of the backing plate 15, and a second trim tab 2070b along a second outer edge of the backing plate 15 to support a second wall covering 2055b of FIG. 32 flush with the face surface 2078 of the backing plate 15. A support structure 2080 coupled to the back surface of the backing plate 15 to provide support for the wall assembly 2050 wherein the wall assembly 2050 includes structure for supporting the first wall covering 2055, the second wall covering, and an outer wall covering 2060.

Figure 32:
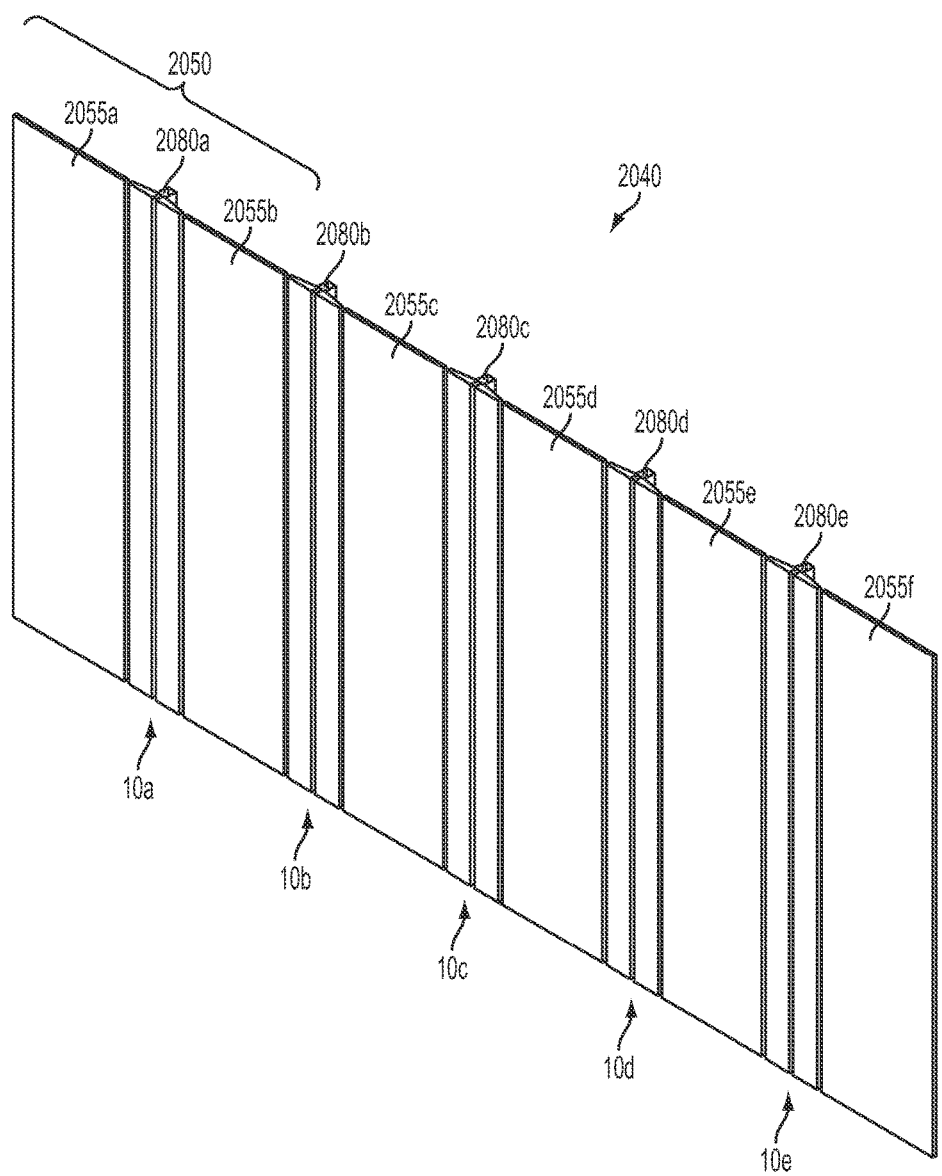
FIG. 32 depicts a plurality of wall assemblies chained together according to one or more embodiments shown and described herein.

FIG. 32 depicts a wall 2040. The tracks 10a, 10b, 10c, 10d, and 10e may be spaced along the wall 2040 at any interval desired depending on the type and number of the pieces of equipment to be mounted to the wall 2040. The wall comprises a plurality of wall assemblies 2050 chained together. The wall coverings 2055a, 2055b, 2055c, 2055d, 2055e, and 2044f coupled the tracks 10a, 10b, 10c, 10d, and 10e together. It should be noted that the wall coverings 2055a, 2055b, 2055c, 2055d, 2055e, and 2044f may provide structural support for the tracks 10a, 10b, 10c, 10d, and 10e, they are not required to as the structural support 2080a, 2080b, 2080c, 2080d, and 2080e provide the foundation for the support of the wall 2040.

Figure 33:
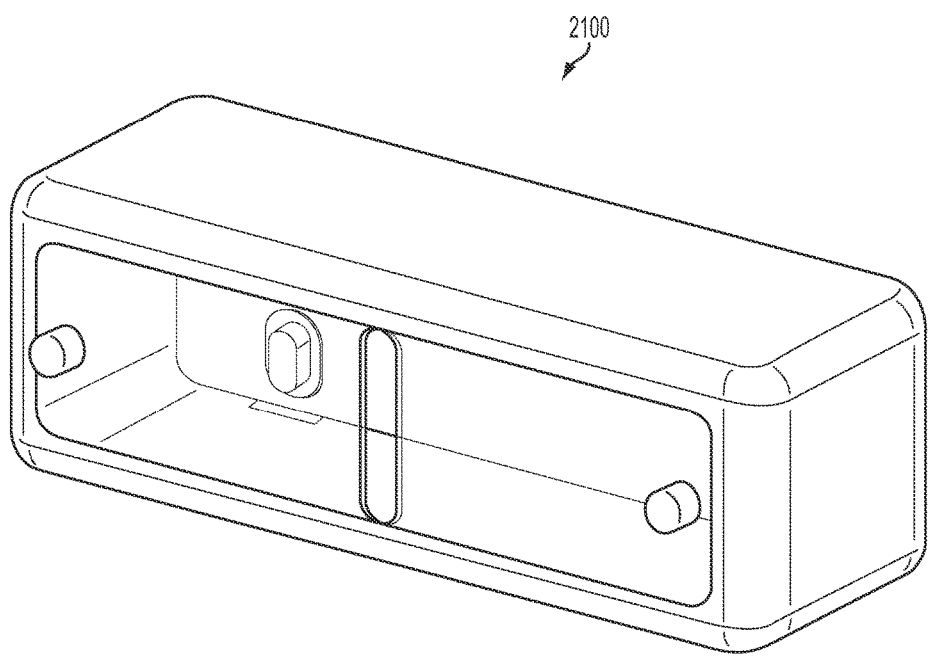
FIG. 33 depicts a cabinet for use on the wall according to one or more embodiments shown and described herein.

FIG. 33 depicts a cabinet 2100 for use on the wall 2040 of FIG. 32. The cabinet 2100 may be used to store items along the wall 2040.

Figure 34:
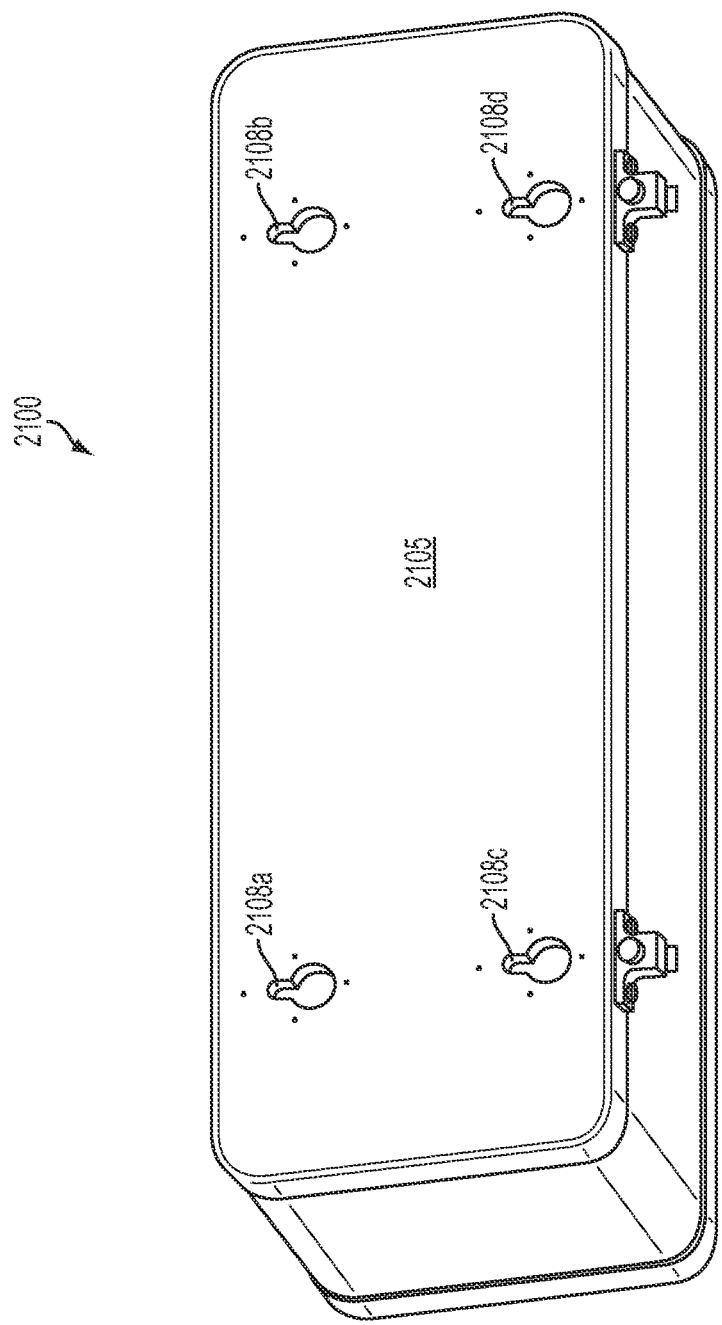
FIG. 34 depicts a backside of the cabinet according to one or more embodiments shown and described herein.

FIG. 34 depicts a backside 2105 of the cabinet 2100. The plurality of keyholes 2108a, 2108b, 2108c, and 2108d may be used to engage a single track stud as described above in relation to FIG. 9. The single track studs may be positioned anywhere along the track 10a, 10b, 10c, 10d, and 10e of FIG. 32 as long as they are position to engage the plurality of keyholes 2108a, 2108b, 2108c, and 2108d on the backside 2105 of the cabinet 2100.

Figure 36:
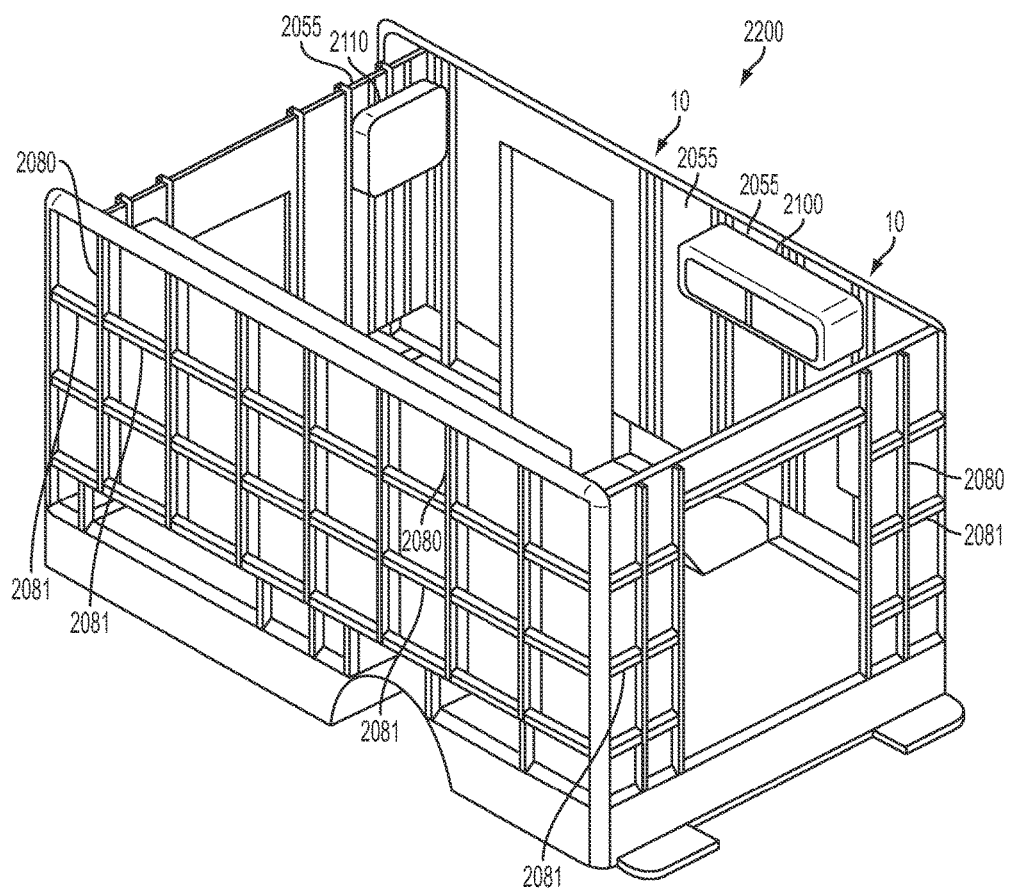
FIG. 36 depicts a vehicle cab according to one or more embodiments shown and described herein.

As described above, a mount 50 of FIG. 3, an adaptor of FIG. 8, or a wedge mount 47 of FIG. 11 may be used to secure the cabinet 2100 or the case 2110 of FIG. 36 to the track 10.

Figure 35:
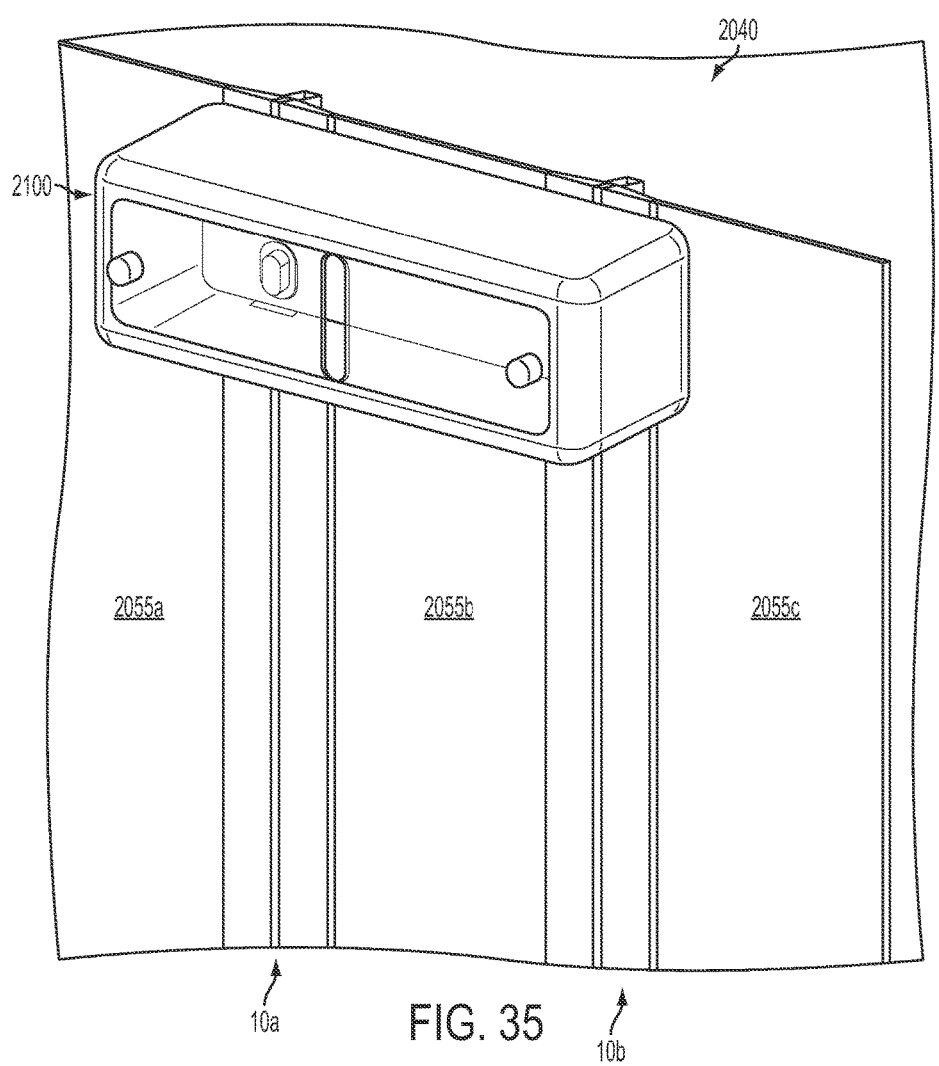
FIG. 35 depicts the cabinet mounted to the wall according to one or more embodiments shown and described herein.

FIG. 35 depicts the cabinet 2100 mounted to the wall 2040 of FIG. 32. In this embodiment, the tracks 10a and 10b are spaced to allow a single track stud or the like to engage the plurality of keyholes 2108a, 2108b, 2108c, and 2108d on the backside 2105 of the cabinet 2100 as shown in FIG. 34. The wall coverings 2055a, 2055b, and 2055c provide a flush surface for the wall 2040 and the cabinet 2100.

FIG. 36 depicts a vehicle cab 2200. In this embodiment, the support structure 2080 provides the framework for the vehicle cab 2200. Cross members 2081 are added between the support structure 2080 to add additional strength and rigidity to the vehicle cab 2200. The support structure is coupled to the track 10 as shown in FIG. 31 and wall coverings 2055 span the distance between each track 10 to provide a flush inner surface for the vehicle cab 2200. A cabinet 2100 is shown attached to the tracks 10 as wells a case 2110. The case may also include plurality of keyholes on its backside and mount to the track in a similar fashion as the cabinet 2100.

The vehicle cab 2200 but it should be understood that the any walled enclosure may incorporate the wall assembly 2050 of FIG. 31. Furthermore, the tracks 10 are shown vertical in the vehicle cab 2200 however they may also run horizontal and use the cross members 2081 in place of the support structure 2080. An outer wall covering 2060 may also be used to cover the vehicle cab 2200.

Referring to FIGS. 3, 10B, 11, and 37, in one embodiment, the locking pin release 160a and 160b and the wedge release 61 may include a snubber function. The snubber function allows the locking pin release 160a and 160b and the wedge release 61 to take up any slack between the mount 50 and the track 10. For ease of mounting the mount 50 to and unmounting the mount 50 from the track, the tolerance between the mounting studs 140 and the slots (20, 25, and 30) may be loose allowing for movement between the mounting studs 140 and the slots (20, 25, and 30). Therefore, when mounted, the mount 50 may rattle or shake on the track 10, the minitrack 12, or quick mount track 11. The snubber function either uses the receiver locking pin 2020 (FIG. 10B) to apply a pressure between the mount 50 and the track 10 or it retracts the mounting studs 140 into the mounting plate 135 to take up the loose tolerance between the mount 50 and the track 10.

Figure 37:
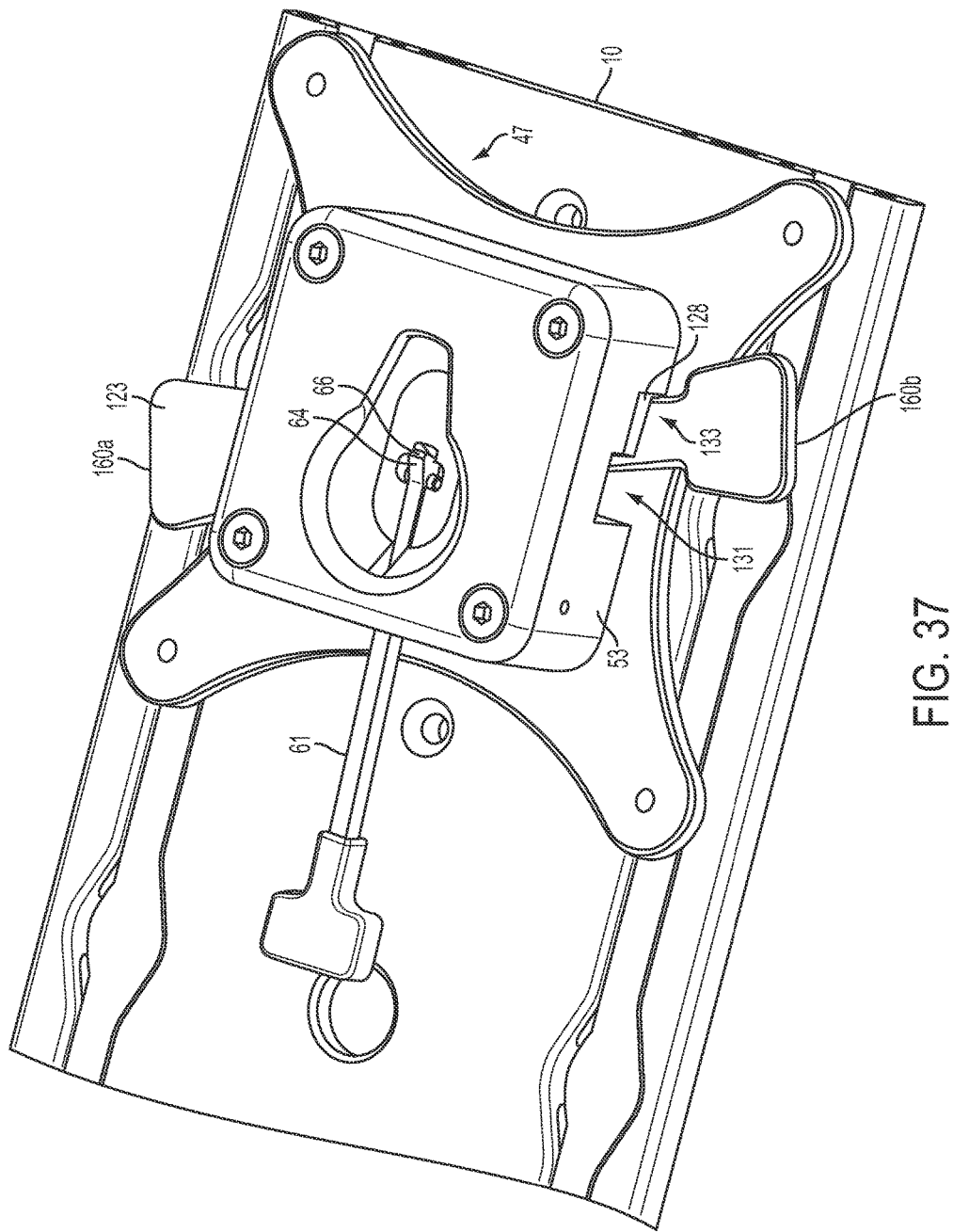
FIG. 37 depicts the wedge mount with a locking pin release that rotates about a central axis according to one or more embodiments shown and described herein.

Referring now to FIG. 37, the wedge mount 47 is shown with the locking pin release 160a and 160b (160) are a single unit and rotate about a central axis. The locking pin release 160 has a locked position 133 and an unlocked position 131. In the unlocked position 131, the locking pin release 160 is free to actuate towards or away from the track 10 to release the mount 50 from the track 10 as described above. In the locked position 133, a stop 128 prevents the towards and the away movement of the locking pin release 160. As the locking pin release 160 is actuated (rotated) from the unlocked position 131 to the locked position 133, a cam (not shown) either presses a plunger (not shown) against the track 10 to take up the loose tolerance between the mount 50 and the track 10 or it retracts the mounting studs into the mounting plate 135 as described above in the snubber function.

Furthermore, in another embodiment, the blade 64 has a different shape from the blade 64 of FIG. 12 as well as the engagement surface 66. The narrower shape of the blade 64 and engagement surface 66 of FIG. 37 enables the wedge release 61 to absorb greater shock loads without breaking and conform to narrower wedge interfaces (not shown).

FIG. 38 depicts another embodiment of universal adaptor 990 of FIGS. 10A and 10B. A plurality of keyhole slot apertures 2012a, 2012b, and 2012c are shown to receive an equipment mount 172 (not shown), where the different embodiments of the equipment mount 172 are described above. The receiver equipment release 2005 releases the equipment mount 172 from the universal adaptor 990 through a set of release pins (not shown) in the cavity of each of the plurality of keyhole slot apertures 2012*a*, 2012*b*, and 2012*c*. The paddle latch 2011 actuates a pull-out pin 2013 to release the universal adaptor 990 from the minitrack 12. The pull-out pin 2013 operates similarly to the locking pin 155 of FIG. 3.

The minitrack 12 is another embodiment of the track 10 of FIG. 1. The minitrack 12 enables a smaller load to be mounted to a surface, wall, or structure.

Figure 39A:
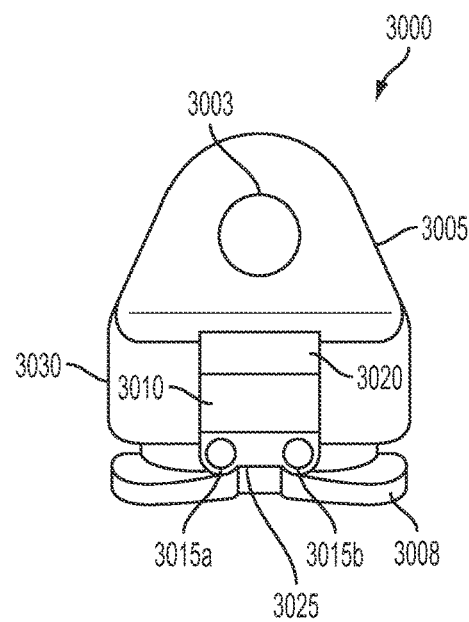
FIGS. 39A and 39B depict a quick release clip according to one or more embodiments shown and described herein.
Figure 39B:
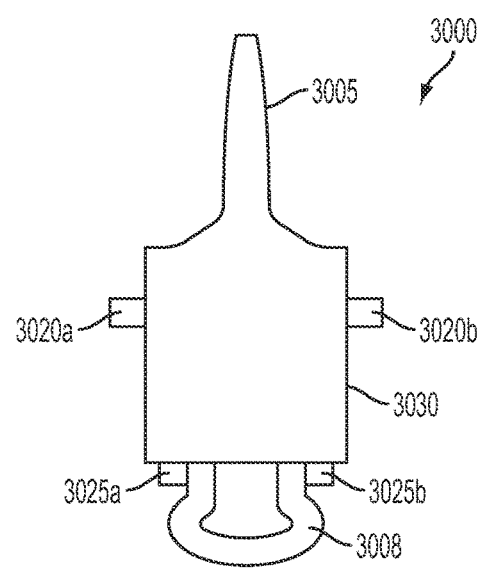

FIGS. 39A and 39B depict a quick release clip 3000. The quick release clip 3000 has a eyelet structure 3005 with an eyelet aperture 3003. The eyelet aperture 3003 may allow a strand of material to hang from the quick release clip 3000, a latch, a clip, a rope or similar material, a carabiner or the like to couple with the quick release clip 3000. The foot structure 3008 mimics the footprint of two mounting studs 140 of FIG. 3 if they were placed in adjoining open regions 35 of the track 10 of FIG. 1. A clip pin 3025 is biased towards the foot structure 3008 and mimics the locking pin 155. A handle 3020 enables the clip pin 3025 to be pulled away from the foot structure 3008 to release the quick release clip 3000 from the track 10. A plurality of indents 3015*a* and 3015*b* allow the clip pin 3025 to lock the quick release clip 3000 between two necked-down regions 40. In other words, when the quick release clip 3000 is in the out-of-phase position (refer to FIG. 5), the adjoining necked-down regions 40 occupy the plurality of indents 3015*a* and 3015*b*. The clip pin 3025 includes both sides of the clip pin 3025*a* and 3025*b* as well as both sides of the handle 3020*a* and 3020*b* and they all move together as one piece.

When the quick release clip 3000 is inserted into the track 10 (FIG. 1) in the in-phase configuration, the clip pin 3025 contacts the face surface of the track 10 and does not occupy an open region 35. The quick release clip 3000 is slid to the out-of-phase configuration and the clip pin 3025 is biased to be extended into the open region 35, thereby locking the quick release clip 3000 to the track 10.

It should be appreciated that as used through the application the mounting studs 140 may be replaced with the tongue 180 to allow different mounting configurations be used between all the embodiments. The size and orientation of the track 10 (FIG. 1) and modular plates 105 may vary depending on the application. The number of mounting studs 140 or track slots 20, 25, 30 may also vary depending on the application and load considerations. Furthermore, all the embodiment disclosed herein, to include for example the track 10, the fixed position plate 130, the mount 50, may be made from aluminum, steel, plastic, rubber, casting, or similar materials.

It will further be appreciated that the equipment mounting system may be modular in that a number of components of the equipment mounting system may be interchangeable, which can reduce assembly time, complexity, and costs. Such modularity in the equipment mounting system may allow for a more rapid and fluid response to a particular situations, which may improve the outcomes in some instances. The equipment mounting system configuration allows its use on a variety of different vehicles and/or other equipment, thus providing the benefit of interchangeability and flexibility. Another benefit of the track systems described herein is that they permit a user to install, remove, and/or reconfigure one or more pieces of equipment with little-to-no visibility as the equipment mounting system can be employed by tactile sensing only (i.e., feel only).

Figure 56:
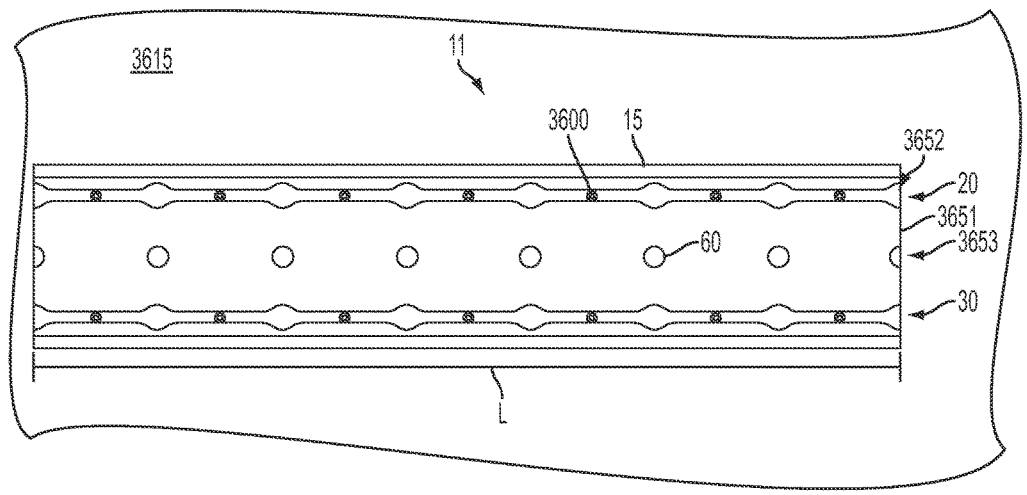
FIG. 56 depicts another embodiment of the track according to one or more embodiments shown and described herein.

It will further be appreciated that the track 10 of FIG. 1, the minitrack 12 of FIG. 38, or the quick mount track 11 of FIGS. 28A and 56 may be scalable to accommodate different size and different configurations of mounting studs. For example, the standard size may be 19.05 mm (¾ inch) holes (open regions 35 of FIG. 1) on 25.4 mm (1 inch) center. The track 10, the minitrack 12, or quick mount track 11 may be increased to 38.1 mm (1.5") holes on 50.8 mm (2 inch) center. Alternatively, the track 10, the minitrack 12, or quick mount track 11 may be decreased to 9.5 mm (⅜ inch) holes on 12.7 mm (½ inch) center which would correspond to the minitrack 12 of FIG. 38.

In some embodiments, printed or painted indicia and/or tactile indicia (e.g. a location indicator) may be used along with the equipment mounting system. For example, a location indicator may be placed alongside or even on the tracks 10. In some embodiments, a marker may be placed on the tracks 10 to allow for rapid adjustments of the antenna mount 100 with little to no visibility. The indicia may be located on the tracks 10 or on the vehicle.

The equipment mounting system can be made out of any material of sufficient strength. It could be made out of one piece of material or a casting. The studs on the mounting plate and the openings on the tracks can be increased or decreased as needed to reach the desired mounting strength required by the equipment and material used in the system's manufacture.

It will be appreciated that this system does not require tools to mount a piece of equipment to a vehicle or other equipment. As set forth above, the ease of its use and installation would allow the mounting of a piece of equipment in either daytime or nighttime operations. The equipment mounting system is designed so that the quick releases can be found in the dark and the piece of equipment can be moved or removed under little-to-zero light conditions. The equipment mounting may also be known as a track system.

Referring now to FIGS. 40-45, an embodiment of a track clip 3400 is shown. The track clip 3400 is operable to engage and/or detachably connect to the track (i.e., as used throughout the disclosure of the track clip 3400, the "track" includes the track 10 of FIGS. 1, 2, and 27 through 31, the minitrack 12, shown in FIG. 38, or the quick mount track 11, shown in FIGS. 28A and 56). As such, the track clip 3400 in certain embodiments, is configured to engage and/or detachably connect to any one or more of the first outer slot 20, the center slot 25, and/or the second outer slot 30 of the illustrative track shown and described herein (e.g., FIGS. 45A and 45B).

Still referring to FIGS. 40 through 45B, the track clip 3400 may include a base 3405 having a longitudinal axis 3495, a slot flange 3425 extending from the base 3405 transverse to the base longitudinal axis, a coupler 3410 detachably connected to the base 3405, a guide 3497 extending from the base 3405 along a carrier axis 3440 that is transverse to the longitudinal axis 3495, a carrier 3420 movably disposed about the guide 3497 such that the carrier 3420 moves relative to the base 3405 between an engaged position and a disengaged position, a spring disposed about the guide 3497, and a snubber pad 3470 coupled to the carrier 3420 and extending through an aperture disposed within and through the base 3405. The components of the track clip 3400 may be fabricated from a variety of the same material, different materials, or combinations thereof, including metals, plastics, composites, or the like.

Figure 42:
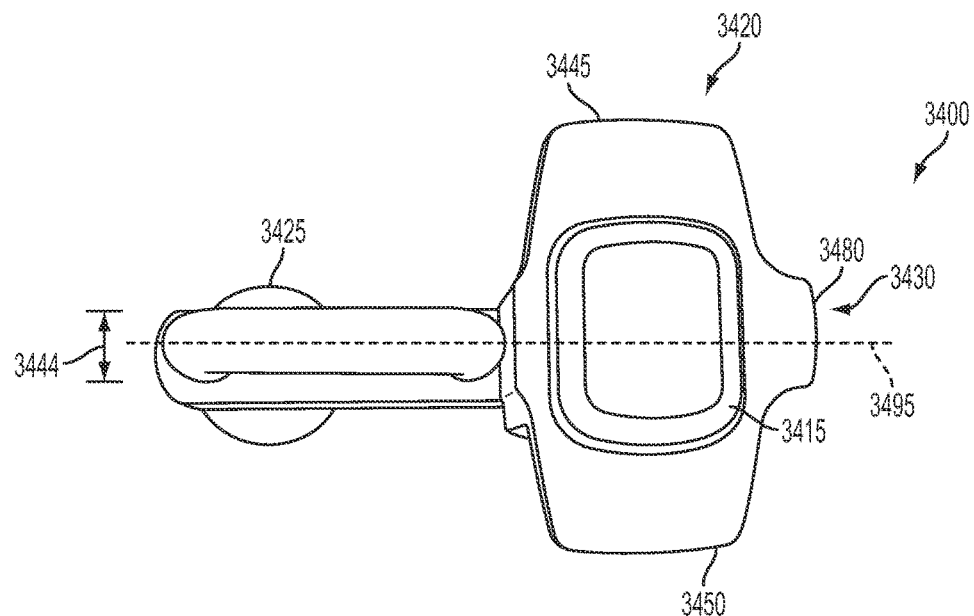
FIG. 42 is a top view of the track clip adaptor according to one or more embodiments shown and described herein.
Figure 45A:
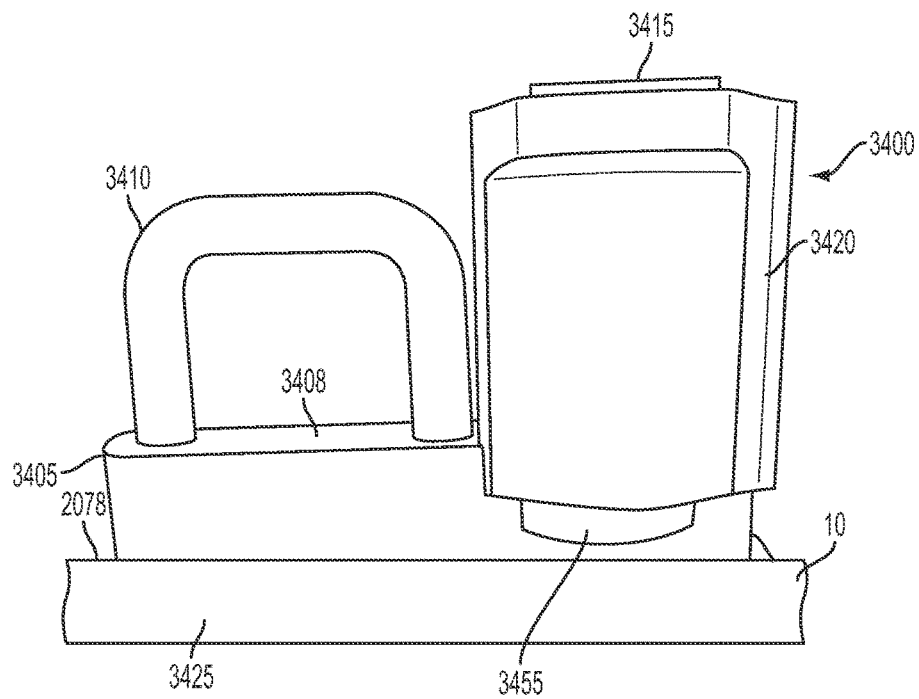
FIG. 45A is a left isometric view of the track clip according to one or more embodiments shown and described herein.

The base 3405 may include a base width 3444 as illustrated in FIG. 42 and a coupler face 3408 as illustrated in FIG. 45A. The base width 3444 is sufficient enough to allow the base 3405 to slidably couple with a slot (e.g., one of the first outer slot 20, the center slot 25, or the second outer slot 30) of the track but also minimize the amount of lateral movement of the base 3405 within the slot and in turn, minimize the amount of lateral movement of the track clip 3400 in relation to the track. In some embodiment, the base 3405 may be covered in an anti-rattle coating. In one such embodiment, the anti-rattle coating may be a pliable coating that, when the track clip 3400 is coupled to the track, creates an interference fit between the track clip 3400 and the track. The pliable coating may be, for example, a plastic coating, a rubber coating, a cloth coating, a wax coating, a foam coating, elastomeric coating, any combination thereof, or the like. In another embodiment, the anti-rattle coating may be a hard surface. The hard surface may wear away when the track clip 3400 is coupled to the track such that an interference fit is created between the track clip 3400 and the track, restricting the movement of the track clip 3400 in relation to the track. The hard surface may be, for example, a plastic surface, a ceramic coating, or the like. The slot flange 3425 may be used to slidably coupled with a necked-down region 40 of the track and secure the track clip 3400 to the track as described in greater detail below.

As set forth above, the slot flange 3425 may extend from the base width 3444 in a direction transverse to the base longitudinal axis 3495. The slot flange 3425 is formed as an integral component of the base 3405 using forming techniques such as, for example, molding, casting, machining, or other similar methods. In other embodiments, the slot flange 3425 may include a separate component that is fixedly or detachably connected to the base 3425 using any number of fastening devices, welds, friction fit connections, any combinations thereof, or the like. In the embodiment shown, the slot flange 3425 is disposed at one end of the base 3425 and spaced apart from the carrier 3420. However, it is understood that the slot flange could be disposed in a variety of positions on the track clip 3400 and be configured to have any shape, design, and/or size.

In the embodiment shown, the coupler 3410 is detachably connected to the base 3405 using one or more fastening devices 3465 such that the coupler 3410 extends from the coupler face 3408. In other embodiments, the coupler 3410 may be fixedly connected to the base 34050 using welds, friction fit, and other similar methods. It is also understood that the coupler 3410 could be formed via molding, casting, or machining techniques as an integral part of the base 3405. In one embodiment, the coupler 3410 may be a u-shaped ring as shown. In another embodiment, the coupler 3410 may be a light such as a Light Emitting Diode (LED). A flexible neck may be coupled between the light and the coupler face 3408. In yet another embodiment, the coupler 3410 may be a hook, a peg, a clasp, a latch, or the like.

The guide 3497, in this embodiment, is a post that extends from the base 3405 along the carrier axis 3440 and includes a proximal end and a distal end spaced from the base 3405. Disposed at the distal end is a guide flange 3457. A leverage feature 3415 is fixedly or detachably connected to the guide flange 3457. The leverage feature 3415 may extend above the carrier 3420, optionally, enabling a user to tactilely identify the leverage feature 3415 from the carrier 3420. The leverage feature 3415 may also, optionally, include tactile or gripping features or ridges which enable a user to tactilely identify the leverage feature 3415 from the carrier 3420 or other components of the track clip. In one embodiment, the leverage feature 3415 may be fabricated from elastomeric, rubber, or similar materials. It is understood that in certain embodiments, the guide may not include the leverage feature 3415 or tactile features.

The carrier 3420 may include a carrier body 3449, a first carrier bore 3421 disposed within the carrier body 3449, a second carrier bore 3422 connected to the first carrier bore 3421 and also disposed within the carrier body, a bore stop 3423 disposed within the second carrier bore, and a spring retainer 3458 extending into the first carrier bore 3421 to engage the spring 3434. At an end of the carrier body 3449 proximal to the base 3405, the carrier body 3449 may include a body channel having a width wide enough to permit a portion of the base 3405 to insert into when the carrier is moved to the engaged position shown, for example, in FIGS. 41, 43 and 45B.

Figure 41:
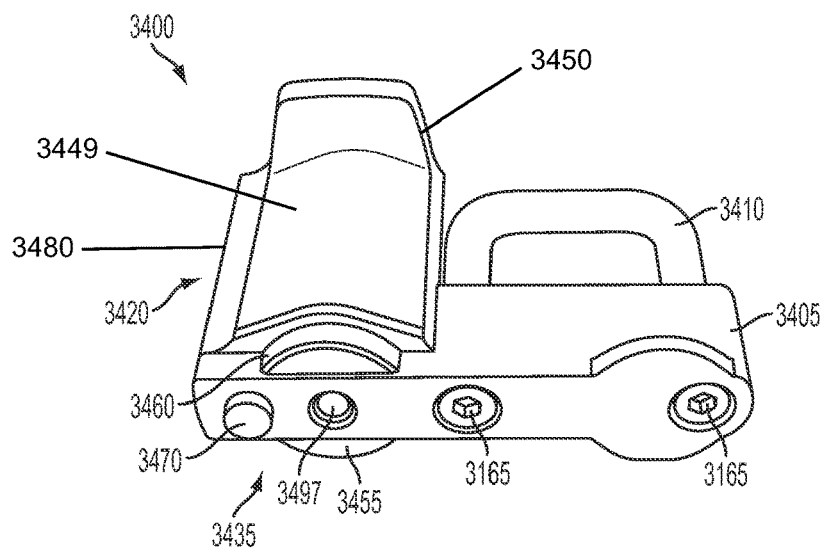
FIG. 41 is an isometric view of the track clip according to one or more embodiments shown and described herein.
Figure 43:
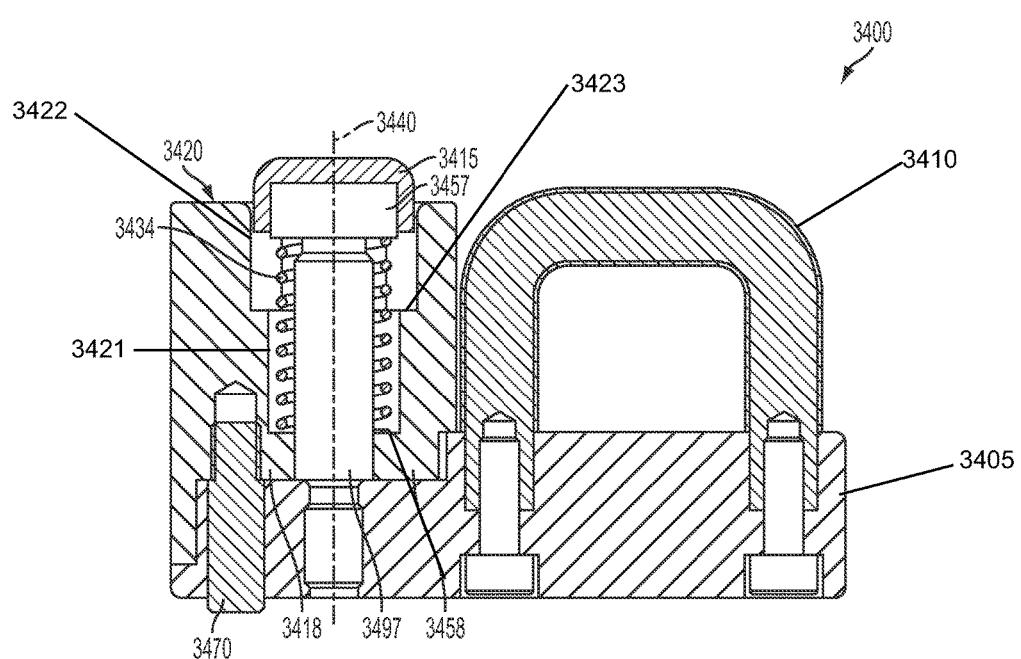
FIG. 43 is a left side cross-sectional view of the track clip in the engaged position according to one or more embodiments shown and described herein.
Figure 45B:
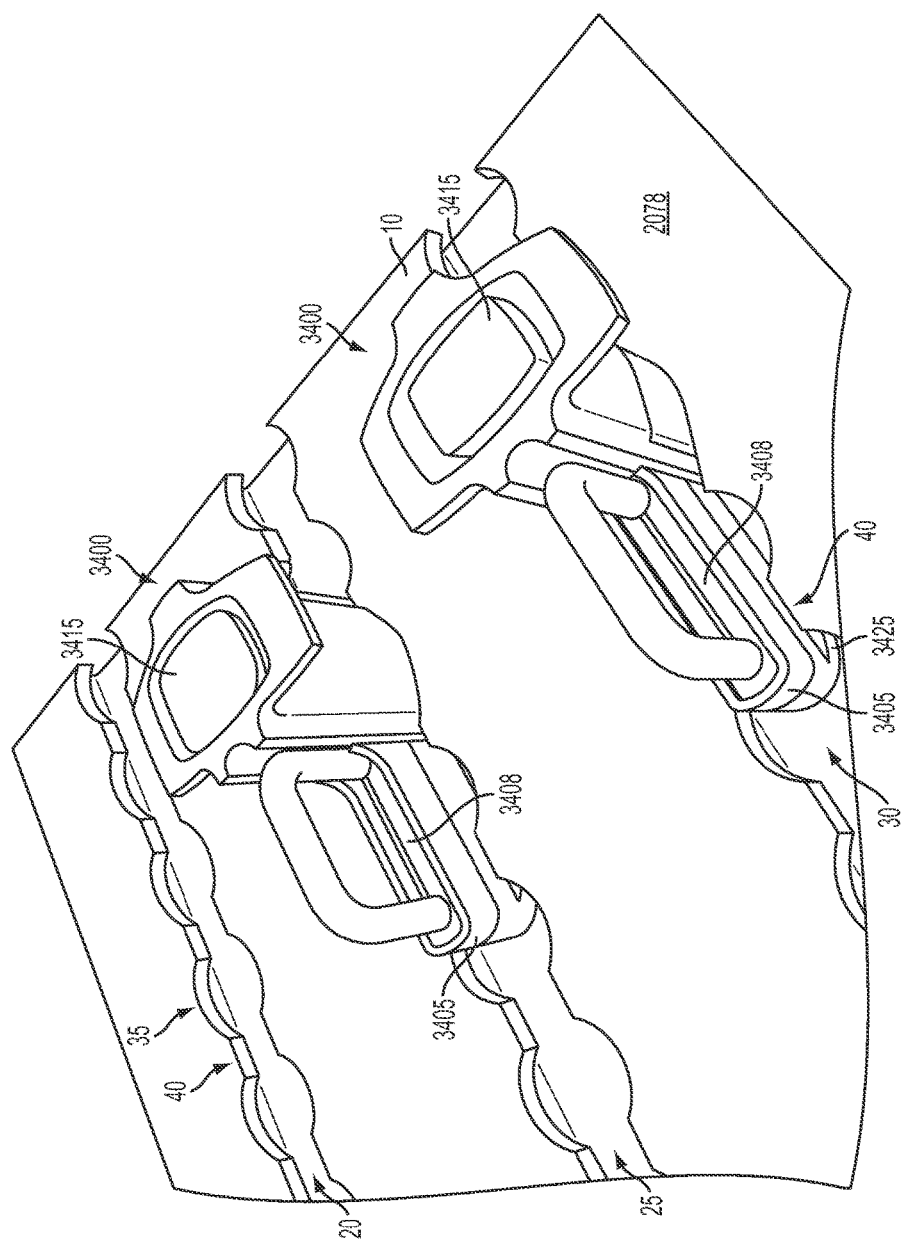
FIG. 45B is an isometric view of the track clip coupled to the track according to one or more embodiments shown and described herein.

As shown in FIG. 41, the carrier body 3449 includes a first extension 3455 and a second extension 3460 that extend from the carrier body 3449 along the carrier axis 3440 and are spaced apart to form a second channel 3461 having a width that is wide enough to permit a portion of the base 3405 to insert into when the carrier is moved to the engage position shown, for example, in FIGS. 41, 43 and 45B. The first and second extensions, in this embodiment, are partially cylindrical in shape and have a diameter that is less than the diameter and/or width of the carrier body 3449 and the open region, but greater than the width of the neck down region (e.g., neck down region 40) of the track. The first and second extensions 3455 and 3460 are operable to insert into and engage an open region (e.g., open region 35) of the track when the track clip 3400 is in the engaged position, preventing the track clip 3400 from moving along the slot of the track. Because the first and second extensions 3455 and 3460, respectively, have a diameter or width that is less than the diameter or width of the carrier body 3449, the carrier body 3449 includes a bottom surface 3447 that extends outwardly from the first and second extensions and from the carrier axis as illustrated in FIG. 41.

As shown, the spring 3434 slides over the guide 3497 and then the carrier 3420 slides over the spring and guide such that the spring and guide are disposed within the first and second bores 3421 and 3422, respectively. When in position over the guide and within the carrier, the spring has one end engaging and abutting the guide flange 3457 and an opposite end engaging and abutting the spring retainer 3458. In the embodiment shown in the figures, the spring 3434 biases the carrier 3405 along the carrier axis 3440 toward the base 3405.

The carrier 3420 also may include a first lip 3445 disposed at an end of the carrier 3420 adjacent to the second bore 3422 that extends from the carrier transverse to the carrier axis 3440, a second lip 3450 disposed at an end of the carrier 3420 adjacent to the second bore 3422 that extends from the carrier transverse to the carrier axis 3440 and in a direction opposite the first lip, and a center flange 3430 that disposed at an end of the carrier 3420 adjacent to the second bore 3422 that extends from the carrier transverse to the carrier axis 3440 and in a direction substantially parallel with the base longitudinal axis 3495. Additionally, the carrier 3420 may include a center guide 3480 that runs along a portion or all of the length of the carrier 3420 along the carrier axis 3440.

Although the spring 3434 and carrier 3420 are shown as completely encompassing the guide 3497, it is understood that other configurations may be used for the track clip. In one such example, the guide may comprise a beam extending from the base 3405, a linear spring running along one side of the guide, and a carrier having a channel that the guide inserts into and a spring retainer that engages the spring. The guide is operable to slide within and along the channel of the carrier against and with the force of the spring.

Figure 40:
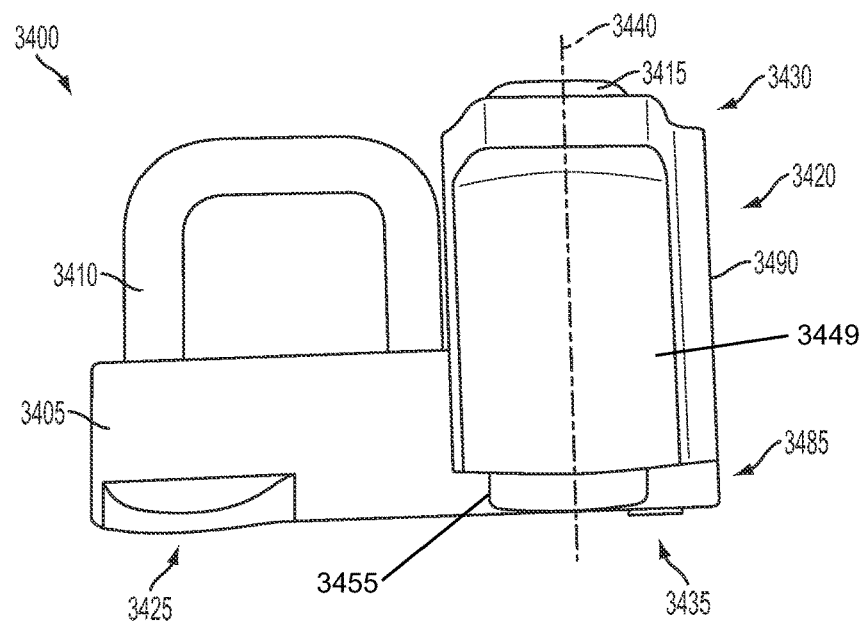
FIG. 40 is a side view of a track clip according to one or more embodiments shown and described herein.
Figure 44:
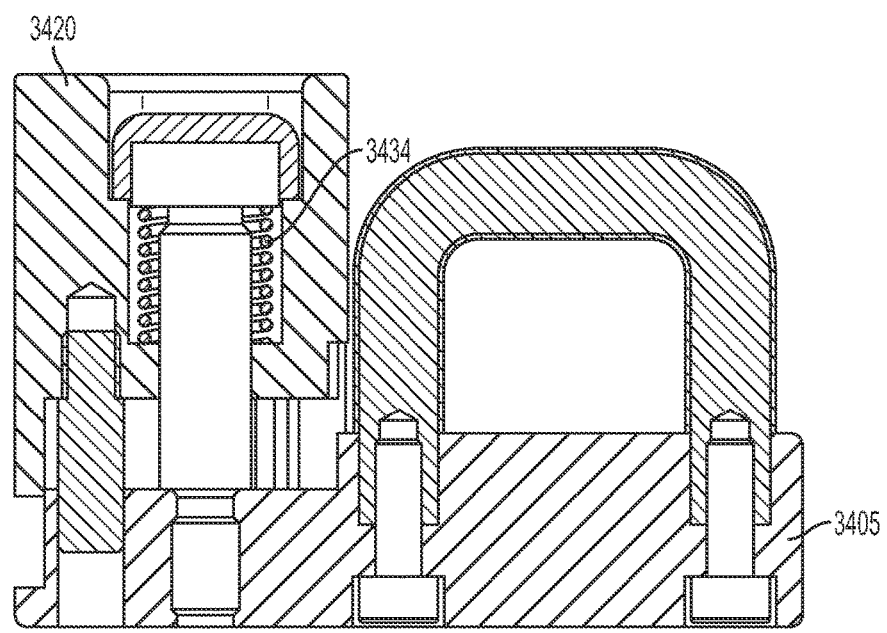
FIG. 44 is a left side cross-sectional view of the track clip in the disengaged position according to one or more embodiments shown and described herein.

The operation of the track clip 3400 will be described below. FIGS. 44 and 45A illustrate the track clip 3400 in the disengaged position, and FIGS. 40, 41, 43, and 45B illustrate the track clip 3400 in the engaged position, or in other words, in the normally-biased or rest position. Referring to FIGS. 40, 42, and 43, for example, a user may apply a transition force to the carrier 3420, by placing two fingers under first and second lips 3445 and 3450, respectively, and a thumb onto the leverage feature 3415, and thus move the carrier 3420 along the carrier axis 3440 away from base 3405 and against the spring force of the spring 3434 from the engaged position to the disengaged position as shown, for example, in FIG. 44. When the carrier 3420 is moved from the engaged position to the disengaged position, the carrier 3420 also moves the snubber pad 3470 from a position where a distal end of the snubber pad is extended outwardly from the bottom surface of the base 3405 as shown in FIG. 43 to a position where the distal end of the snubber pad 3470 is within the aperture of the base 3405 as shown in FIG. 44.

When the track clip 3400 is in this disengaged position, the user can then insert the slot flange 3425 into an open region (e.g., open regions 30) and the base 3405 into the slot of the track and then slide the track clip 3400 within the slot until the slot flange 3425 is aligned with (e.g., or under) a neck down region (e.g., neck down region 40) and the first and second extensions 3455 and 3460, respectively, are aligned with a respective open region of the track. At this point, the user may release the transition force by removing the fingers and thumb from the first and second lips 3445 and 3450, respectively, and the leverage feature 3415. Upon the release of the transition force, the spring 3434 will bias the carrier 3420 in the opposite direction along the carrier axis (i.e., toward the base 3405) such that the first and second extension 3455 and 3460, respectively, insert into and engage the aligned open region. The first and second extensions in this embodiment are shown as having a substantially cylindrical shape and a shape that substantially conforms to the shape of the open regions of the track. However, it is understood that the first and second extensions may have a variety of shapes, sizes, and configurations and such shapes, sizes, and configurations do not have to substantially conform to the open regions' shapes, sizes, and configurations or even be the same. Illustrative shapes could include, but not be limited to, rectangular, circular, diamond, triangular, or the like. In some embodiments, the first and second extensions may have an interference fit with the open region to assist with partially or completely removing lateral and/or longitudinal movement relative to the slot and/or track.

Additionally, the spring force of the spring 3434, in moving the carrier 3420, will also move the snubber pad 3470 toward the base such that the distal end of the snubber pad will extend from the base 3405 into the slot and engage a bottom surface of the slot of the track. Also, as also shown in FIG. 45B, the lower surface 3447 engages the face surface 2078 of the track. The force exerted by the spring force via the snubber pad 3470 and/or the lower surface 3447 against the track counter to the slot flange 3425 to assists with partially or completely removing lateral and/or longitudinal movement relative to the slot and/or track. The snubber pad 3470 prevents the track clip 3400 from rattling and/or moving in relation to the track while the track clip 3400 is coupled to the track in the engaged position.

Once engaged and connected to the track, the track clip 34 enables a variety of objects, devices, and/or equipment to be removably attached and/or connected to the track via attaching or connecting those objects, devices, and/or equipment to the coupler 3410. The objects, devices, and/or equipment may include, but are not limited to, a piece of equipment such as, for example, a light, a clip board, an IV bag, any object that may hang from a hook (e.g., a purse, laptop bag, etc.), and the like. The track clip 3400 may allow for single hand operation to couple or decouple the track clip 3400 to or from the track.

In certain embodiments of the track clip 3400, the track clip 3400 may be crash-ready. As used throughout, "crash-ready" means that a device, equipment, mount, track, fastening devices, or a structure may be configured to survive an inertial force, an impact, a vehicle crash, or a sudden vehicle maneuver and retain functionality afterwards where the force exerted upon the device, equipment, mount, track, fastening devices, or a structure may exceed about 15 Gs (i.e., units of gravitational force or g-force) in a fore-aft direction and exceed about 17 Gs in a lateral direction. In other embodiments, the force exerted upon the device, equipment, mount, track, fastening devices, or a structure may exceed about 22 Gs (i.e., units of gravitational force or g-force) in a fore-aft direction and exceed about 26 Gs in a lateral direction.

Figure 46:
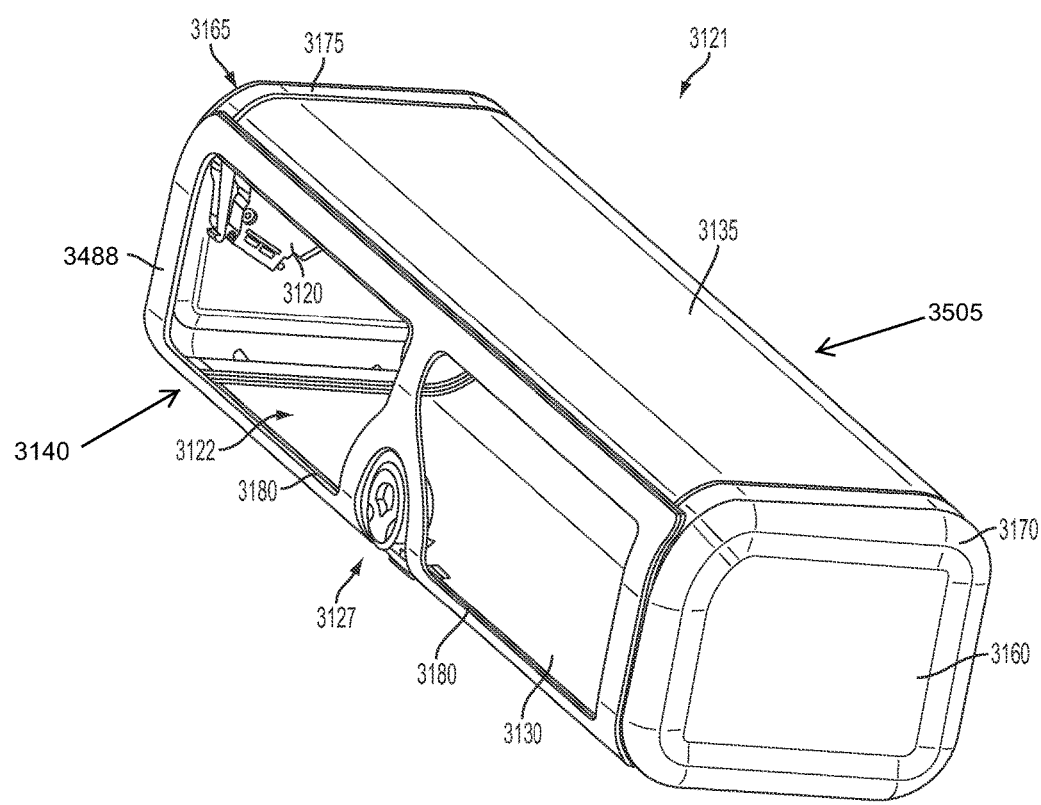
FIG. 46 is an isometric view of a wall cabinet according to one or more embodiments shown and described herein.

Referring now to FIG. 46, an isometric view of a wall cabinet 3100 is shown. The wall cabinet 3100 may be used with a mobile object such as, for example, a vehicle, a helicopter, an airplane, a mobile home, an all-terrain vehicle (ATV), or the like. The wall cabinet 3100 may be removably coupled to an interior of the vehicle, the helicopter, the airplane, the mobile home, the all-terrain vehicle (ATV), or the like, or the wall cabinet 3100 may be removably coupled to the exterior of the vehicle, the helicopter, the airplane, the mobile home, the all-terrain vehicle (ATV), or the like. In one embodiment, the wall cabinet 3100 may be removed from the vehicle, the helicopter, the airplane, the mobile home, the all-terrain vehicle (ATV), or the like and positioned on the ground, a table, or the like for use outside of the vehicle, the helicopter, the airplane, the mobile home, the all-terrain vehicle (ATV), or the like. The wall cabinet 3100 may also be used in or on a stationary object such as a structure, a building, or the like. The wall cabinet 3100 may be crash-ready.

Figure 47:
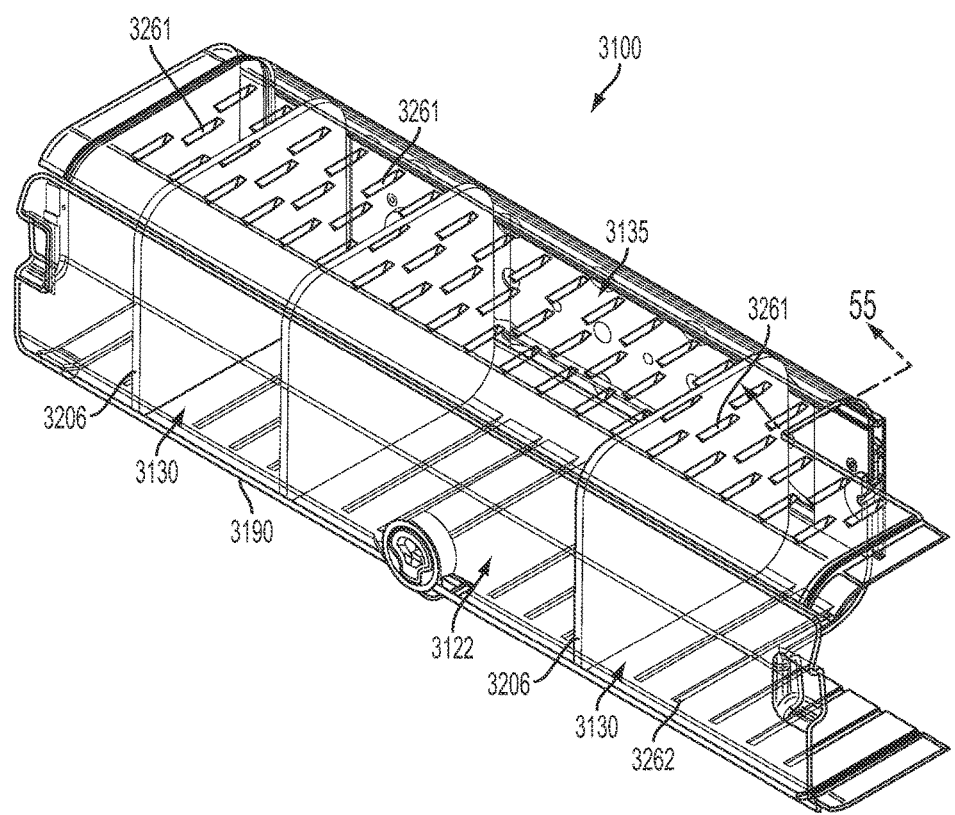
FIG. 47 illustrates a one or more dividers in the wall cabinet according to one or more embodiments shown and described herein.

The wall cabinet 3100 may be a partial enclosure defined by a top wall 3135, a first side wall 3165, a second side wall 3160, a rear wall 3505, and a bottom wall 3130. A door 3140 may be coupled to the partial enclosure to bound a storage volume 3122 internal to the wall cabinet 3100 and separate the storage volume 3122 from an exterior volume 3121 outside the wall cabinet 3100. One or more light emitting diodes (LED) lights (not shown) may be used to illuminate the storage volume 3122 and/or the exterior volume 3121 with one or more colors. The one or more LED lights may be activated by a door switch when the door 3140 is transitioned to an open position. The one or more LED lights may be position in the storage volume 3122 and coupled to the partial enclosure. The one or more LED lights may be positioned within the storage volume to illuminate a subspace between one or more dividers 3206 (FIG. 47). For example, in one embodiment, a white light LED may emit a white color and be used for daytime operations and a red light LED may emit a red color and be used for low-light operations. In another embodiment, a white light LED may emit a white color and be used for daytime operations and a green light LED may emit a green color and be used for low-light operations. In all embodiments, a clock circuit and/or a photocell may be used to determine when a specific color light emitted from the one or more LED lights should be used. An external switch (not shown) may be used to enable/disable the LED lights independent of the door switch. A power supply (not shown) may be used to power the one or more LED lights. The power supply may be one or more batteries, an AC/DC adaptor, or a vehicle electrical system.

The second side wall 3160 may be the right most extend of the partial enclosure of the wall cabinet 3100. The first side wall 3165 may be the left most extend of the partial enclosure of the wall cabinet 3100. The first side wall 3165 and the second side wall 3160 may include a first molding 3175 and a second molding 3170 respectively. The first molding 3175 and the second molding 3170 may be constructed from a flexible and/or pliable material and be configured to provide an area to soften any contact or absorb the force of an impact with a corner of the first side wall 3165 and the second side wall 3160. The first molding 3175 and the second molding 3170 may also provide a grip structure to grasp the wall cabinet 3100 and enable a user to position the wall cabinet 3100 and to secure it to mobile or stationary object.

Still referring to FIG. 46, the door 3140 may define the front most extent of the partial enclosure of the wall cabinet 3100 and be configured to cover an opening in the partial enclosure. The door 3140 may be hingedly coupled to the partial enclosure and have a closed position and an open position. In other embodiments, the door 3140 may have other positions between the closed and open positions, i.e., one or more partial positions. A reclosure 3120 may be used to transition the door between the open position and the closed position. In the closed position, the door 3140 may partition the storage volume 3122 from the exterior volume 3121. Any objects in the storage volume may be contained within the storage volume while the door 3140 is in the closed position. In the open position, the door 3140 may allow access to the storage volume 3122 from the exterior volume 3121 through the opening in the partial enclosure. A lock 3127 may be coupled to the door 3140 and configured to allow easy access into the storage volume 3122. The lock 3125 may be crash-ready. The lock 3127 may prevent the door 3140 from transitioning from the closed position to the open position and further secure the objects within the storage volume. An example of the lock is a SouthCO® latch, model number M1-Flush to pull latch. The door 3140 may also include one or more windows 3180. The one or more windows 3180 may allow an object in the storage volume 3122 to be visible from the exterior volume 3121 when the door 3140 is in the closed position. The door 3140 may also include a handle (not shown). The handle may be used to allow a user to transition the door 3140 from the closed position to the open position and vice versus. In one embodiment, the handle may include a latch mechanism that allows a user to actuate or transition the lock from a locked position to an unlocked position. The lock may be a button or a lever that is either mechanically coupled to the lock or electrically coupled to the lock to transition the lock between the locked and unlocked position. In another embodiment, the door 3140 may be constructed from a mirteq resin. Mirteq resin may be clear when hardened and comprise both the door 3140 and the one or more windows 3180. A frame 3488 may be adhered to the door 3140 to provide an impact surface to absorb impacts to the door 3140 and aesthetics.

FIG. 47 illustrates the one or more dividers 3206 for the storage volume 3122 of the wall cabinet 3100. The one or more dividers 3206 are just one embodiment of internal dividers that may be used within the wall cabinet 3100. An alternative embodiments is described below herein with reference to FIGS. 48-51. A plurality of ridges 3261 may be coupled to, or disposed on, the top wall 3135. The plurality of ridges 3261 may span along the top wall 3135 and may be substantially parallel to the first side wall 3165 and the second side wall 3160. A plurality of channels 3262 may be coupled to, or disposed within, the bottom wall 3130. The plurality of channels 3262 may span along the bottom wall 3130 from the retaining lip 3190 to the rear wall 3105 and may be substantially parallel to the first side wall 3165 and the second side wall 3160. Each divider 3206 may be configured to slidably couple with each channel 3262 and between at least two ridges 3261. In other words, each divider 3206 may be slidably coupled between a channel 3262 of the bottom wall 3130 and the top wall 3135. At least two ridges 3261 along the top wall 3135 may be used to guide and align the divider 3206 to be substantially orthogonal to the top wall 3135 and the bottom wall 3130. Each divider 3206 may be removably coupled to each channel 3126 such that each divider 3206 may be moved to another channel 3126 to parse the storage volume 3122 into the sub-space between each divider 3206. Each divider 3206 may be constructed from a flexible resin material.

The bottom wall 3130 may define a lower extent of the partial enclosure and comprise a retaining lip 3190 configured to impede an object from moving from the storage volume 3122 into the exterior volume 3121 when the door 3140 is in the open position.

Figure 48:
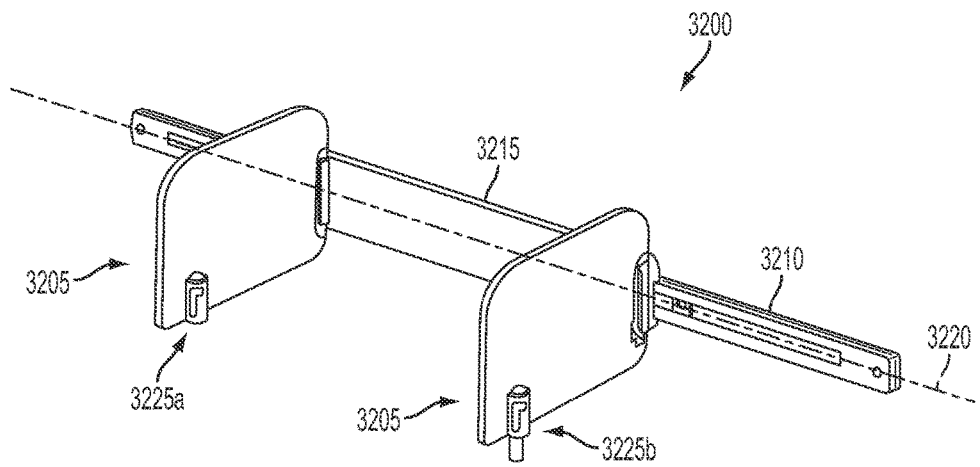
FIG. 48 is a right front isometric view of a divider assembly according to one or more embodiments shown and described herein.
Figure 49:
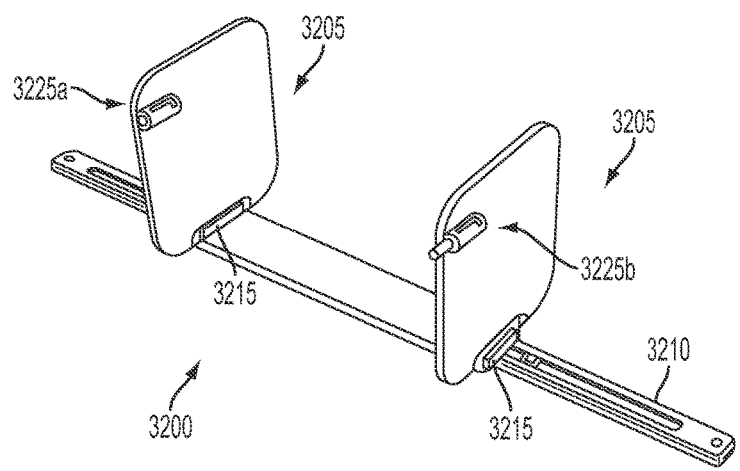
FIG. 49 is a right bottom isometric view of the divider assembly according to one or more embodiments shown and described herein.

FIG. 48 illustrates a right front isometric view of another embodiment of a divider assembly 3200. FIG. 49 illustrates a right bottom isometric view of the divider assembly 3200. Referring to FIGS. 48 and 49, the divider assembly 3200 may include one or more dividers 3205 coupled to a support structure 3210. Each divider 3205 may be hingedly coupled to the support structure 3210 and separated by a spacer 3215. The one or more dividers 3205 and spacer 3215 may be configured to move along or parallel with a support structure axis 3220 to position each divider 3205 within the storage volume 3122. The one or more dividers 3205 may allow a user to accommodate different sized and/or non-uniform objects within the storage volume 3122.

Figure 50:
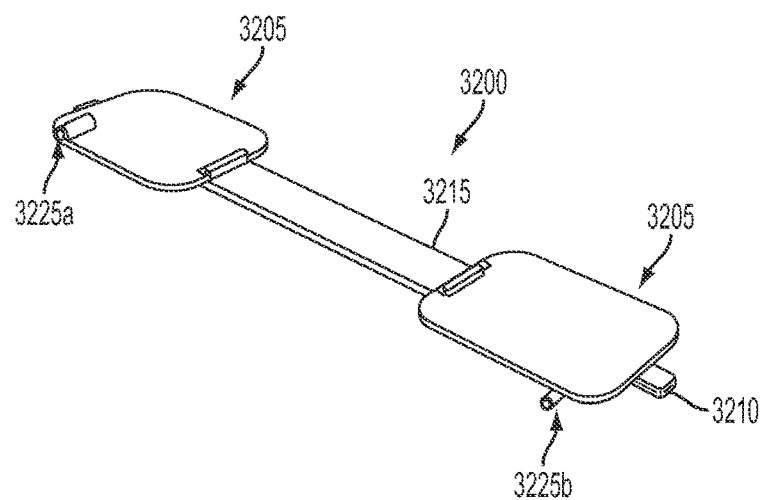
FIG. 50 depicts the divider assembly in a storage position according to one or more embodiments shown and described herein.

FIG. 50 depicts the divider assembly 3200 in a storage position. Each divider 3205 is hingedly coupled to the support structure 3210. If a large object is placed within the storage volume 3122, each divider 3205 or both may be transitioned to the storage position to accommodate the large object in the storage volume 3122.

Figure 51:
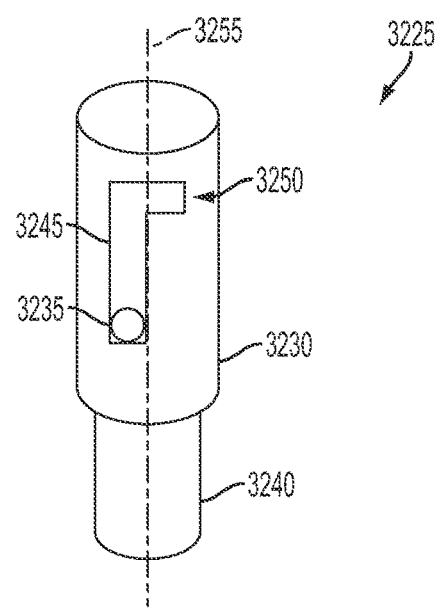
FIG. 51 depicts a lock pin according to one or more embodiments shown and described herein.

In one embodiment, and referring to FIGS. 48-50, the divider assembly 3200 may also include one or more lock pin assemblies 3225. A first lock pin 3225*a* is shown in a retracted position and a second lock pin 3225*b* is shown in an extended position. Referring now to FIG. 51, each lock pin assembly 3225 may include a lock housing 3230, a lock handle 3235, and a lock pin 3240. The lock handle 3235 may be coupled to the lock pin 3240 and may be used to transition the lock pin 3240 from the extended position to the retracted position. An L-shaped channel 3245 may be used to guide the lock handle 3235 between the extended position and the retracted position. The L-shaped channel 3245 may also be configured to retain the lock handle 3235 in retracted position at the upper portion 3250 of the L-shaped channel 3245. In one embodiment, a lock spring (not shown) internal to the lock housing 3230 may be captured between the lock housing 3230 and the lock pin 3240 and configured to bias the lock pin 3240 in an extended position along a lock axis

3255. The lock pin 3240 may slidably couple with a plurality of apertures in the bottom wall 3130 of FIG. 46.

Figure 52:
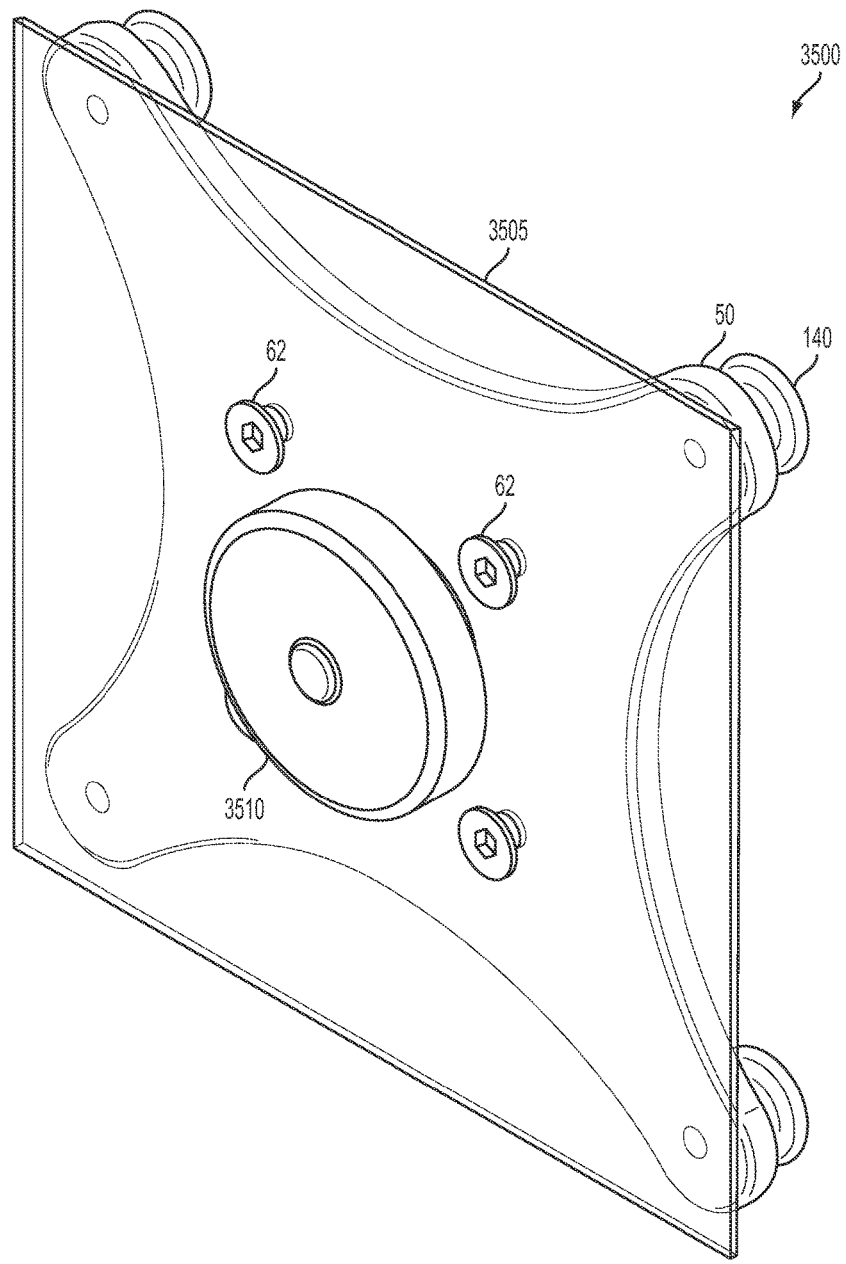
FIG. 52 is an isometric view of a cabinet mount according to one or more embodiments shown and described herein.
Figure 53:
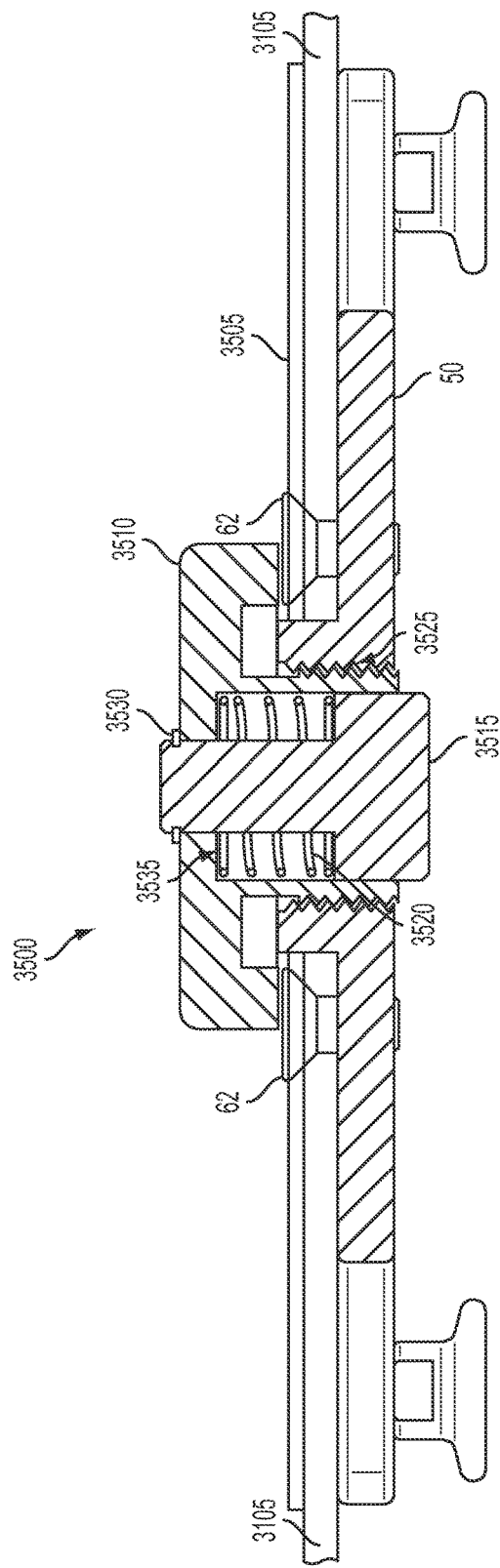
FIG. 53 is a cross-sectional isometric view of the cabinet mount according to one or more embodiments shown and described herein.
Figure 54:
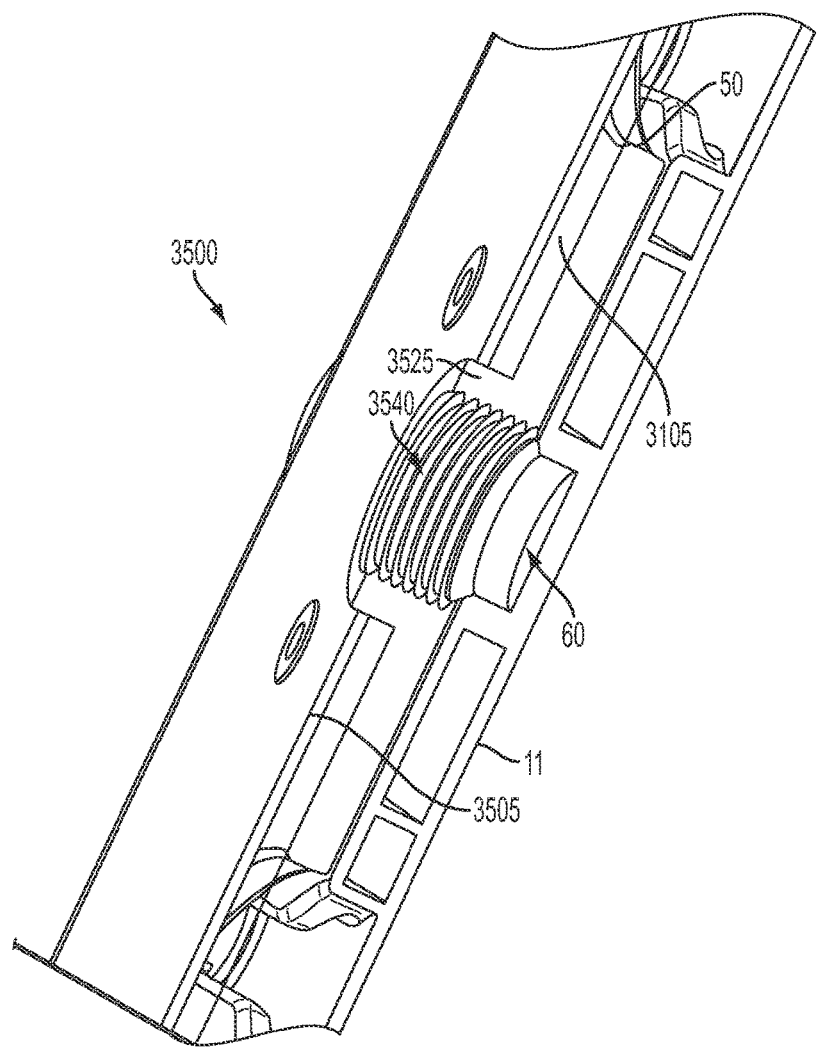
FIG. 54 is an isometric cross-sectional view of the cabinet mount according to one or more embodiments shown and described herein.

FIG. 52 is an isometric view of a cabinet mount 3500. A cabinet plate 3505 is coupled to the mount 50 via one or more fastening devices 62. The cabinet plate 3505 has been illustrated in FIG. 52 as transparent for ease of viewing the mount 50 for illustrative purposes only and not limitation. Although the cabinet plate 3505 could be fabricated to be transparent, in this embodiment, the cabinet plate 3505 is fabricated from steel and thus not transparent. As shown in FIGS. 53 and 54, the cabinet plate 3505 and the mount 50 may capture the rear wall 3105 (FIG. 46) of the wall cabinet 3100 (FIG. 46). The cabinet plate 3505 may be positioned within the storage volume 3122 (FIG. 46) and the mount 50 may be positioned in the exterior volume 3121 (FIG. 46). A turn knob 3510 may be use to lock the mount 50 to the track (i.e., as used throughout the disclosure of the cabinet mount 3500, the "track" includes the track 10 of FIGS. 1, 2, and 27 through 31, the minitrack 12, shown in FIG. 38, or the quick mount track 11, shown in FIGS. 28A and 56). The mount 50 may have one or more studs 140 as described above to secure the wall cabinet 3100 to the track.

FIG. 53 is a cross-sectional view of the cabinet mount 3500. The one or more fastening devices 62 may couple the cabinet plate 3505, the rear wall 3105 of the wall cabinet 3100 (FIG. 46), and the mount 50 together. The turn knob 3510 may rotatably couple with a threaded collar 3525 of the mount 50. The turn knob 3510 may include a locking pin 3515, a retaining clip 3530, and a pin spring 3520. The pin spring 3520 may be captured in a knob channel 3535 between the turn knob 3510 and the locking pin 3515. The retaining clip 3530 defines a maximum amount of travel (i.e., the maximum extent that the locking pin 3515 extends beyond the mount 50 in the extended position) for the locking pin 3515 under the biasing force of the pin spring 3520.

FIG. 54 is an isometric cross-sectional view of the cabinet mount 3500. The threaded collar 3525 of the mount 50 is shown without the turn knob 3510 threadably coupled to the mount 50. The mount 50 is shown engaged with the track. When engaged, a threaded collar aperture 3540 is aligned with the locking pin aperture 60 (FIG. 56) of track.

Figure 55:
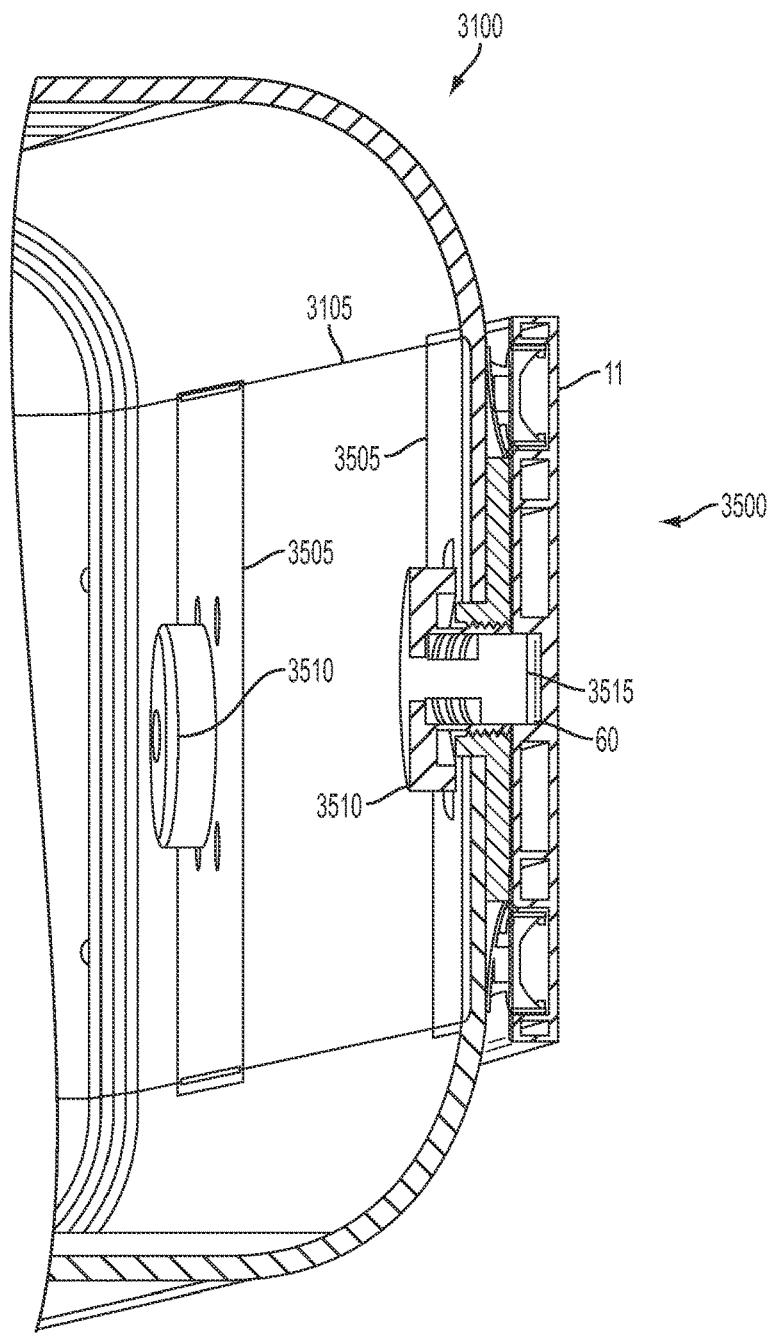
FIG. 55 is a cross-sectional view of the wall cabinet according to one or more embodiments shown and described herein.

FIG. 55 is a cross-sectional isometric view of the wall cabinet 3100 from FIG. 47 coupled to the cabinet mount 3500. The wall cabinet 3100 may be lifted and positioned such that the mount 50 engages the track as described above. When the wall cabinet 3100 is slid into position on the track (i.e., the threaded collar aperture 3540 is aligned with the locking pin aperture 60 (FIG. 56) of track), the track supports the full weight of the wall cabinet 3100 and its contents. The turn knob 3510 may be inserted into the threaded collar aperture 3540 through the storage volume 3122 (FIG. 46). The turn knob 3510 may be rotated until the locking pin 3515 is inserted into the locking pin aperture 60 of the track. The coupling of the locking pin 3515 with the locking pin aperture restrains the lateral movement between the wall cabinet 3100 in relation to the track such that the wall cabinet is crash-ready. The pin spring 3520 provides the snubber function described above and biases the locking pin 3515 against the track to dampen and/or eliminate any movement between the mount 50 (and the wall cabinet 3100) and track.

Figure 57:
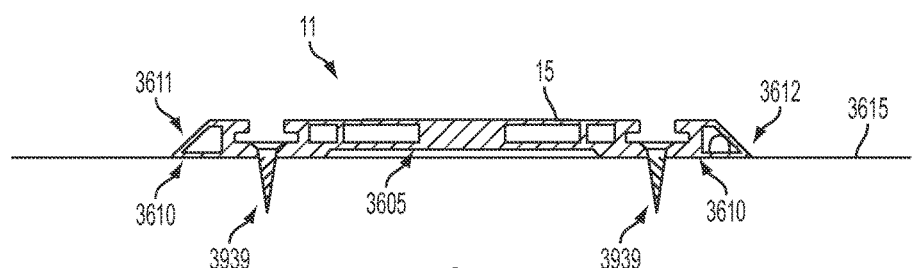
FIG. 57 is a side view of the track according to one or more embodiments shown and described herein.

FIGS. 56 and 57 illustrate another embodiment of the quick mount track 11 shown in FIGS. 28A and 28B. The quick mount track 11 may include tapered edges coupled to a surface 3615. The surface 3615 may include a vehicle wall, vehicle structure, building wall, building structure, or other frame or support member that may be used to bear the weight of the quick mount track 11 and the equipment coupled to the quick mount track 11. The surface 3615 is defined further below as a structure or mobile object.

Figure 60:
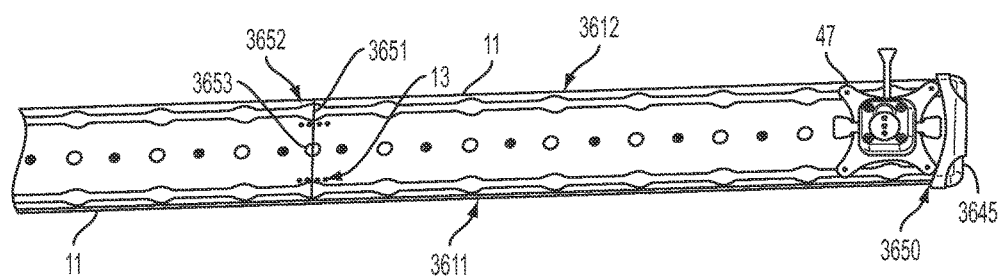
FIG. 60 is a front view of two tracks coupled end-to-end according to one or more embodiments shown and described herein.

The backing plate 15 of the quick mount track 11 may include one or more mounting points 3600, a chase 3605, the locking pin aperture 60, the first slot 20, the second slot 30, and a flush mounting surface 3610. The one or more mounting points 3600 may be locations where the quick mount track 11 is secured to a surface or structure. The one or more mounting points 3600 may be positioned within the first outer slot 20 and the second outer slot 30 such that when the various embodiments of the mount 50 (e.g., FIG. 3) disclosed herein are coupled to the quick mount track 11, the mounting studs are position directly over top of the one or more mounting points 3600. By locking the mount 50 directly above the one or more mounting points 3600, any forces exerted on the mount 50 are translated directly to the one or more mounting points 3600 and directly into the surface or structure through the one or more fastening devices 3939. In other words, the moment arm of any force exerted on the mount 50, and equipment coupled to the mount 50, is translated directed to the surface or structure. FIG. 60 illustrates the mount 50 with the mounting studs positioned over the one or more mounting points 3600. The reduction in the moment arm of any force exerted on the mount 50 increases the amount of force the quick mount track 11 with tapered edges may sustain without damage and be crash-ready.

Still referring to FIGS. 56 and 57, the backing plate 15 may further include a first plate edge 3611 and a second plate edge 3612. The first plate edge 3611, the second plate edge 3612, the plurality of locking pin apertures 60, the first outer slot 20, and the second outer slot 30 may be all substantially parallel to each other and run a length L of the backing plate 15. The first plate edge 3611 and the second plate edge 3612 define the outermost part of the backing plate 15 along the length L of the backing plate 15. The quick mount track 11 may have a plurality of half regions 3652, and half apertures 3653, along a common edge 3651 of the quick mount track 11 to allow the quick mount tracks 11 to be coupled end-to-end as shown in FIG. 60.

Referring to FIG. 57, when the quick mount track 11 is coupled to the surface 3615, the flush mounting surface 3610 may create and maintain a seal between the quick mount track 11 and the surface 3615. The first plate edge 3611 and the second plate edge 3612 may be tapered to join with the flush mounting surface 3610. The flush mounting surface 3610 may be a planar surface defined along the first plate edge 3611 and the second plate edge 3612. This may be advantageous in situations where the surface 3615 is cleaned and it is not desired to have contaminates, biological material, etc., get behind the quick mount track 11 where it cannot be cleaned. The chase 3605 may be disposed in the backing plate 15 and may be defined by the flush mounting surface 3610 and the backing plate 15. The chase 3605 may allow wires, cables, pneumatic hoses, etc., to run the length of the quick mount track 11 and be protected from any hazards the quick mount track 11 may be exposed to.

Figure 58:
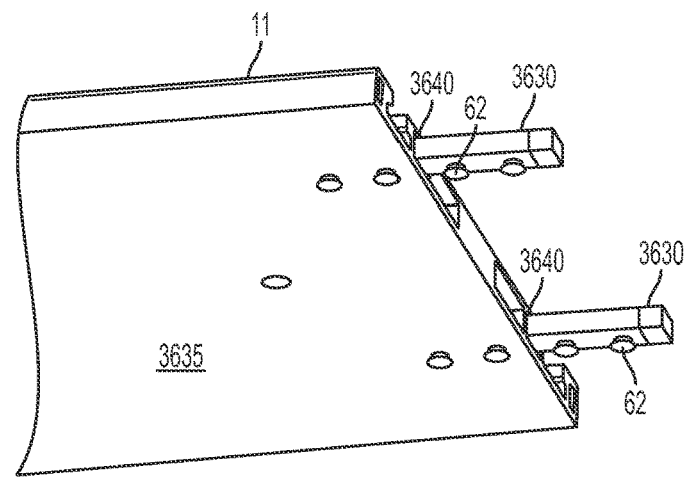
FIG. 58 is an isometric view of a track key according to one or more embodiments shown and described herein.

FIG. 58 is an isometric view of a track key 3630. The track key 3630 may be used to join two tracks (i.e., as used throughout the disclosure of the track key 3630, the "track" includes the track 10 of FIGS. 1, 2, and 27 through 31, the minitrack 12, shown in FIG. 38, or the quick mount track 11, shown in FIGS. 28A and 56) together to increase the span of the track on a surface or structure. The track key 3630 slidably couples with a key aperture 3640 in the track. One or more fastening devices 62 may couple the track to the track key 3630 such that the two tracks do not separate. The one or more fastening devices 62 may be coupled to the track key 3630 through a track back surface 3635 such that they are flush with the track back surface 3635. In some embodiments, the one or more fastening devices 62 may be coupled in the chase 3605 of FIG. 57.

Figure 59:
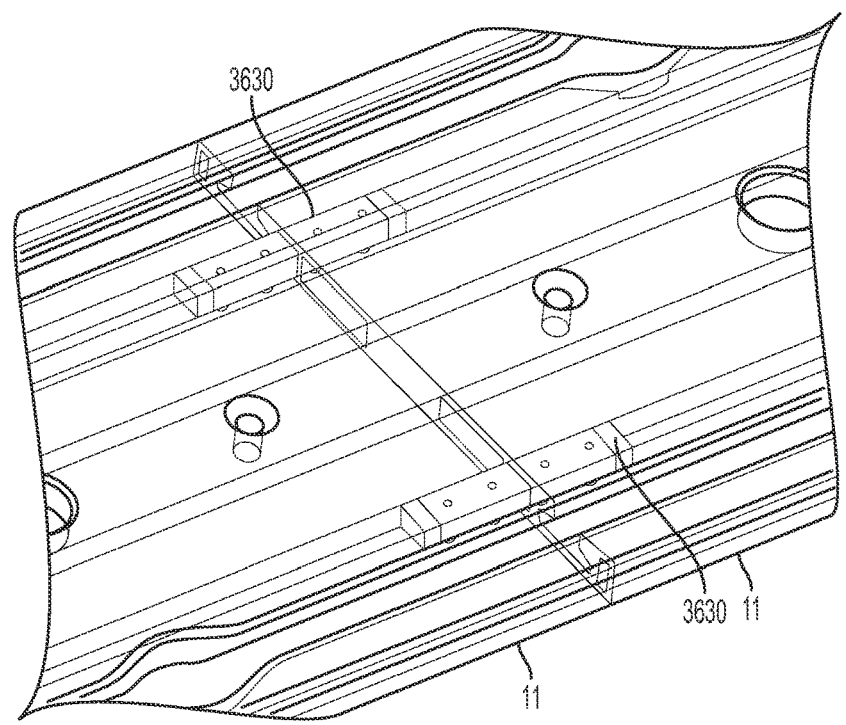
FIG. 59 is an isometric view of two tracks coupled end-to-end by the track key according to one or more embodiments shown and described herein.

FIG. 59 is an isometric view of two tracks coupled end-to-end by the track key 3630. The track key 3630 may slidably couple with a key aperture 3640 in the track through an interference fit. The interference fit with the key aperture 3640 may allow for minimal movement between both tracks and be crash-ready.

FIG. 60 is a front view of two tracks coupled end-to-end with a track key 3630. Each track may have a plurality of half regions 3652, and half apertures 3653, along a common edge 3651 of the track. The common edge 3651 may be substantially orthogonal to the first plate edge 3611 and the second plate edge 3612. When two tracks are joined, each half region 3652 may define an open region 35 (e.g., FIG. 1) or a half diamond contoured target regions 13 (FIG. 28A). A protective end-cap 3645 may be coupled to each outer end 3650 of each track. The protective end-cap 3645 may be made from a hard plastic or a soft rubber. The protective end-cap 3645 may be used to seal each outer end 3650 of the track and to cover a sharp edge of the track. The protective end-caps 3645 may also allow for ease of cleaning and to prevent contaminates, biological material, etc. from entering the structure of the quick mount track 11.

Figure 61:
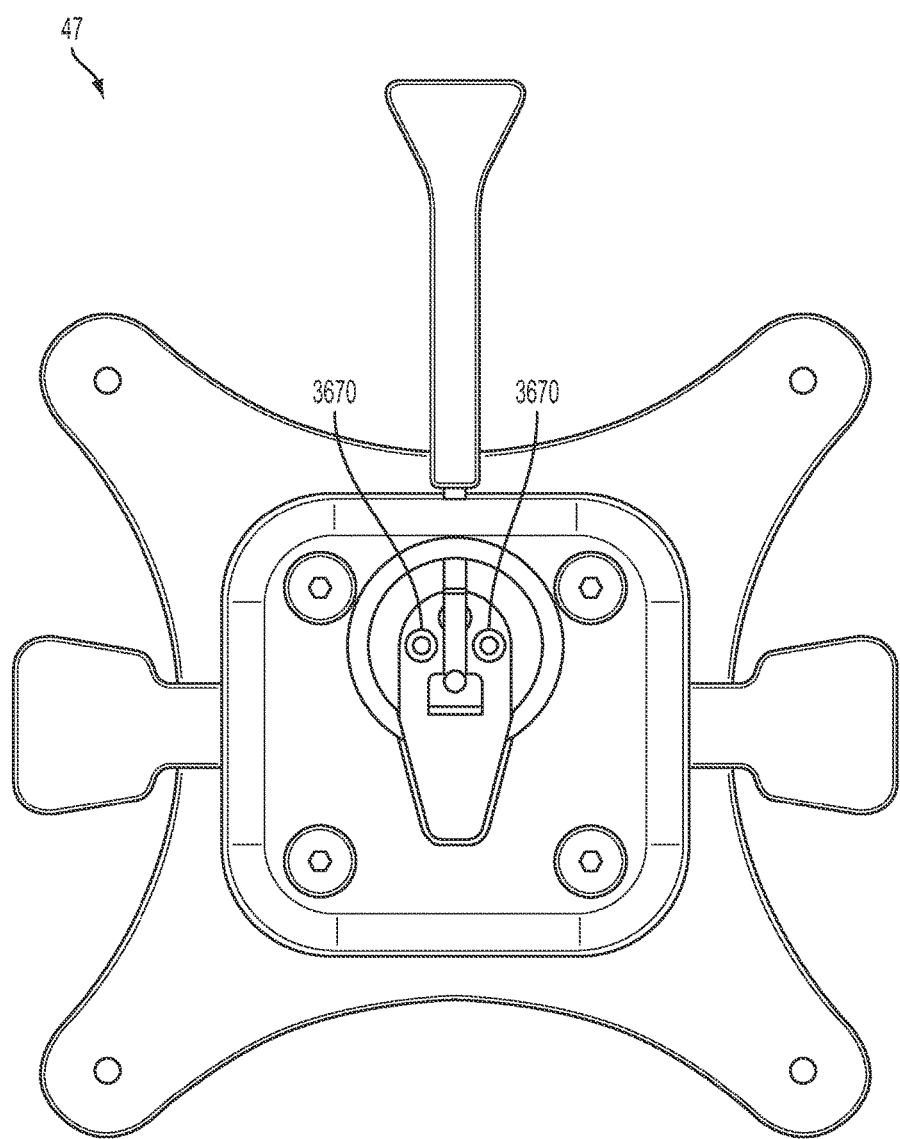
FIG. 61 is a top view of another embodiment of the wedge mount according to one or more embodiments shown and described herein.

FIG. 61 is another embodiment of the wedge mount 47 shown in FIG. 37. The wedge mount 47 may include one or more magnetic areas 3670 that may be configured to provide an attractive magnetic force on the wedge interface 72 shown in FIG. 14. The one or more magnetic areas 3670 may aid a user who is mounting an item or device coupled to the wedge interface 72 by exerting the attractive magnetic force on the wedge interface 72 when the wedge interface 72 is within proximity to the wedge mount 47. This may further aid a user who cannot visually spot the bowl aperture 54 (FIG. 11) to couple the wedge interface 72 with the wedge mount 47.

Figure 62:
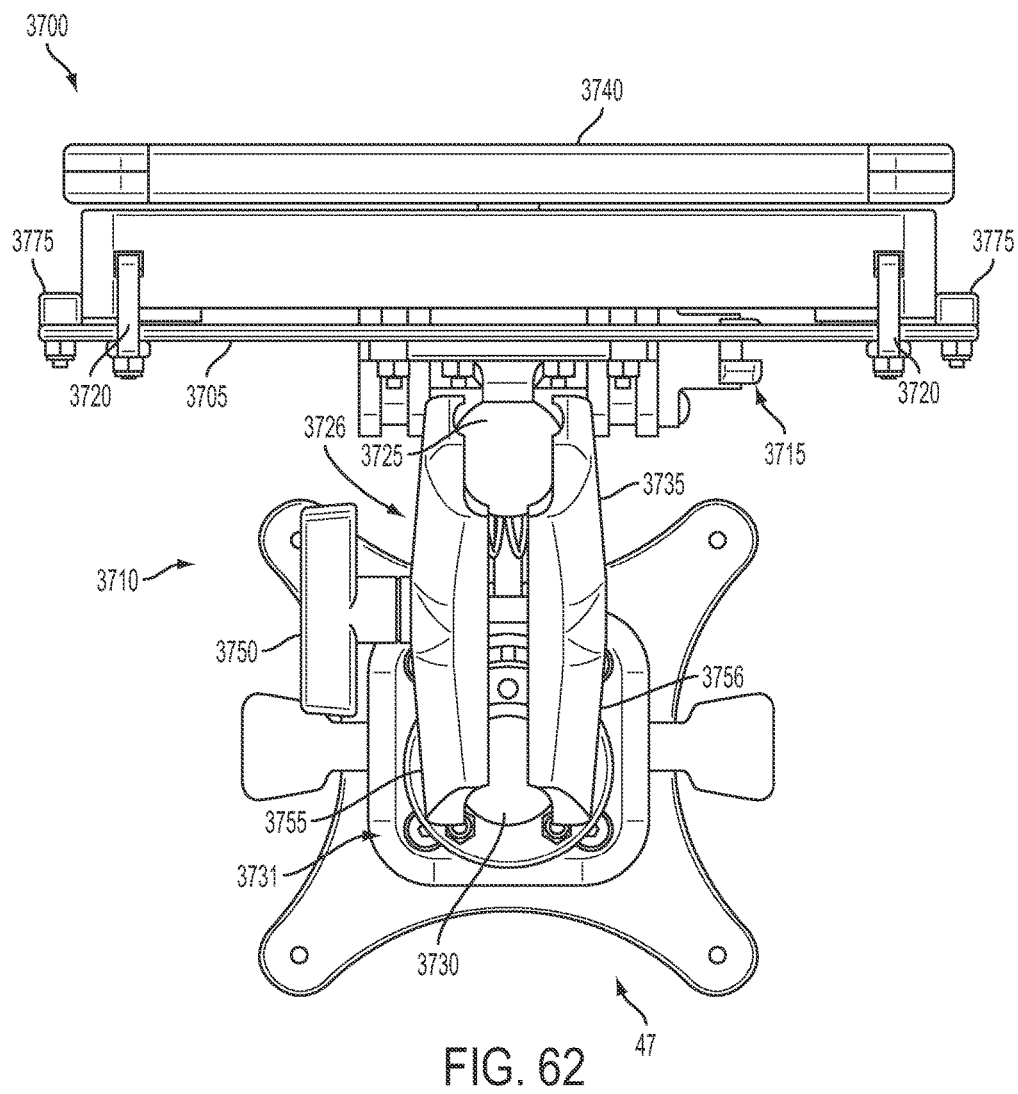
FIG. 62 is a front view of a laptop mount according to one or more embodiments shown and described herein.

FIG. 62 is a front view of a laptop mount 3700. The laptop mount 3700 may include a platform 3705, an articulating ball joint 3710, a laptop lock 3715, and a plurality of posts 3720. The articulating ball joint 3710 may include a first ball 3725, a second ball 3730, and a compression clamp 3735. The articulating ball joint 3710 may couple the platform 3705 to the wedge mount 47 (FIGS. 11 and 37). The second ball 3730 is coupled to the wedge mount 47 however it should be understood that the laptop mount 3700 may be coupled to any of the mounts described herein to removably couple the laptop mount 3700 to the track (i.e., as used throughout the disclosure of the laptop mount 3700, the "track" includes the track 10 of FIGS. 1, 2, and 27 through 31, the minitrack 12, shown in FIG. 38, or the quick mount track 11, shown in FIGS. 28A and 56). The first ball 3725 may be coupled to the platform 3705. The compression clamp 3735 may be used to freeze or restrain the movement of the platform in relation to the track when the laptop mount 3700 is in a desired position. The articulating ball joint 3710 may allow for a full range of motion of the laptop mount 3700. The compression clamp 3735 may include a bolt 3745 (FIG. 63) and wing nut 3750 to provide a compression force between a first clamp 3755 and a second clamp 3756 to capture the first ball 3725 and a first end 3726 and the second ball 3730 at a second end 3731. The first ball 3725 and the second ball 3730 may be coupled between the first clamp 3755 and the second clamp 3756. An example of an articulating ball joint 3710 is the holder and adaptor components from Ram Mounting Systems, Inc. The laptop lock 3715 may be used to secure a laptop 3740 to the platform 3705. The laptop mount 3700 may be crash-ready.

Once the laptop mount 3700 is removably coupled to the track, the articulating ball joint 3710 may be loosened via the wing nut 3750 and the laptop mount 3700 may be maneuvered until it is in a position suitable for use. The wing nut 3750 may then be tightened such that the platform 3705 is locked into position or secured from moving. The articulating ball joint 3710 allows both the platform 3705 to rotate 360 degrees around the first ball 3725 (FIG. 62) and articulate along a hemispherical surface in relation to the plane defined by the track. The articulating ball joint 3710 is crash-ready. In another embodiment, the articulating ball joint 3710 may restrain motion of the platform 3705 as defined by crash-ready and may allow movement if the force exerted on the articulating ball joint 3710 exceeds those forces for the crash-ready rating and still retain its functionality without breaking. This may allow an object within an interior of a vehicle to impact the laptop mount 3700 at a g-force greater the crash-ready rating and experience minimal damage or trauma because the laptop mount 3700 did not remain as a fixed object.

Figure 63:
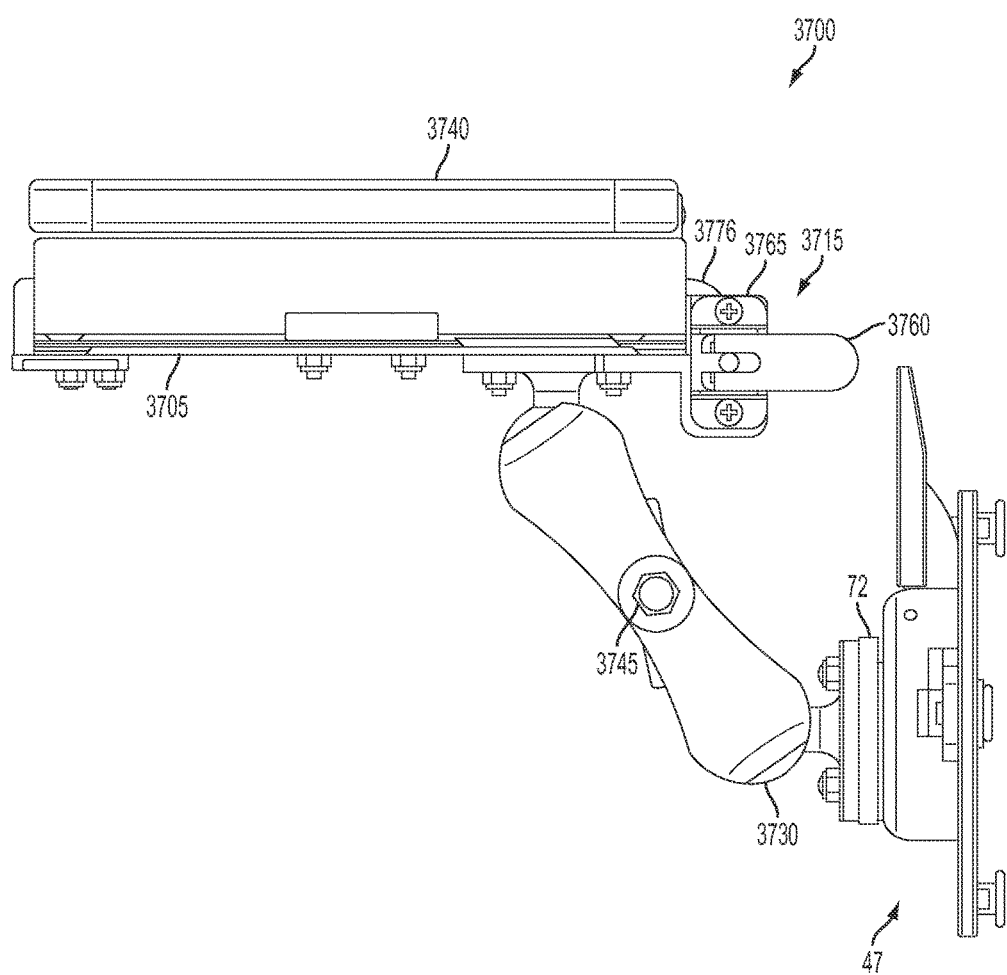
FIG. 63 is a side view of the laptop mount according to one or more embodiments shown and described herein.

FIG. 63 is a side view of the laptop mount 3700. The second ball 3730 may be coupled to the wedge mount 47. In one embodiment, the articulating ball joint 3710 may be coupled to the wedge interface 72, shown in FIGS. 14-16B and the wedge interface 72 may be removably coupled with the wedge mount 47. The laptop lock 3715 may include a paddle 3760 which is coupled to a lock actuator 3765. The lock actuator rotates a plurality of latches 3770 into a lock position and transitions the plurality of latches 3770 between the locked position and a release position. In the locked position, the laptop 3740 is secured to the platform 3705. In the release position, the laptop 3740 is enabled to be removed from the platform 3705.

Figure 64:
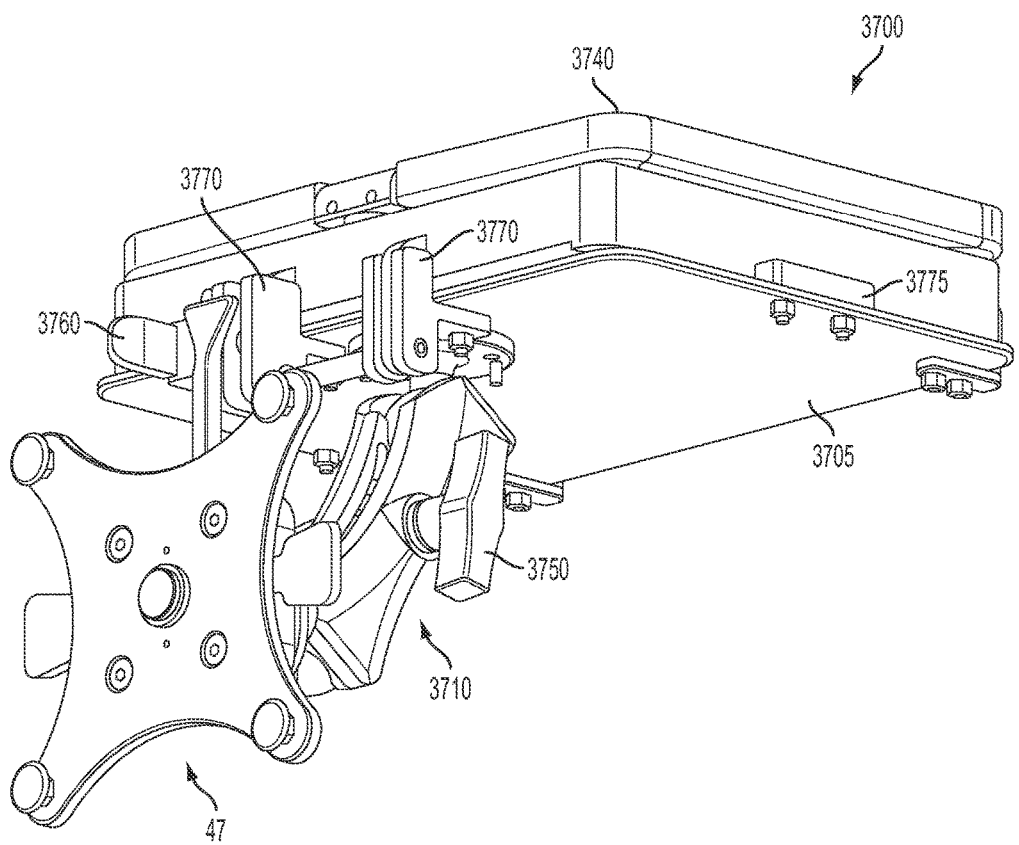
FIG. 64 is a rear isometric view of the laptop mount according to one or more embodiments shown and described herein.

FIG. 64 is a rear isometric view of the laptop mount 3700. Referring to FIGS. 62-64, the laptop lock 3715 may be in an open position such that the laptop 3740 is lower onto the platform 3705 between a plurality of blocks 3775. The plurality of blocks 3775 and the plurality of posts 3720 may secure the laptop 3740 from sliding around on the platform 3705. Once the laptop 3740 is on the platform 3705, the paddle 3760 on the laptop lock 3715 is actuated such that the plurality of latches 3770 transition from the release position to a locked position. FIG. 64 illustrates the laptop lock 3715 in the locked position.

Figure 65:
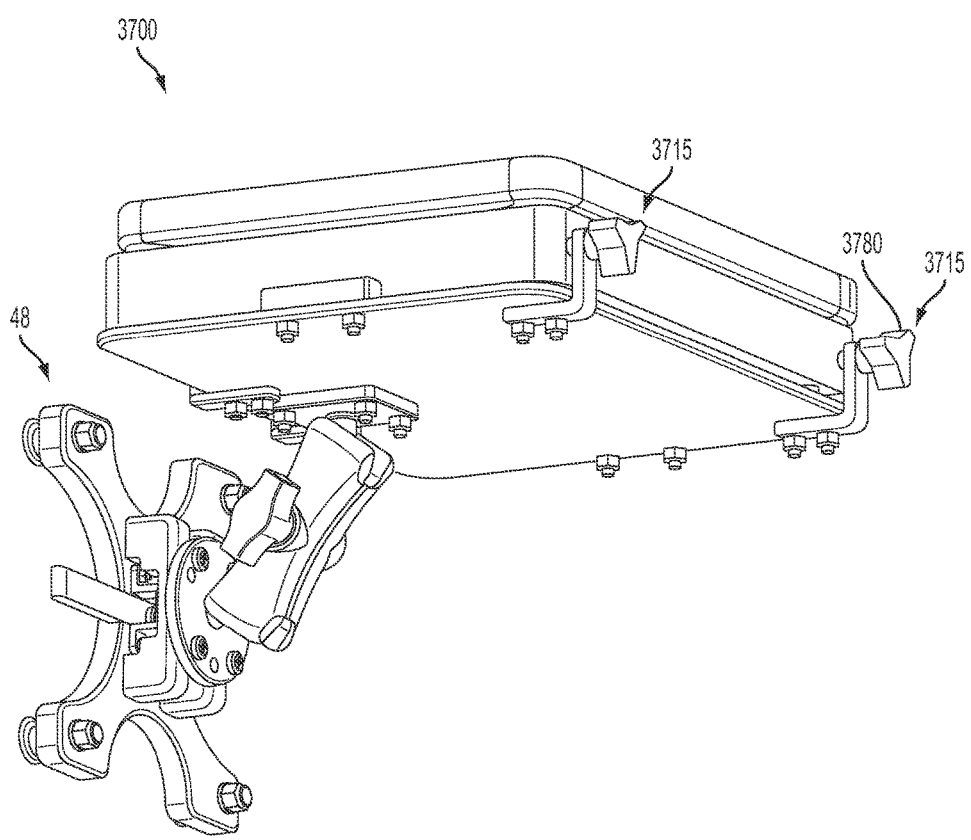
FIG. 65 is a front isometric view of the laptop mount according to one or more embodiments shown and described herein.

FIG. 65 is a front isometric view of the laptop mount 3700. In this embodiment, the laptop mount 3700 is coupled to an x-mount 48. The x-mount 48 may operate identically to the mount 50 shown in FIG. 3. The laptop lock 3715 is this embodiment consists of a set of thumb screws 3780. This embodiment of the laptop mount 3700 may also be crash-ready. Although FIGS. 62-65 illustrate the laptop mount 3700 as configured and holding a laptop. It is understood that the laptop mount 3700 could be configured to hold and/or connect to an electronic notepad such as, for example, an iPad®, or the like.

Figure 66:
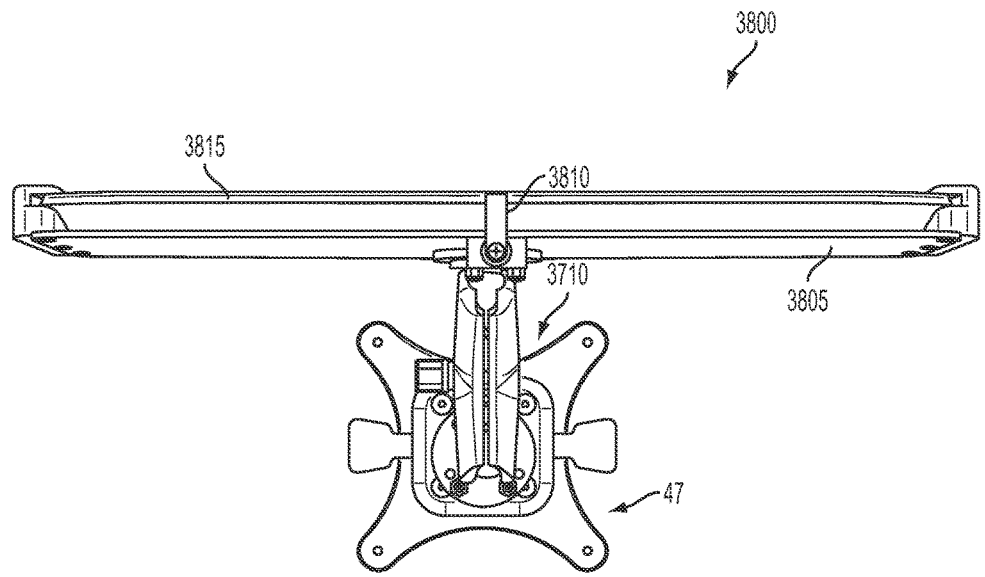
FIG. 66 is a front view of a tray mount according to one or more embodiments shown and described herein.

FIG. 66 is a front view of a tray mount 3800. The tray mount 3800 may include a tray rack 3805, the articulating ball joint 3710 (shown in FIGS. 62-65 and described above in relation to the laptop mount 3700), and a rotating post 3810. The tray rack 3805 is coupled to the articulating ball joint 3710. The compression clamp 3735 (FIG. 62) may be used to freeze or secure the movement of the tray rack 3805 in relation to the track (i.e., as used throughout the disclosure of the tray mount 3800, the "track" includes the track 10 of FIGS. 1, 2, and 27 through 31, the minitrack 12, shown in FIG. 38, or the quick mount track 11, shown in FIGS. 28A and 56) when the tray mount 3800 is in a desired position. In one embodiment, the articulating ball joint 3710 may be coupled to a mount 50 as described above. In another embodiment, the tray mount 3800 may be coupled to the wedge mount 47. In illustrative embodiments, the articulating ball joint 3710 may be coupled to the wedge interface 72, shown in FIGS. 14-16B and the wedge interface 72 may be removably coupled with the wedge mount 47. It should be understood that the tray mount 3800 may be coupled to any of the mounts described herein. The tray mount 3800 may be crash-ready.

Figure 67:
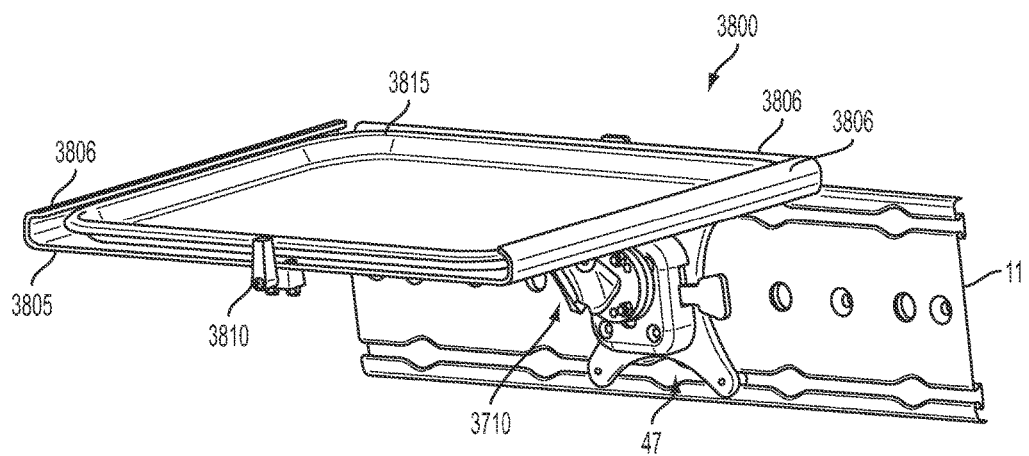
FIG. 67 is an isometric view of the tray mount according to one or more embodiments shown and described herein.

FIG. 67 is an isometric view of the tray mount 3800 coupled to the track, specifically the quick mount track 11 as shown in FIG. 56. Referring to FIGS. 64 and 67, the laptop mount 3700 of FIG. 64 and the tray mount 3800 of FIG. 67 may be adjustable via the articulating ball joint 3710 as described above in relation to the laptop mount 3700.

Referring to FIGS. 66 and 67, the tray rack 3805 may be configured to capture a tray 3815. The tray rack 3805 may include a plurality of capture lips 3806 slidably couple with and to capture the tray 3815 in the tray rack 3805. The rotating post 3810 is shown in the retained position wherein the tray 3815 is captured by the combination of the tray rack 3805 and the rotating post 3810. If the rotating post 3810 is rotated 180 degrees, the tray 3815 may be slid out of the tray rack 3805.

Figure 68:
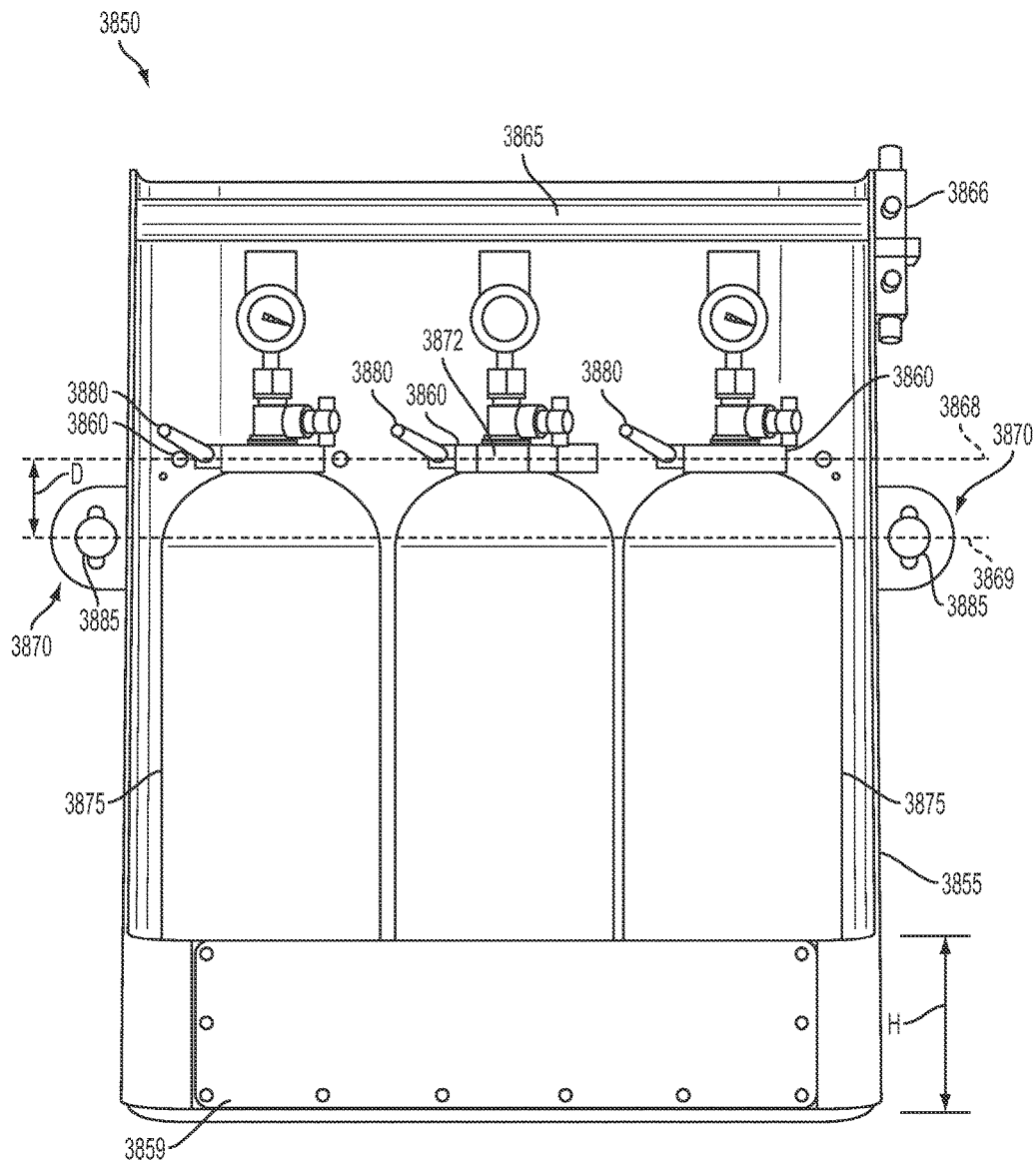
FIG. 68 is a front view of an oxygen tank mount according to one or more embodiments shown and described herein.

FIG. 68 is a front view of an oxygen tank mount 3850. The oxygen tank mount 3850 may include a frame 3855, one or more bottle retention clamps 3860, a frame handle 3865, a manifold 3866, and one or more track releases 3870. The frame 3855 may be configured to hold one or more oxygen tanks 3875. The frame handle 3865 may be coupled to the frame 3855 and may allow a user to carry the oxygen tank mount 3850 between locations or maneuver the oxygen tank mount 3850 to mount it to the track (i.e., as used throughout the disclosure of the oxygen tank mount 3850, the "track" includes the track 10 of FIGS. 1, 2, and 27 through 31, the minitrack 12, shown in FIG. 38, or the quick mount track 11, shown in FIGS. 28A and 56). The one or more bottle retention clamps 3860 may be coupled to the frame 3855 and may include a quick release 3880 to allow each oxygen tank 3875 to be removably coupled to each bottle retention clamp 3860. Each bottle retention clamp 3860 may capture a neck collar 3872 of the each oxygen tank 3875 to secure each oxygen tank 3875 to the frame 3855.

A sleeve height H of a sleeve wall 3859 may secure the lower half of the one or more oxygen tanks 3875. The sleeve height H may depend on a weight of each oxygen tank 3875. In one embodiment, the frame handle 3865 may be removably coupled to the frame 3855. The sleeve height H may be larger in this embodiment because each oxygen tank 3875 may be removed from the frame 3855 after the frame handle 3865 has been removed. In another embodiment, the frame handle 3865 may be fixedly coupled to the frame 3855. The sleeve height H may be lower to allow each oxygen tank 3875 to be tilted to be removed and inserted into the frame 3855.

A tank axis 3868 may define a horizontal alignment of the one or more bottle retention clamps 3860. A tank mount axis 3869 may define a center axis of the plurality of mounting studs 140 (FIG. 3) and shown in greater detail in FIG. 70. A distance D may be modified such that a center of gravity for the oxygen tank mount 3850 is along the tank mount axis 3869. In one example, a spacer may be placed below one or more oxygen tank 3875 to raise its center of gravity more towards the tank mount axis 3869. In this example, the bottle retention clamp 3860 for that oxygen tank may be raised also and may not lie along the tank axis 3868. This may allow any force exerted on the oxygen tank mount 3850 to be transferred directly to the track and be crash-ready.

Figure 69:
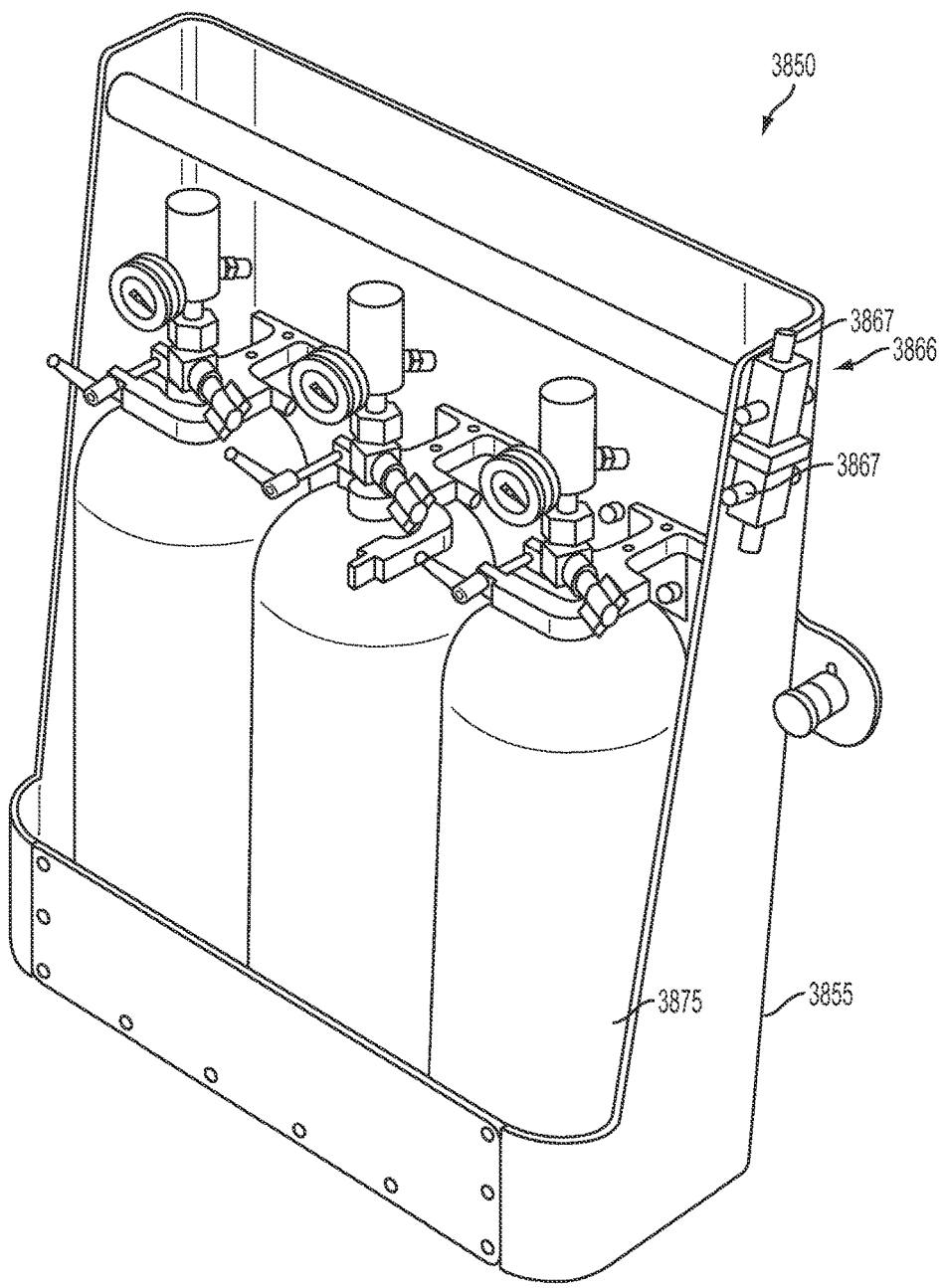
FIG. 69 is an isometric view of the oxygen tank mount according to one or more embodiments shown and described herein.

FIG. 69 is an isometric view of the oxygen tank mount 3850. A manifold 3866 may be coupled to the frame 3855. A tube network 3851 (FIG. 71) may fluidly couple each of the one or more oxygen tanks 3875 to the manifold 3866. The manifold 3866 may include a pressure reducer (not shown), a pressure gauge (not shown), and one or more ports 3867 to allow other medical devices (not shown) to fluidly couple with the manifold and have access to the oxygen within the one or more oxygen tanks 3875.

Figure 70:
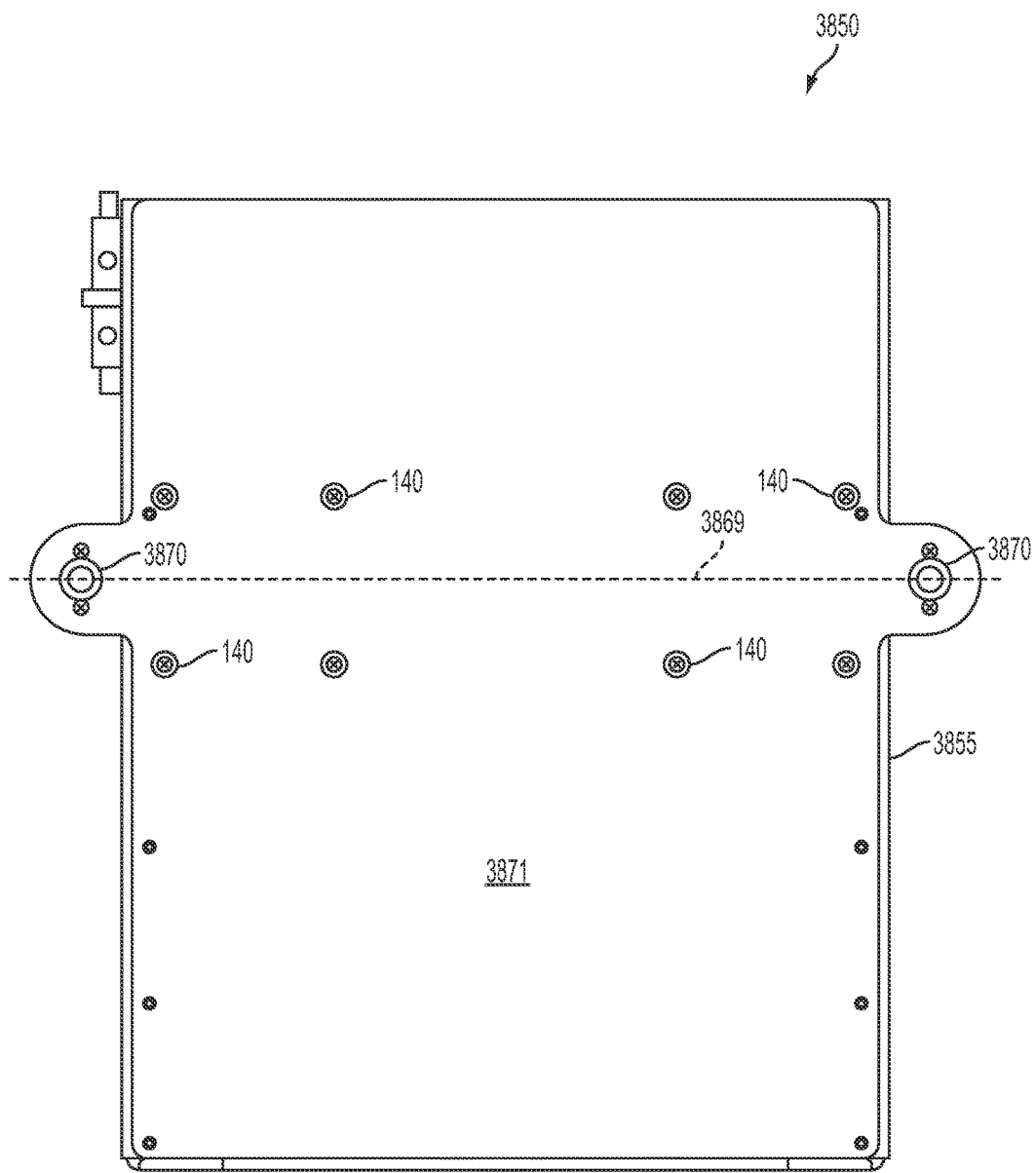
FIG. 70 is a rear view of the oxygen tank mount according to one or more embodiments shown and described herein.

FIG. 70 is a rear view of the oxygen tank mount 3850. The frame 3855 may include a rear surface 3871 of the frame 3855 and the plurality of mounting studs 140 (FIG. 3) arranged on the rear surface 3871 such that the oxygen tank mount 3850 may be removably coupled to the track. The one or more track releases 3870 may be coupled to the frame 3855 and be biased into a locked position such that when the oxygen tank mount 3850 is coupled to the track and slid into position, the one or more track releases 3870 bias a locking pin into a locking pin aperture 60 (FIG. 56) of the track. The one or more track releases 3870 may include a release handle 3885 (FIG. 68) that may be pulled to pull the locking pin out of the locking pin aperture and release the oxygen tank mount 3850 from the track.

Figure 71:
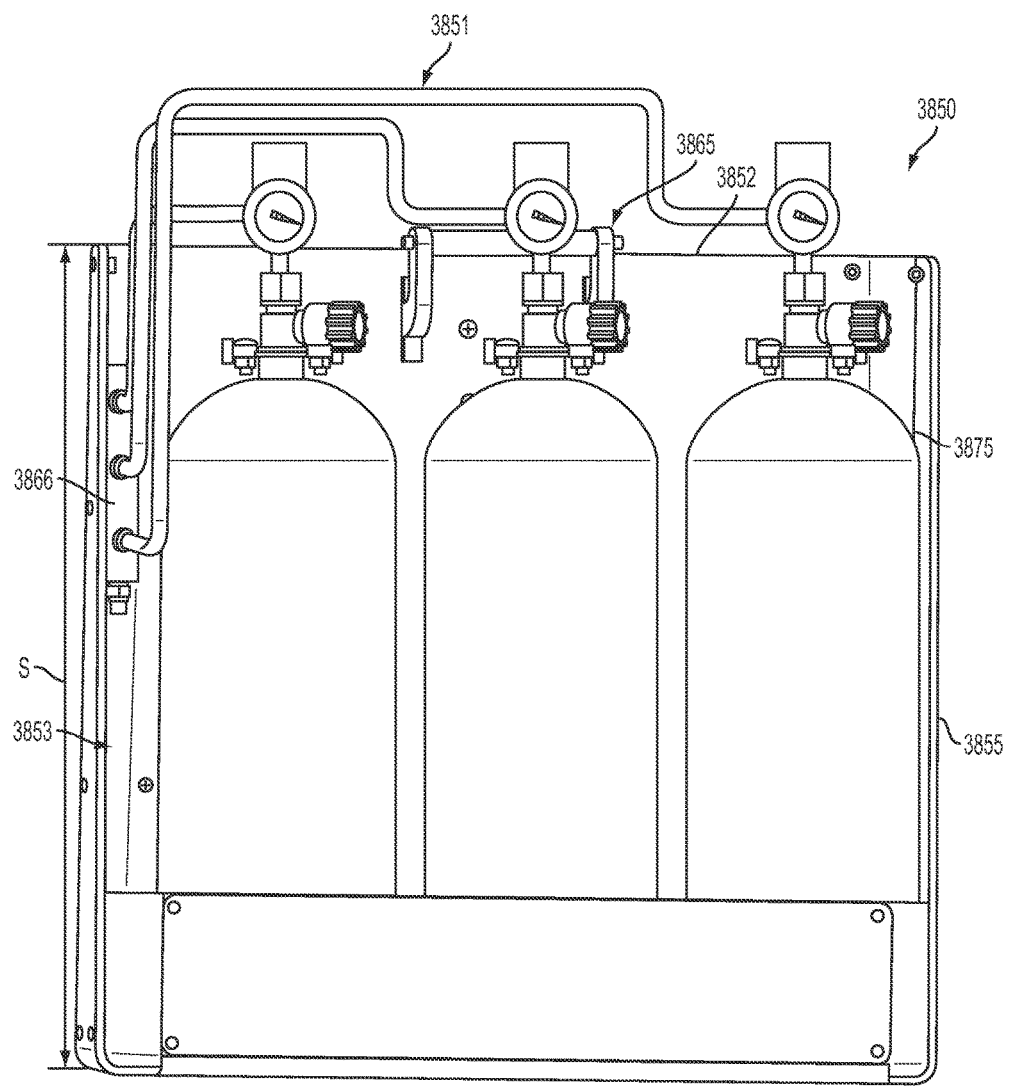
FIG. 71 is a front view of another embodiment of the oxygen tank mount according to one or more embodiments shown and described herein.

FIG. 71 is a front view of another embodiment of the oxygen tank mount 3850. The differences between FIGS. 68-70 and FIG. 71 will be highlighted herein. Still referring to FIG. 71, the frame handle 3865 in this embodiment may be coupled to a rear frame wall 3852. This may allow for the rear frame wall 3852 to have a shorter height S when compared the embodiment shown in FIGS. 68-70 and may allow for each oxygen tank 3875 to be removed from the frame 3855 without tilting the oxygen tank 3875. The manifold 3866 in this embodiment may be coupled to the frame 3855 on an interior side 3853 of the frame 3855. This position of the manifold 3866 may provide increased protection of the manifold 3866 and the tube network 3851 from hazards external to the oxygen tank mount 3850 and increase the survivability of the manifold 3866 during a crash event.

Figure 72:
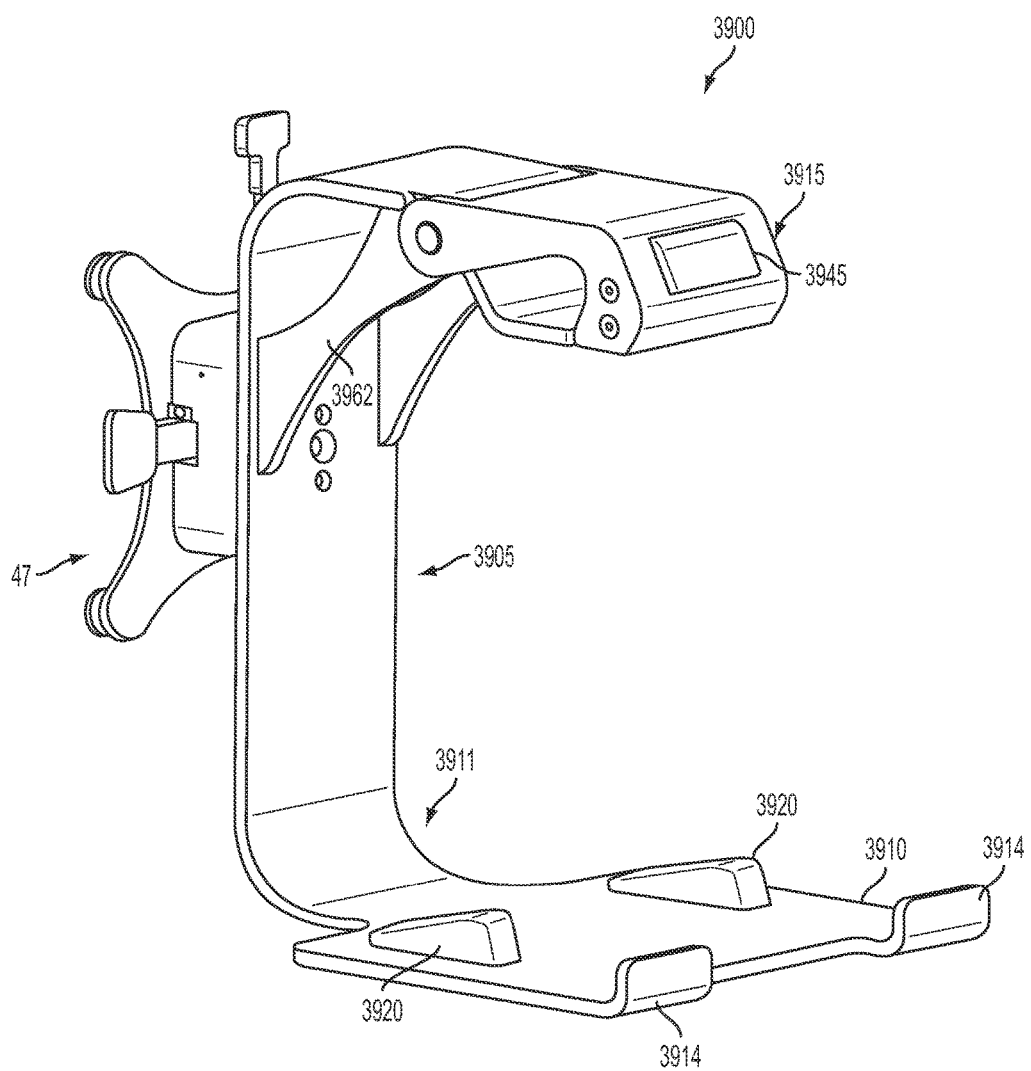
FIG. 72 is an isometric view a defibrillator mount according to one or more embodiments shown and described herein.

FIG. 72 is an isometric view a defibrillator mount 3900. The defibrillator mount 3900 may include a c-frame 3905, a base 3910, and a jaw clamp 3915. The c-frame 3905 may be coupled to the base 3910, the jaw clamp 3915, and a mount. The c-frame 3905 may include structural bracing 3962 to reinforce the c-frame. The defibrillator mount 3900 may be crash-ready. It should be understood that any mount described herein may be used to couple the defibrillator mount 3900 to the track (i.e., as used throughout the disclosure of the defibrillator mount 3900 and the compression defibrillator mount 3901 (FIG. 76), the "track" includes the track 10 of FIGS. 1, 2, and 27 through 31, the minitrack 12, shown in FIG. 38, or the quick mount track 11, shown in FIGS. 28A and 56) and may include the mount 50 (FIG. 3) and combination of the wedge interface 72 (FIG. 14) and wedge mount 47 (FIG. 11). The base 3910 may be coupled to a bottom end 3911 of the c-frame 3905 and may include one or more retention blocks 3920 and a retention lip 3914. The one or more retention blocks 3920 may be used to slidably couple with and secure a defibrillator 3925 (FIG. 73) to the base 3910. The retention lip 3914 may be used to restrain the defibrillator 3925 from lateral motion and may serve as a guide when placing the defibrillator 3925 in the defibrillator mount 3900 as described below. The one or more retention blocks 3920 may be shaped so as to fill in any cavities in the bottom of the defibrillator 3925. The one or more retention blocks may be configured to secure the defibrillator 3925 from fore-aft and lateral motion.

Figure 73:
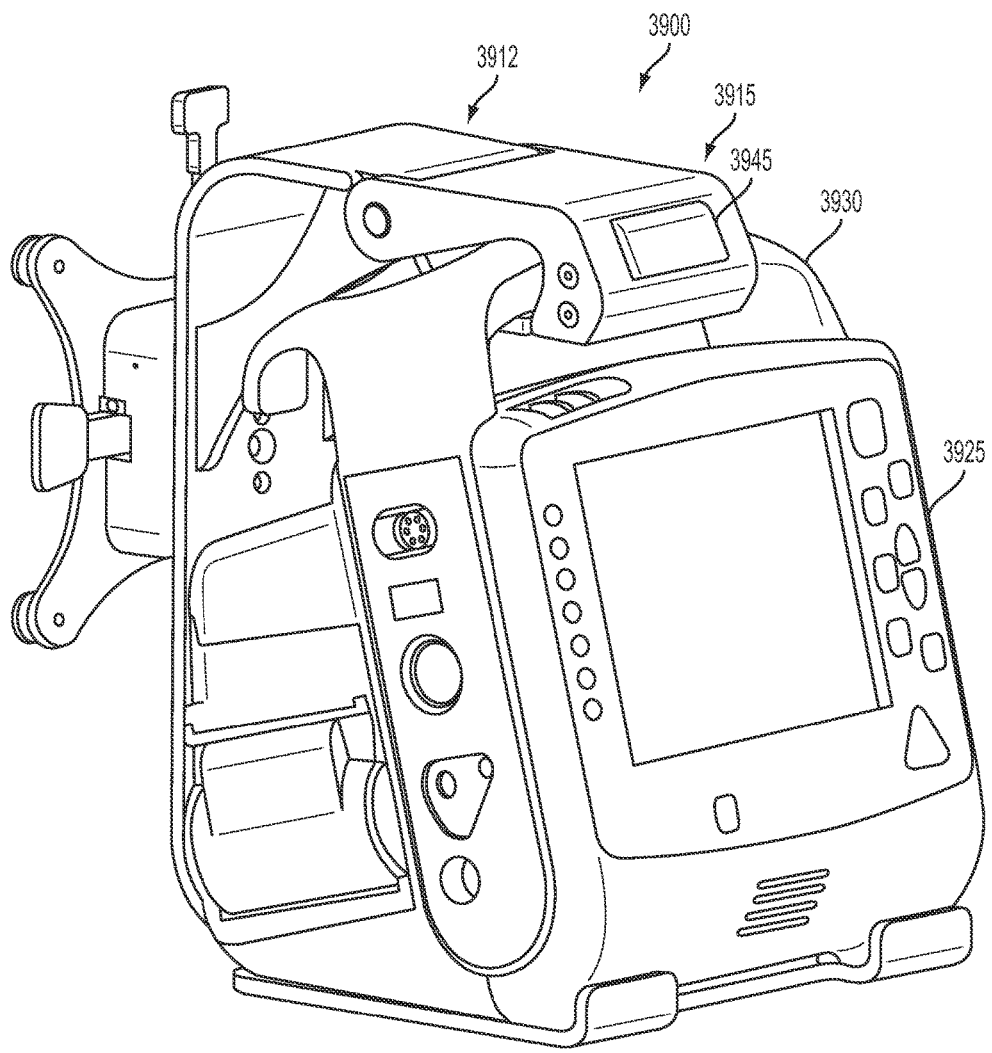
FIG. 73 is another isometric view of the defibrillator mount according to one or more embodiments shown and described herein.

FIG. 73 is another isometric view of the defibrillator mount 3900 with a defibrillator 3925 captured by the defibrillator mount 3900. The jaw clamp 3915 may be coupled to a top end 3912 of the c-frame 3905. The jaw clamp 3915 may be configured to capture and retain a handle 3930 of the defibrillator 3925. The function of the defibrillator mount 3900 is discussed in greater detail below. The defibrillator mount 3900 may be crash-ready.

Figure 74:
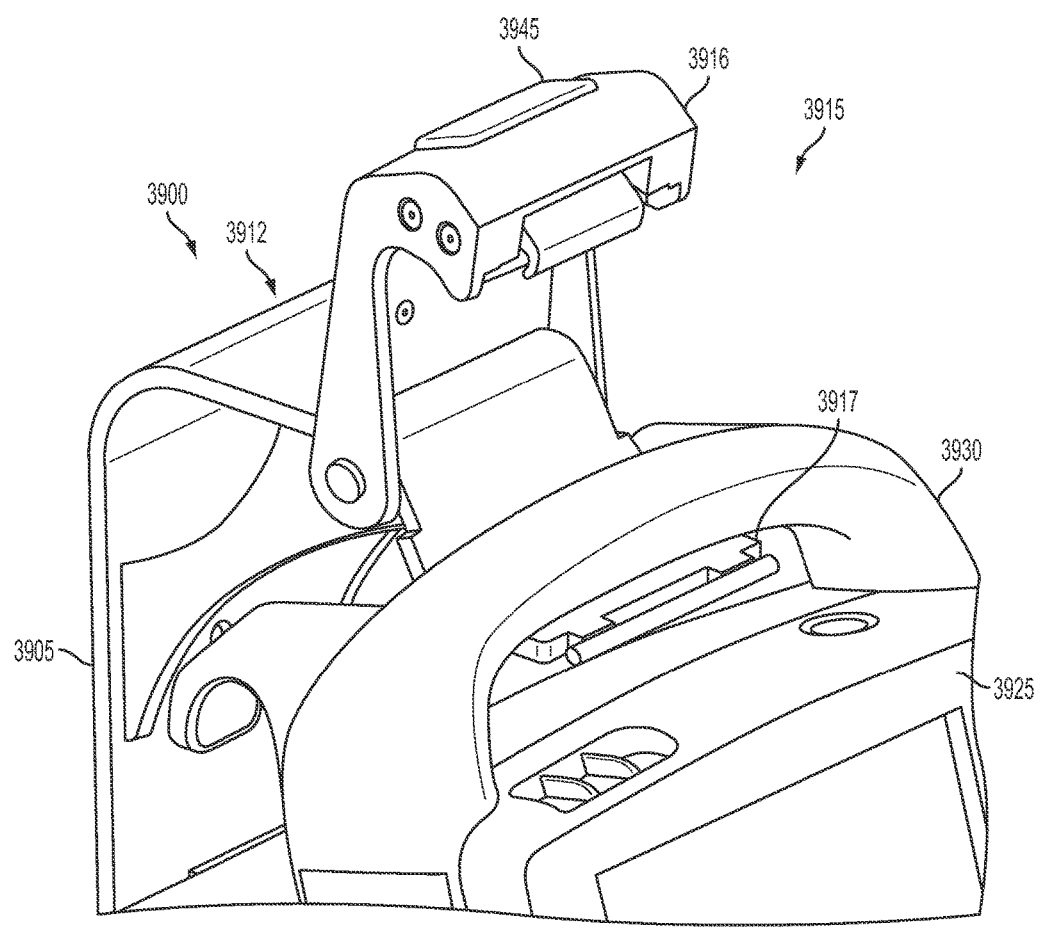
FIG. 74 is an isometric view of a jaw clamp according to one or more embodiments shown and described herein.

FIG. 74 is an isometric view of the jaw clamp 3915 in an open position. The jaw clamp 3915 may include an upper jaw 3916, a lower jaw 3917, and a release button 3945. The release button 3945 allows the upper jaw 3916 and the lower jaw 3917 to move in relation to each other. When the jaw clamp 3915 is in the open position, the defibrillator 3925 may be removable from the defibrillator mount 3900. The lower jaw 3917 may be an extension of the top end 3912 of the c-frame 3905. In another embodiment, the lower jaw 3917 may be hingedly coupled to the upper jaw 3916 and move in relation to the upper jaw 3916. The jaw clamp 3915 may be crash-ready.

Figure 75:
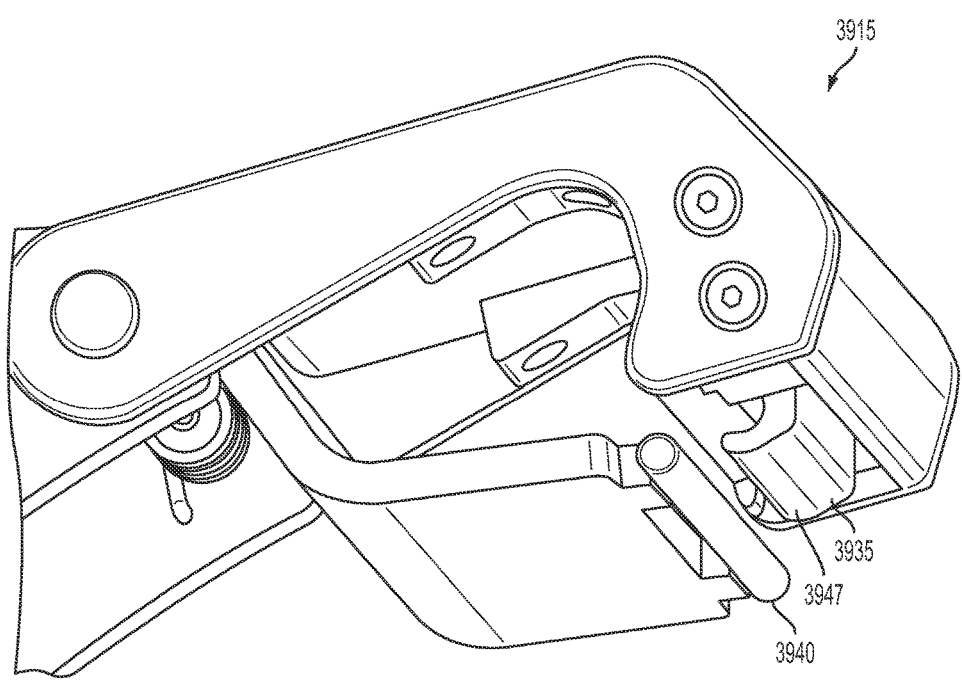
FIG. 75 is a side view of the jaw clamp according to one or more embodiments shown and described herein.

FIG. 75 is a side view of the jaw clamp 3915. A j-latch 3935 may be coupled to the upper jaw 3916 and include a ramped face 3947. A spring (not shown) biases the j-latch 3935 into a latched position as shown. The latched position and the unlatched position may be equally applicable to the j-latch 3935 and the jaw clamp 3915. The release button 3945 (FIG. 74) coupled to the upper jaw 3916 transitions the jaw clamp 3915 between the latched position and an unlatched position. The ramped face 3947 may slidably couple with a bar 3940 as the jaw clamp 3915 is closed. The ramped face 3947 allows the jaw clamp 3915 to transition from the unlatched position to the latch position without actuation of the release button 3945. In the latched position, the j-latch 3935 may capture the bar 3940 and secure the jaw clamp 3915 in the latched position. The spring may bias and retain the j-latch 3935 in the latched position thereby securing the defibrillator 3925 of FIG. 73. A release button 3945 (FIGS. 71 and 72) may be pushed to transition the j-latch 3935 from the latched position to the unlatched position and allow the jaw clamp 3915 to open and release the defibrillator 3925.

A user may coupled the defibrillator 3925 to the defibrillator mount 3900 by placing a front lip of the defibrillator 3925 into the retention lip 3914 and rocking the defibrillator on the one or more retention blocks 3920. One the defibrillator 3925 is resting on the base 3910, the handle 3930 of the defibrillator 3925 will be in position to rest within the jaw clamp 3915. The jaw clamp 3915 may then be transitioned to the latched position by transitioning the upper jaw 3916 towards the lower jaw 3917 until the j-latch 3935 captures and retains the bar 3940. Once in the latched position, the defibrillator mount 3900 secures the defibrillator 3925 such that the defibrillator 3925 is crash-ready.

Figure 76:
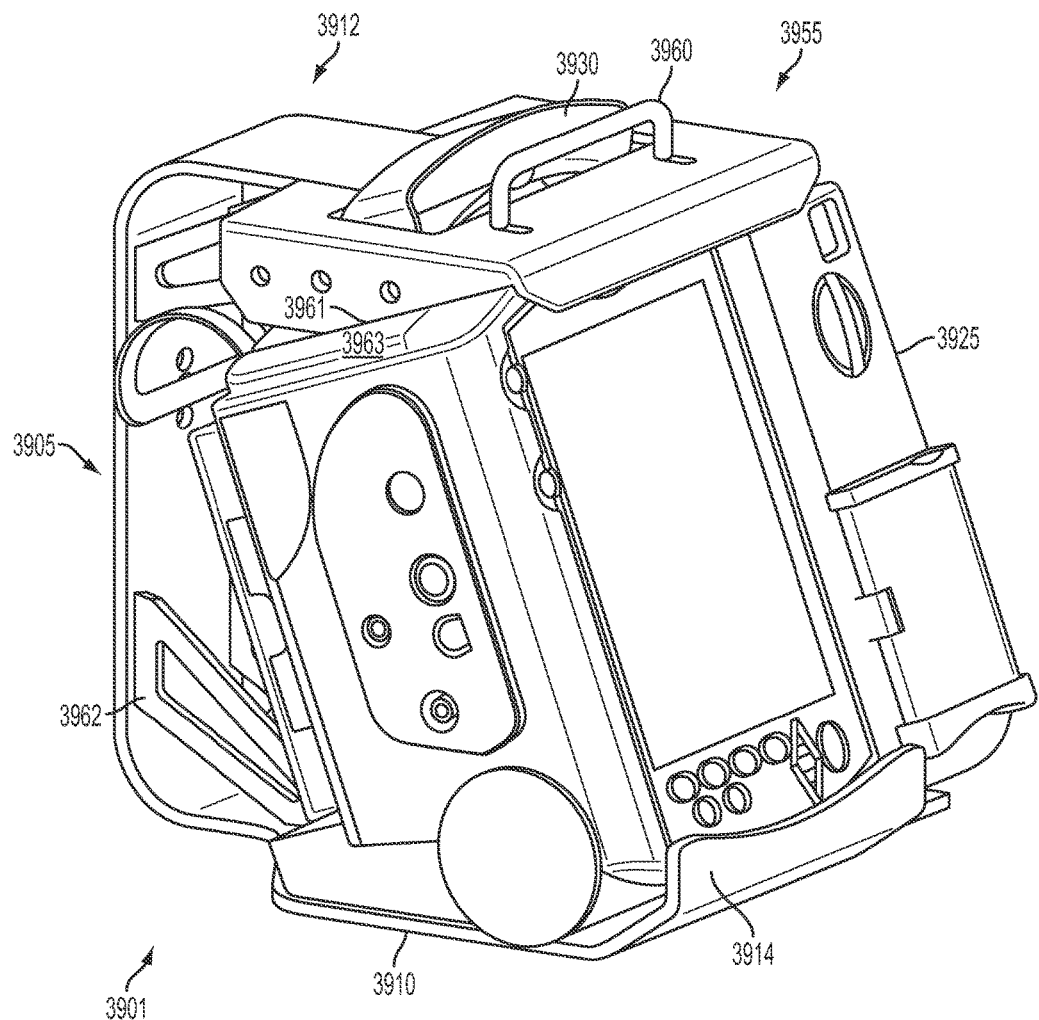
FIG. 76 is an isometric view of a compression defibrillator mount according to one or more embodiments shown and described herein.

FIG. 76 is an isometric view of a compression defibrillator mount 3901. The compression defibrillator mount 3901 may function and have the same structure as the defibrillator mount 3900 shown in FIG. 72. In the compression defibrillator mount 3901 embodiment, the jaw clamp 3915 may be replaced with a defibrillator latch 3955. The defibrillator latch 3955 may be coupled to the top end 3912 of the c-frame 3905. The defibrillator latch 3955 is similar in function to the jaw clamp 3915 (FIG. 74) however it may lack a lower jaw 3917. The defibrillator latch 3955 may include an actuator handle 3960 and a device interface 3961. The defibrillator latch 3955 may be crash-ready.

The compression defibrillator mount 3901 may include the c-frame 3905, the base 3910, and the defibrillator latch 3955. The c-frame 3905 may be coupled to the base 3910, the defibrillator latch 3955, and a mount. The c-frame 3905 may also include structural bracing 3962 to reinforce the c-frame and make the compression defibrillator mount 3901 crash-ready. It should be understood that any mount described herein may be used to couple the compression defibrillator mount 3901 to a track and may include the mount 50 (FIG. 3) and combination of the wedge interface 72 (FIG. 14) and wedge mount 47 (FIG. 11). The base 3910 may be coupled to a bottom end 3911 of the c-frame 3905 and may include one or more retention blocks 3920 and the retention lip 3914. The retention lip 3914 may be used to restrain the defibrillator 3925 from lateral motion and may serve as a guide when placing the defibrillator 3925 in the defibrillator mount 3900. The one or more retention blocks 3920 may be shaped so as to fill in any cavities in the bottom of the defibrillator 3925.

The device interface 3961 may be contoured to a defibrillator surface 3961 such that the device interface 3961 exerts a uniform force through an interference fit on the defibrillator 3925 and secures the defibrillator 3925 between the defibrillator latch 3955 and the base 3910. In some embodiments, a defibrillator intermediary (not shown) may be used to couple the device interface 3961 to the defibrillator 3925. Examples of the defibrillator intermediary may include, but are not limited to, a foam pad, a rubber pad, a gasket, an anti-skid material, or the like. The defibrillator intermediary may be used to increase the force of the interference fit between the device interface 3961 and the defibrillator 3925.

Figure 77:
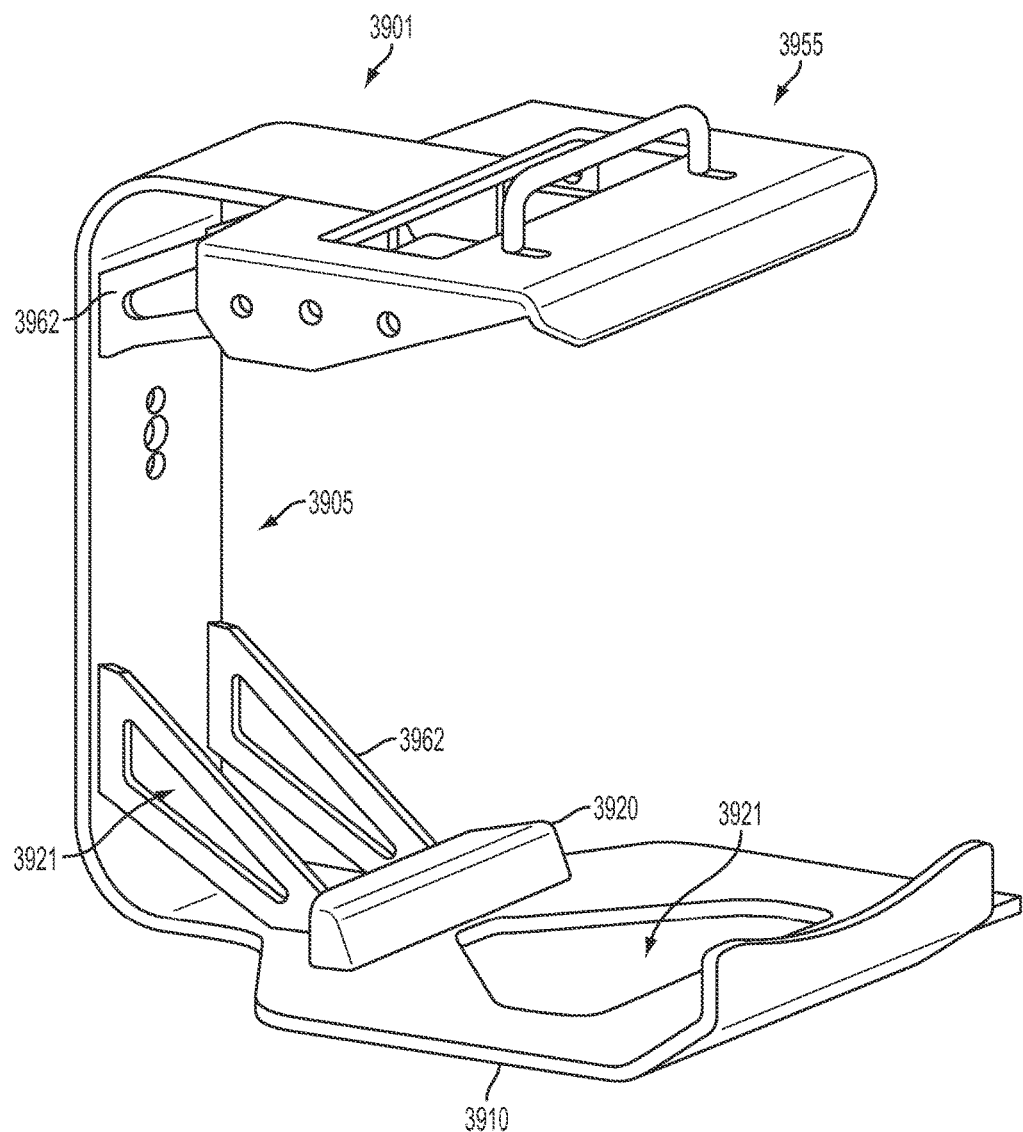
FIG. 77 is another isometric view of the compression defibrillator mount according to one or more embodiments shown and described herein.

FIG. 77 is another isometric view of the compression defibrillator mount 3901. In this embodiment, the one or more retention blocks 3920 are shown in a different shape to conform to a different defibrillator 3925. The one or more retention blocks 3920 may be used to slidably couple with and secure the defibrillator 3925 (FIG. 73) to the base 3910. The defibrillator latch 3955 is shown in the closed position. A weight saving aperture 3921 may be disposed within the base 3910 and the structural bracing 3962 to reduce the overall weight of the compression defibrillator mount 3901 without reducing the structural strength of the c-frame 3905 and the compression defibrillator mount 3901.

Figure 78:
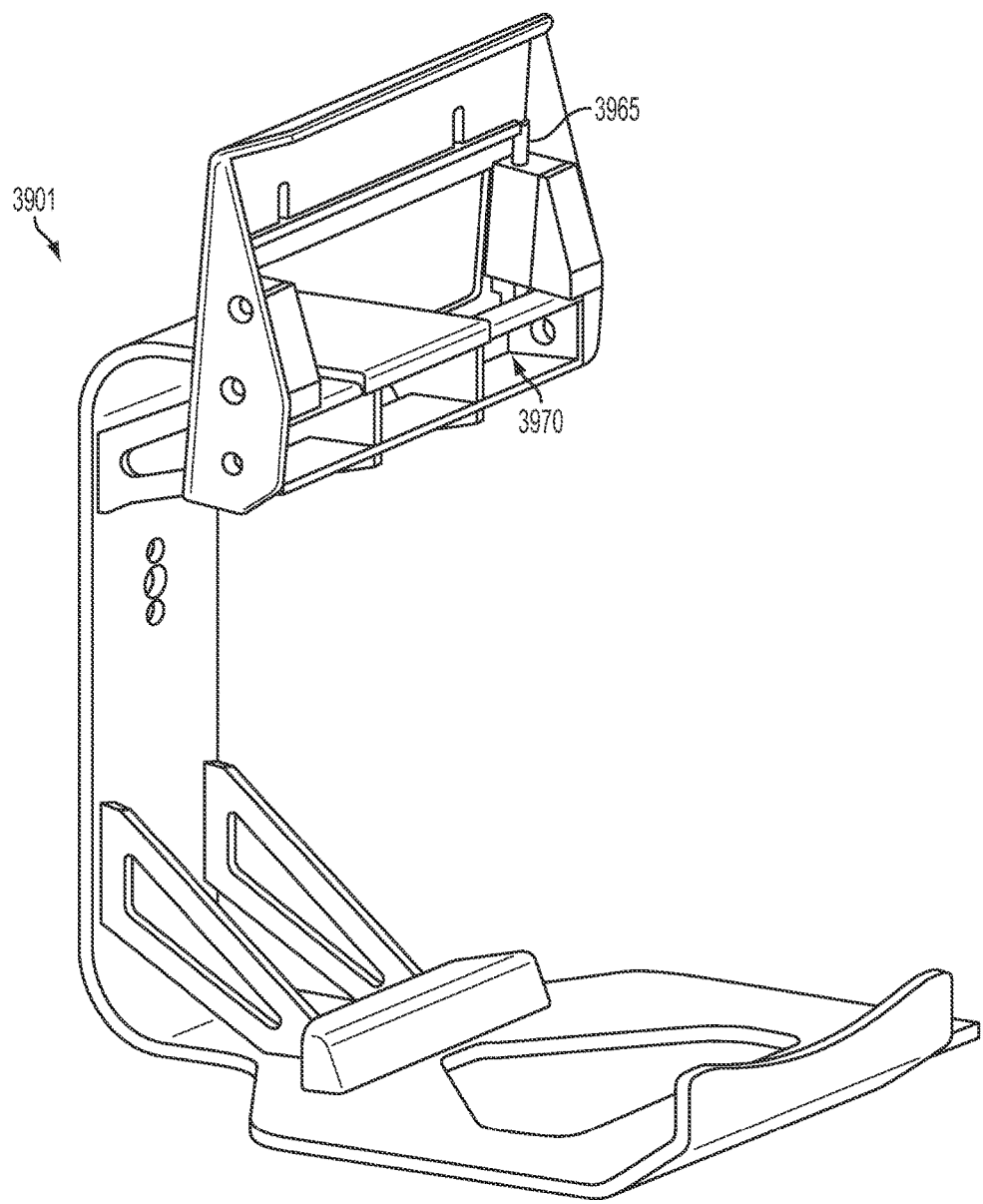
FIG. 78 is another isometric view of the compression defibrillator mount according to one or more embodiments shown and described herein.

FIG. 78 is another isometric view of the compression defibrillator mount 3901 with the defibrillator latch 3955 shown in the open position. A pair of rams 3965 may slidably couple with a base lock 3970 when the defibrillator latch 3955 is in the closed position. The operation of the defibrillator latch 3955 is explained in greater detail below.

Figure 79:
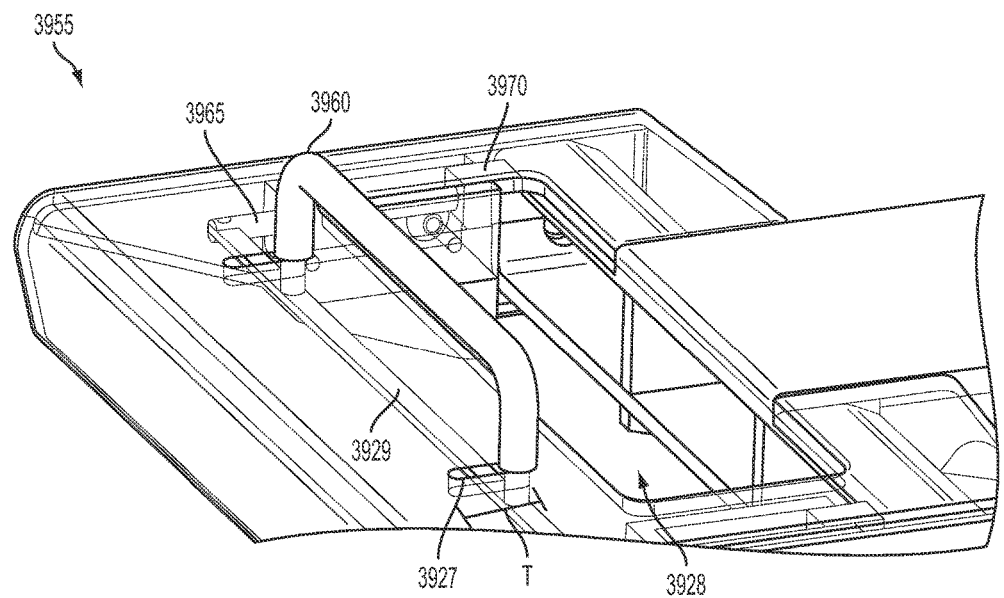
FIG. 79 is an isometric view of a defibrillator latch according to one or more embodiments shown and described herein.

FIG. 79 is an isometric view of the defibrillator latch 3955. Referring to FIGS. 77 and 78, the defibrillator latch 3955 is actuated between the closed and open positions by an actuator handle 3960. The actuator handle 3960 is coupled to a pair of rams 3965 that slidably couple with a base lock 3970. One or more bias springs exert a bias force on the actuator handle 3960 and the pair of rams 3965 into a locked position. When the defibrillator latch 3955 is in the open position, the pair of rams 3965 may not be able to slidably couple with the base lock 3970. When the defibrillator latch 3955 is transitioned to the closed position, the pair of rams 3965 may align with the base lock 3970 and lock the defibrillator latch 3955 into the locked position. The actuator handle 3960 may be actuated against the bias force of the one or more bias springs to transition the defibrillator latch 3955 from the locked position to the unlocked position. The transition of the actuator handle 3960 may pull the pair of rams 3965 out of the base lock 3970, thus allowing the defibrillator latch 3955 to transition to the open position.

In the closed position, a handle aperture 3928 of the defibrillator latch 3955 may be configured to capture the handle 3930 of the defibrillator 3925 as shown in FIG. 76. A spacer bar 3929 may couple the actuator handle 3960 to the pair of rams 3965. This may allow the defibrillator latch 3955 to accommodate different size handles 3930 of different defibrillators 3925. An actuator aperture 3927 may be disposed within the defibrillator latch 3955 and define an actuation stroke T of the actuator handle 3960. The actuation stroke T of the actuator handle 3960 may be related to a depth (not shown) that the pair of rams 3965 slidably couple with the base lock 3970. In some embodiments, that depth that the pair of rams 3965 slidably couple with the base lock 3970 may define the defibrillator latch 3955 as crash-ready.

Figure 80:
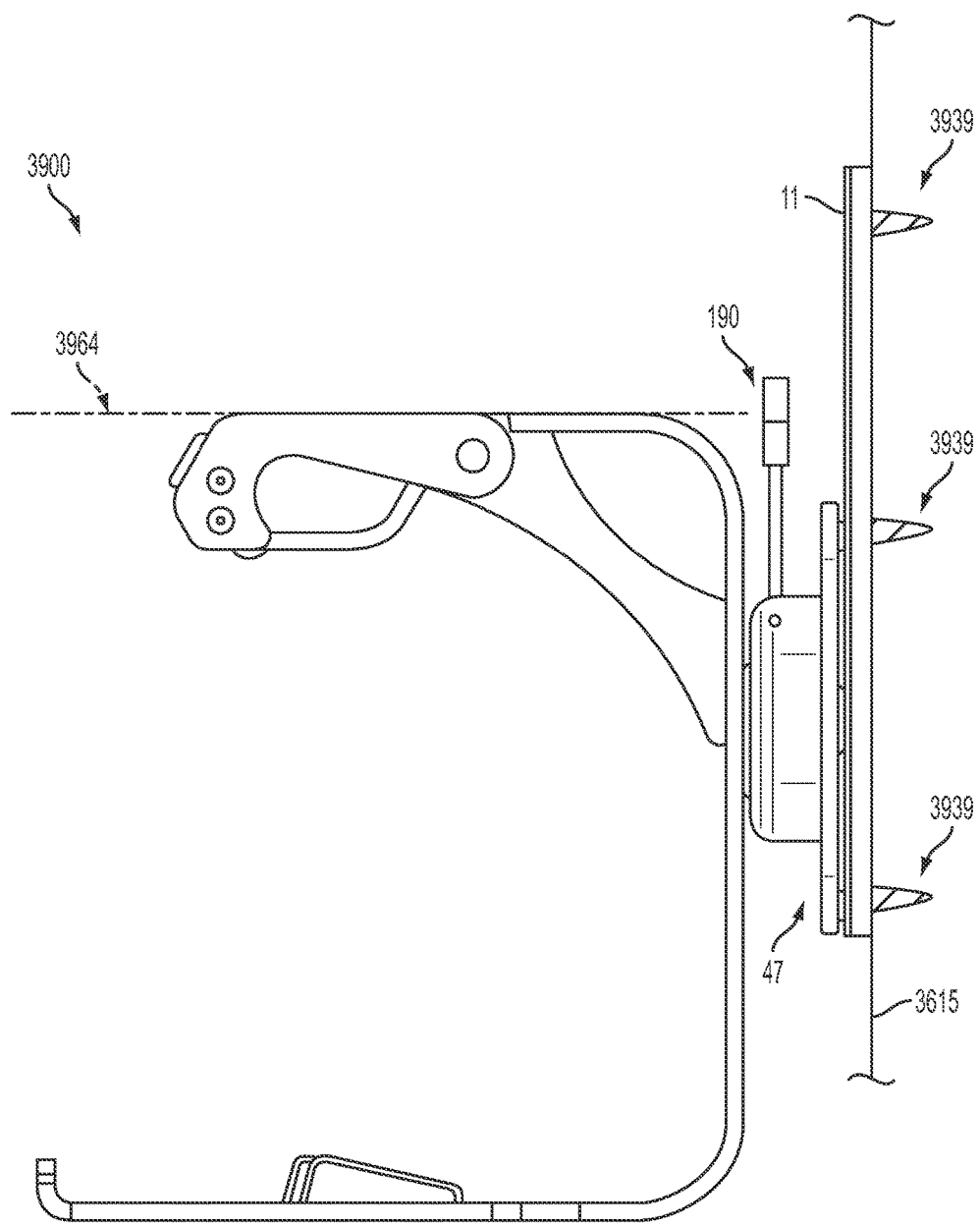
FIG. 80 is a side view of the defibrillator mount shown coupled to the track according to one or more embodiments shown and described herein.

FIG. 80 is a side view of the defibrillator mount 3900 shown coupled to the quick mount track 11. It should be understood that the quick mount track 11 as shown in shown in FIGS. 28A and 56 may be substituted with the track 10 of FIGS. 1, 2, and 27 through 31 or the minitrack 12, shown in FIG. 38. It should also be understood that any mount described herein may be used to couple the defibrillator mount 3900 to a track and may include the wedge mount 47 (FIG. 11) and combination of the wedge interface 72 (FIG. 14) and wedge mount 47 (FIG. 11). This figure may be used as an example of coupling any of the above described equipment and mounts to the quick mount track 11. For example, the defibrillator mount 3900 is shown however, the cabinet mount 3500 shown in FIG. 52, the oxygen tank mount 3850 shown in FIG. 68, or the laptop mount 3700 shown in FIG. 62 may be used.

Still referring to FIG. 80, the quick mount track 11 may be coupled to the surface 3615 (FIG. 56). The release mechanism 190 (FIG. 7) may be positioned above an upper equipment axis 3964 such that a user may be able to visually acquire the release mechanism 190 and manipulate the release mechanism 190 without interference from the, in this case, defibrillator mount 3900.

The quick mount track 11 and wedge mount 47 are configured to be crash-ready. They may resist movement in both the vertical, horizontal, fore-aft, and lateral directions by forces exerted on the defibrillator mount. The mount studs 140a, 140b, 140c, and 140d (FIG. 3) may be positioned directly above the one or more fastening devices 3939 as shown in FIG. 57. The quick mount track 11 is shown in a vertical orientation in FIG. 80.

Figure 81:
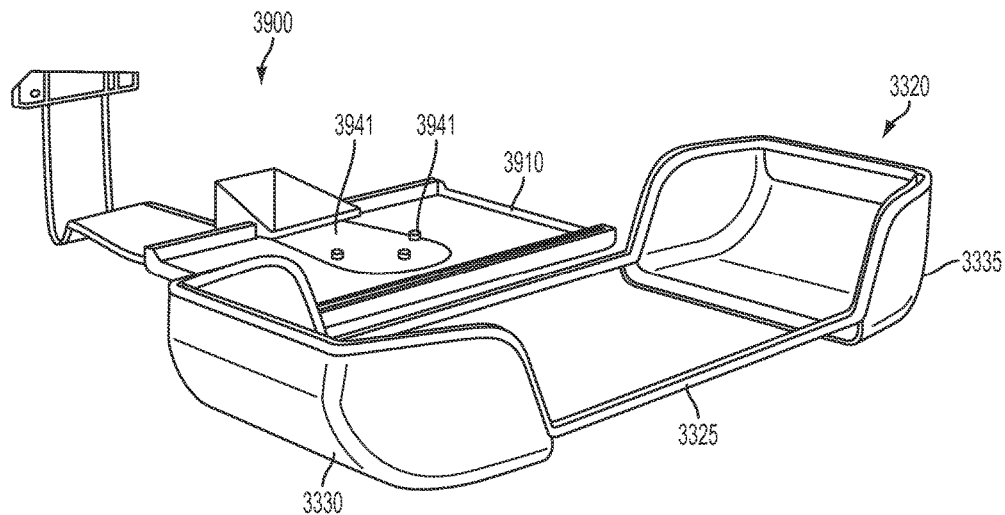
FIG. 81 is a left isometric view of a defibrillator accessory tray according to one or more embodiments shown and described herein.

FIG. 81 is a left isometric view of a defibrillator accessory tray 3320. The defibrillator accessory tray 3320 may include a base tray 3325, a first side tray 3330, and a second side tray 3335. The base tray 3325 may couple with the base 3910 of either the defibrillator mount 3900 (FIG. 72) or the compression defibrillator mount 3901 (FIG. 76). One or more fastening device apertures 3941 disposed in the base 3910 may be used by one or more fastening devices, as described above, to secure the base tray 3325 to the base 3910. The first side tray 3330 and the second side tray 3335 may be used to secure one or more accessory pouches 3345 (FIG. 81) to the defibrillator accessory tray 3320. The first side tray 3330 and the second side tray 3335 may be constructed from a pliable plastic, metal, composite, rigid plastic, rubber, or like materials.

Figure 82:
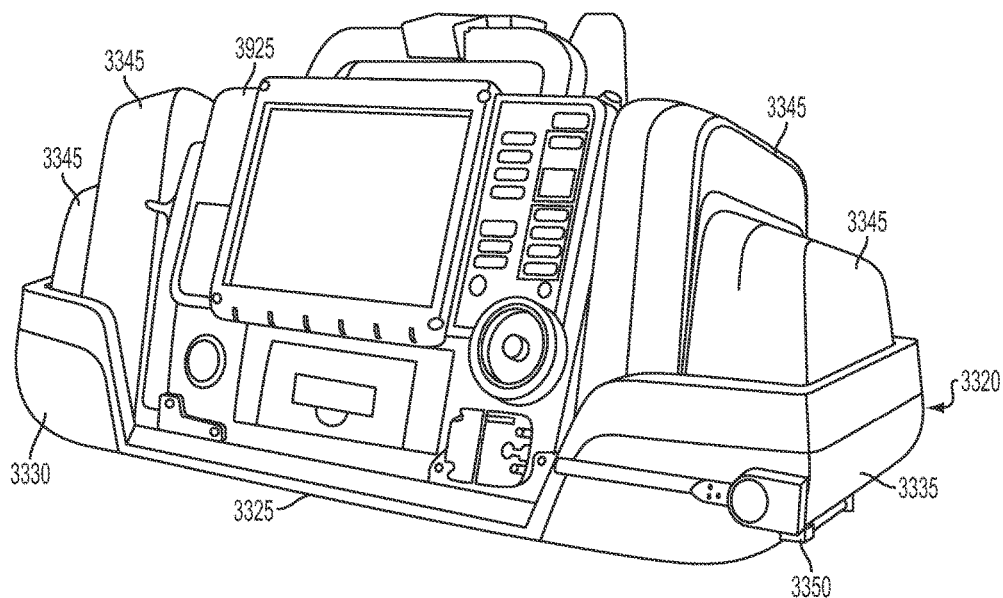
FIG. 82 is a right isometric view of the defibrillator accessory tray according to one or more embodiments shown and described herein.

FIG. 82 is a right isometric view of the defibrillator accessory tray 3320. The defibrillator accessory tray 3320 may be dimensioned so as to accommodate a defibrillator 3925 and one or more accessory pouches 3345. Each accessory pouch 3345 may be dimensions to accommodate a wide range of accessories for the defibrillator 3925. For example, a pair of shock paddles, conduction gel, and the like may be stored in the one or more accessory pouches 3345. The use of the accessory pouches is not limited to accessories for the defibrillator 3925 and may be used for other medical devices and accessories, medical supplies, recording devices to include electronic devices and pen and paper, power supplies (e.g., batteries and A/C adaptors), and the like. An extension cord 3350 may be used to electrically couple the medical accessories to the defibrillator 3925. The extension cord 3350 may be positioned on the defibrillator accessory tray 3320 to provide a convenient location for the medical accessories to couple with the defibrillator 3925. The extension cord 3350 is shown coupled to the second side tray 3335 however, it should be understood that the extension cord 3350 may be coupled to the base tray 3325, the first side tray 3330, or even to the defibrillator mount 3900 or the compression defibrillator mount 3901. The extension cord 3350 may be coupled in any position to allow for ease of access by a user or for configuration of the defibrillator 3925. It should also be understood that more than one extension cord 3350 may be coupled to the defibrillator accessory tray 3320, the defibrillator mount 3900 or the compression defibrillator mount 3901.

Figure 83:
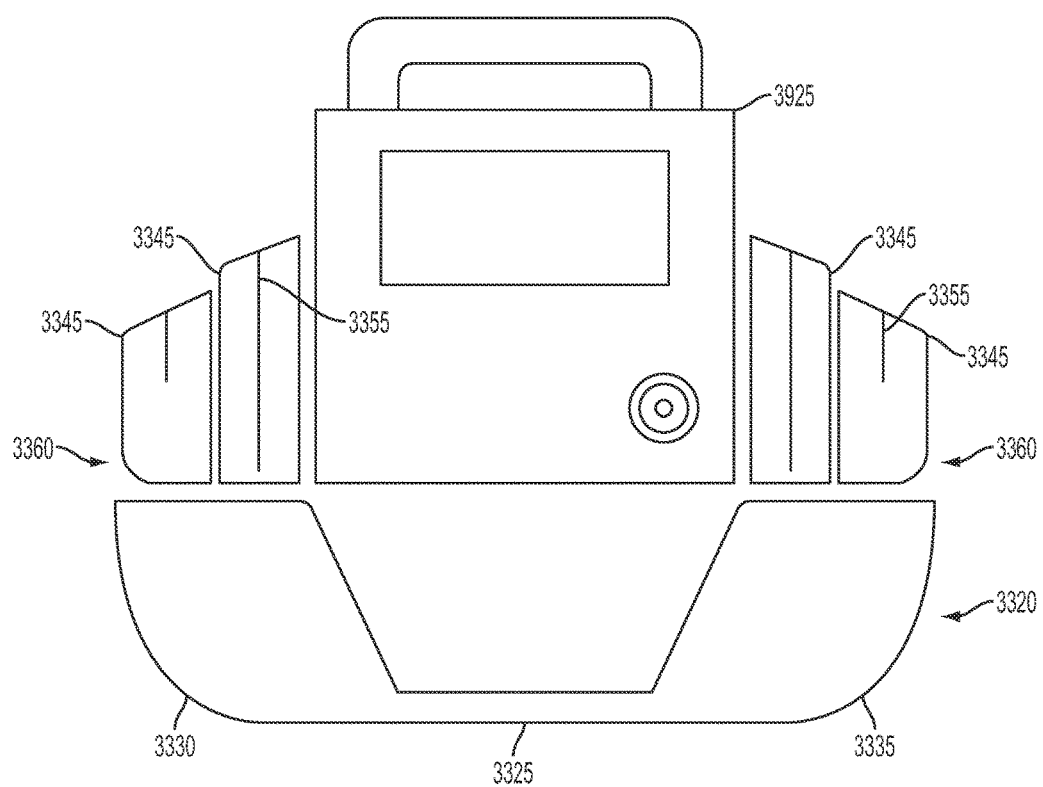
FIG. 83 is an exploded view of the defibrillator accessory tray and one or more accessory pouches according to one or more embodiments shown and described herein.

FIG. 83 is an exploded view of the defibrillator accessory tray and one or more accessory pouches 3345. The base tray 3325 may be configured to couple with the defibrillator 3925 and retain or secure the defibrillator 3925 and be crash-ready. The base tray 3325 may also include the one or more retention blocks 3920 shown in FIG. 72. In one embodiment, the first side tray 3330 and the second side tray 3335 may be configured to conform to the defibrillator 3925 without the one or more accessory pouches 3345. In another embodiment, the first side tray 3330 and the second side tray 3335 may conform to the shape of the one or more accessory pouches 3345. An outer edge 3360 of the one or more accessory pouches 3345 may be rounded to slidably couple with the first side tray 3330 and the second side tray 3335. The outer edge 3360 may be squared off to allow a specific accessory to be placed within the accessory pouch 3345. This may in-turn require the first side tray 3330 and the second side tray 3335 to be squared off. A closing mechanism 3355 may be coupled to each accessory pouch 3345 to fully enclose an accessory within the accessory pouch 3345.

Figure 84:
FIG. 84 is a front view of the track, with the back view being a mirror image of FIG. 84.

FIG. 84 is a front view of the quick mount track 11 with tapered edges as described above in relation to FIG. 56. The back view of the quick mount track 11 is a mirror image of FIG. 84.

Figure 85:
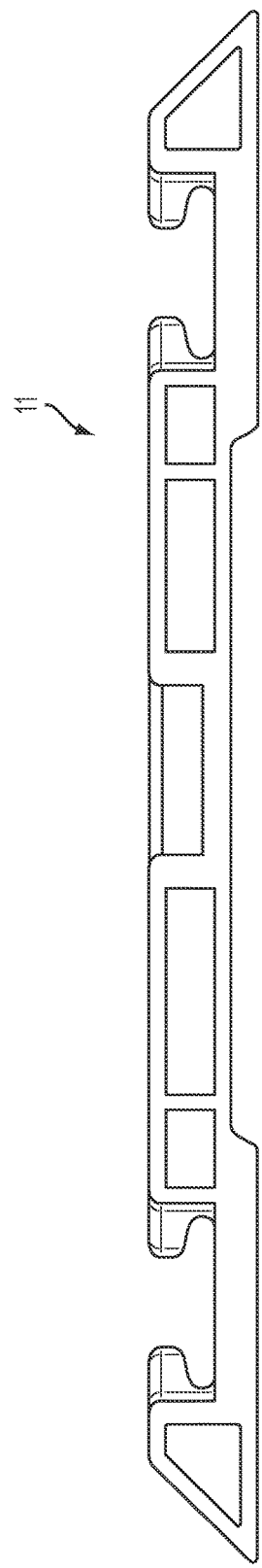
FIG. 85 is a right side view thereof, with the left side view being a mirror image of FIG. 85.

FIG. 85 is a right side view of the quick mount track 11 with tapered edges as described above in relation to FIG. 56. The left side view of the quick mount track 11 is a mirror image of FIG. 85.

Figure 86:
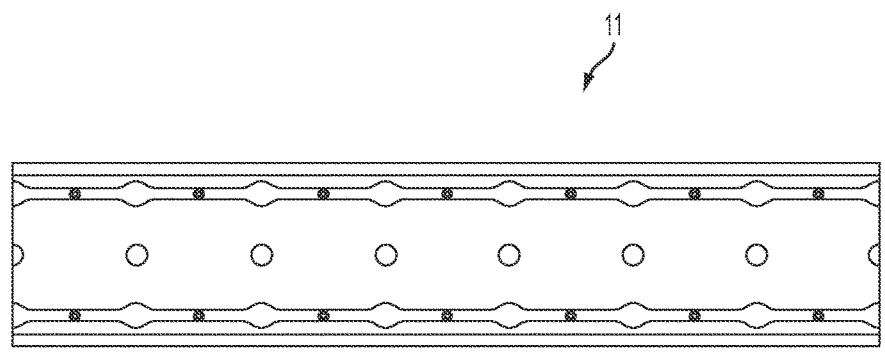
FIG. 86 is a top view thereof.

FIG. 86 is a top view of the quick mount track 11 with tapered edges as described above in relation to FIG. 56.

Figure 87:
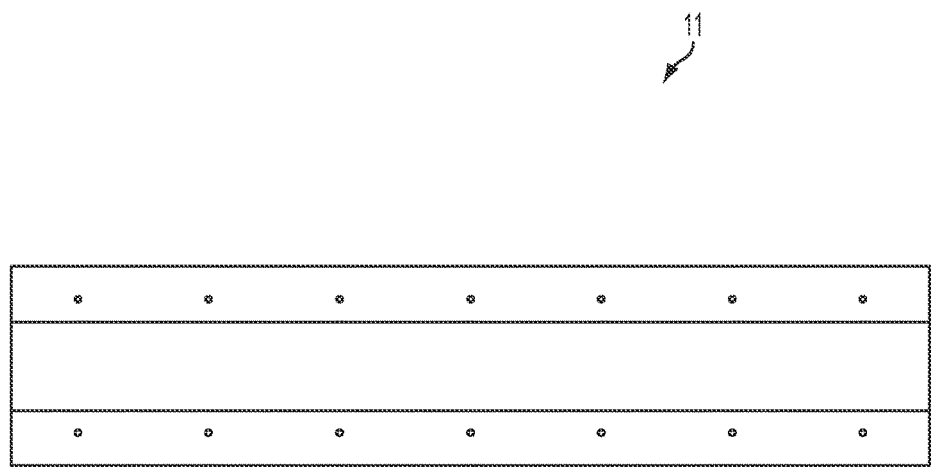
FIG. 87 is a bottom view thereof.

FIG. 87 is a bottom view of the quick mount track 11 with tapered edges as described above in relation to FIG. 56.

Figure 88:
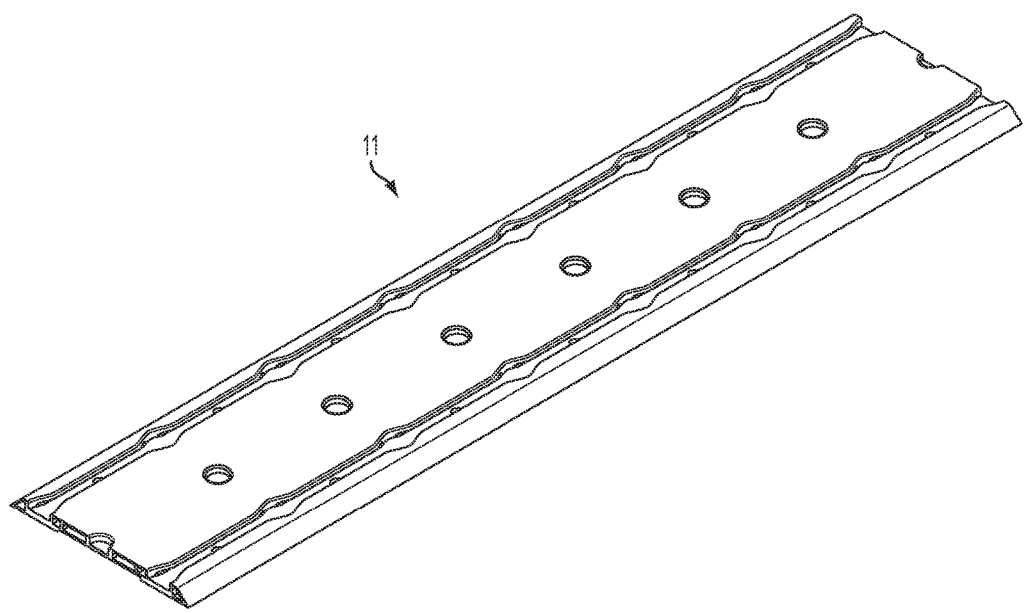
FIG. 88 is front, left, isometric view thereof.

FIG. 88 is front, left, isometric view of the quick mount track 11 with tapered edges as described above in relation to FIG. 56.

Figure 89:
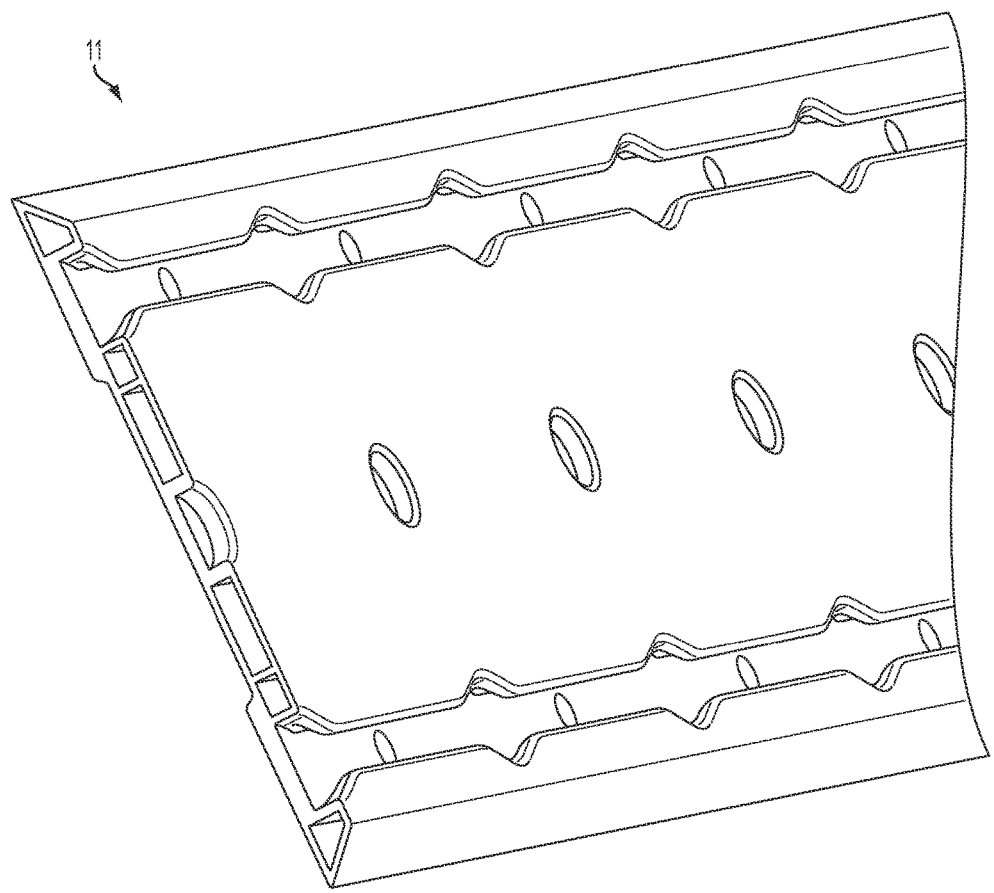
FIG. 89 is a top, left, isometric view thereof.

FIG. 89 is a top, left, isometric view of the quick mount track 11 with tapered edges as described above in relation to FIG. 56.

Figure 90:
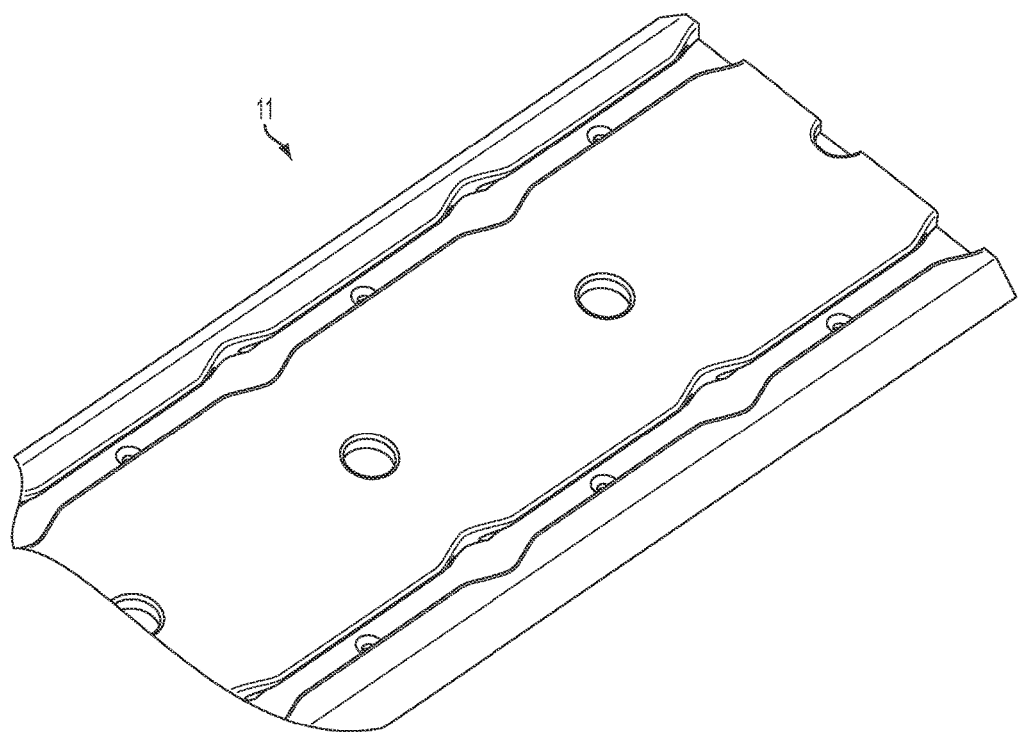
FIG. 90 is a top, right, isometric view thereof.

FIG. 90 is a top, right, isometric view of the quick mount track 11 with tapered edges as described above in relation to FIG. 56.

Figure 91:
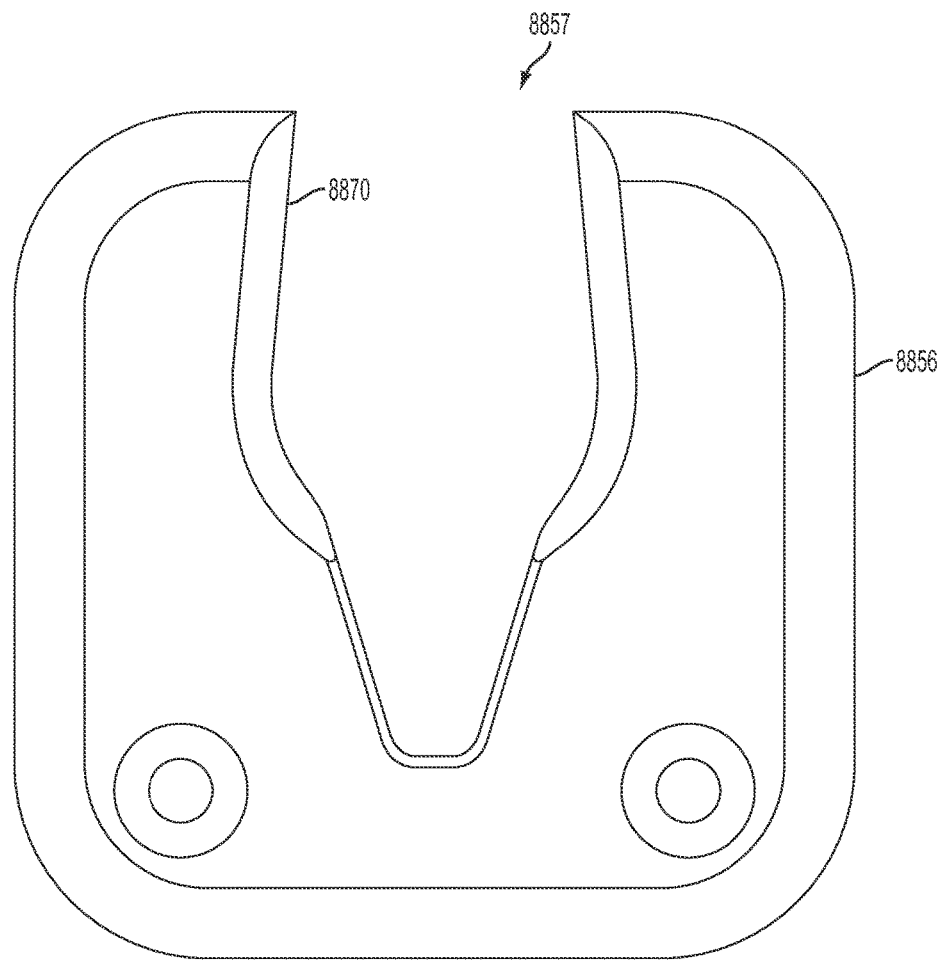
FIG. 91 is a top view of an open keyhole slot aperture.

FIG. 91 is a top view of an open keyhole slot aperture 57 in an open capture plate 8856. The open keyhole slot aperture 8857 may include an open wide end 8870 and an open narrow end 8875. The open capture plate 8856 functions the same as the capture plate 56 of FIG. 11 with the exception of an open ended structure of the open wide end 8870. Comparing FIG. 91 to FIG. 11, the open wide end 8870 is an open ended structure when compared to a closed structure of the wide area 70 of FIG. 11. The open wide end 8857 allows the wedge interface 72 of FIG. 14 to slidably couple with the wedge mount 47 of FIG. 11. The open wide end 8857 allows for a greater tolerance of misalignment between the wedge interface 72 and the wedge mount 47 and still provides a proper engagement of the wedge interface 72 with the wedge mount 47. The open capture plate 8857 may be a direct replacement for the capture plate 57.

It should be understood that throughout the disclosure, the track 10, shown in FIG. 1, the minitrack 12, shown in FIG. 38, or the quick mount track 11, shown in FIGS. 28A and 56, may be used interchangeably. For example, where it is discussed that a piece of equipment or the mount 50 is coupled to the track 10, the track 10 may be substituted by the minitrack 12 or the quick mount track 11. The mounting configurations may need to be change to enable the coupling between different types of track (10, 11, or 12) however it should be understood that the versatility and variability of mounting configurations is envision by this disclosure. The disclosure highlights areas where this interchangeability may be present (i.e., "track" may mean track 10, quick mount track 11, or minitrack 12) however that highlighting does not preclude the interchangeability elsewhere in the disclosure where the highlighting is not present.

It should also be understood that throughout the mount 50 may be interchangeable with the wedge interface 72 (e.g., FIG. 14), any number of mounting studs 140 (e.g., FIG. 3), the equipment interface 172 (e.g., FIG. 9), the wedge mount 47 (e.g., FIG. 11), the cabinet mount 3500 (FIG. 52), or the equipment track mount 1700 (e.g., FIG. 24). The versatility and variability of mounting configurations is envisioned by this disclosure. The disclosure highlights areas where this interchangeability may be present (i.e., the mount may be the mount 50 or the wedge interface 72) however that highlighting does not preclude the interchangeability elsewhere in the disclosure where the highlighting is not present.

The equipment mounting system is shown in the accompanying drawings and described above. The equipment mounting system may include the various tracks and the various mounts. The equipment mounting system may be removably coupled to a structure or mobile object. The mobile object may include a vehicle such as an emergency transportation vehicle, a helicopter, an airplane, a mobile home, an all-terrain vehicle (ATV), and the like. The emergency transportation vehicle may include an ambulance, a medical helicopter, a medical airplane, and the like. The various mounts described above may be moved between these different structures and/or vehicles without the need to modify the structure or vehicle for each type of mount. The equipment mounting system may allow a piece of equipment coupled to one of the various mounts to be removed from a vehicle and taken into a structure and mounted to the structure for ease in servicing or use. The piece of equipment may be coupled to an external portion of the vehicle when not in use internal to the vehicle. For example, a defibrillator coupled to defibrillator mount may be taken from an ambulance and to a hospital and mounted to track on the wall by a patient's bed so that the defibrillator may be used on the patient. In another example, an IV bag fluidly coupled to a patient may be moved with the patient as the patient is transported from a medical helicopter to the emergency room in a hospital. The medical personnel may remove the mount coupled to the IV bag from the track, move the IV bag with the patient, and re-couple the mount to a track on the wall or ceiling in the emergency room. The equipment mounting system allows for a wide range of optional configurations to be present when using the equipment mounting system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted above as well as derivatives thereof and words of similar import.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An equipment mounting system, comprising:
   a quick mount track with tapered edges couple to a surface or structure, comprising:
     a backing plate having a first plate edge, a second plate edge, a plurality of locking pin apertures, a first outer slot, and a second outer slot, wherein the first plate edge, the second plate edge, the plurality of locking pin apertures, the first outer slot, and the second outer slot are all substantially parallel to each other and run a length of the backing plate, the first plate edge is tapered, the second plate edge is tapered, and the first plate edge and the second plate edge define an outermost part of the backing plate along the length of the backing plate;
     one or more mounting points positioned within the first outer slot and the second outer slot such that any forces exerted on a mount coupled to the quick mount track is transferred directly through the quick mount track to the one or more mounting points;
     a flush mounting surface is defined along the first plate edge and the second plate edge and creates and maintains a seal between the quick mount track and the surface;
     a chase is disposed in the quick mount track and defined by the flush mounting surface;
     a plurality of diamond contoured target regions spaced in the first outer slot and the second outer slot and are in horizontal alignment with the plurality of locking pin apertures; and a plurality of half diamond contoured regions along a common edge, the common edge is substantially orthogonal to the first plate edge and the second plate edge.

2. The equipment mounting system of claim 1, wherein the surface or structure is a mobile object.

3. The equipment mounting system of claim 2, wherein the mobile object is an emergency transportation vehicle.

4. The equipment mounting system of claim 3, wherein the emergency transportation vehicle is an ambulance or a helicopter.

5. The equipment mounting system of claim 1, further comprising a track clip removably coupled to the quick mount track and comprising:
   a base having a slot engagement flange and a base width to allow the base to slidably couple with a slot of the quick mount track and to minimize movement of the track clip in relation to the quick mount track;
   a coupler is coupled to the base along a coupler face, the coupler face is opposite from the slot engagement flange on the base;
   a leverage feature is coupled to the base along a carrier axis, the carrier axis is substantially orthogonal to the coupler face; and
   a carrier having an open region engagement interface to slidably couple with an open region on the quick mount track and comprising a first extension and a second extension, the first extension is opposite the second extension on the carrier, the carrier slidably couples to the leverage feature along the carrier axis and is biased in an engaged position by a spring.

6. The equipment mounting system of claim 5, wherein the carrier further comprises a first lip and a second lip coupled to the carrier, and wherein a transition force is applied to the first lip and the second lip such that the carrier is transition between the engaged position to a disengaged position, the engaged position secures the track clip to the quick mount track, and the disengaged position releases the track clip from the quick mount track.

7. The equipment mounting system of claim 6, wherein the carrier further comprising a snubber pad coupled to the carrier and the snubber pad is retracted into the base when the track clip is in the disengaged position and the snubber pad is extended beyond a base surface of the base when the track clip is in the engaged position, the snubber pad prevents the track clip from moving in relation to the quick mount track while the track clip is coupled to the quick mount track in the engaged position.

8. The equipment mounting system of claim 5, wherein the coupler is a hook, a peg, a clasp, a latch, a light, or a u-shaped ring and the base is covered in an anti-rattle coating that creates an interference fit between the track clip and the quick mount track.

9. The equipment mounting system of claim 1, further comprising a wall cabinet removably coupled to the quick mount track and comprising:
   a partial enclosure that bounds a storage volume, the partial enclosure comprises a rear wall that defines a rear-most extent of the partial enclosure;
   a door that defines a front most extent of the partial enclosure, is moveably coupled to the partial enclosure, has a closed position that partitions an exterior volume from the storage volume and an open position that allows access from the exterior volume to the storage volume, and comprises a window that allows an object in the storage volume to be visible from the exterior volume when the door is in the closed position; and
   a cabinet mount is coupled to the partial enclosure and configured to secure the wall cabinet to the quick mount track, the cabinet mount comprising:
      a cabinet plate in the storage volume,
      a mount position in the exterior volume and comprises one or more fastening devices and a threaded collar, the rear wall is captured between the cabinet plate and the mount, and
      a turn knob comprising a pin spring biased against a locking pin, the turn knob is configured to couple with the threaded collar such that when the cabinet mount is coupled to the quick mount track, the turn knob is inserted into the threaded collar and rotated until the locking pin is coupled with a locking pin aperture of the quick mount track, and the pin spring dampens any movement between the quick mount track and the wall cabinet.

10. The equipment mounting system of claim 9, wherein the wall cabinet further comprises:
    one or more light emitting diode (LED) lights coupled to the partial enclosure and to a door switch, the one or more LED lights illuminate the storage volume in a red color during low-light operations and a white color during daytime operations and the door switch activates the one or more LED lights when the door is transitioned to the open position; and
    wherein the partial enclosure further comprises:
       a bottom wall that defines a lower extend of the partial enclosure and comprises a retaining lip configured to impede the object from sliding from the storage volume into the exterior volume when the door is in the open position,
       a first molding coupled to a first side wall of the partial enclosure, the first molding is configured to absorb the force of an impact with the wall cabinet and further comprises a structure to allow the wall cabinet to be grasped and positioned on the quick mount track, and
       a second molding coupled to a second side wall of the partial enclosure, the second molding is configured to absorb the force of an impact with the wall cabinet and further comprises a grip structure to allow the wall cabinet to be grasped and positioned on the quick mount track.

11. The equipment mounting system of claim 1, further comprising a laptop mount removably coupled to the quick mount track and comprising:
    a platform;
    an articulating ball joint to allow for a full range of motion of the platform, the articulating ball joint comprising a first ball, a second ball, and a compression clamp, the compression clamp captures the first ball at a first end of the compression clamp and the second ball at a second end and is used to freeze or restrain movement of the platform in relation to the quick mount track, and the first ball is coupled to the platform;
    a laptop lock to transition the laptop mount between a locked position and a release position, the locked position secures a laptop to the platform and the release position enables the laptop to be removed from the platform; and
    wherein the mount is coupled to the second ball and configured to removably the laptop mount to the quick mount track.

12. The equipment mounting system of claim 1, further comprising a tray mount removably coupled to the quick mount track and comprising:

a tray rack;

an articulating ball joint to allow for a full range of motion of the tray rack, the articulating ball joint comprising a first ball, a second ball, and a compression clamp, the compression clamp captures the first ball at a first end of the compression clamp and the second ball at a second end and is used to freeze or restrain movement of the tray rack in relation to the quick mount track, and the first ball is coupled to the tray rack;

one or more rotating posts capture a tray in the tray rack when the one or more rotating posts are in a retained position; and wherein the mount is coupled to the articulating ball joint and configured to removably couple the tray mount to the quick mount track.

13. The equipment mounting system of claim 1, further comprising an oxygen tank mount removably coupled to the quick mount track and comprising:

a frame configured to hold one or more oxygen tanks;

a frame handle coupled to the frame and used to move the oxygen tank mount between locations;

one or more retention clamps coupled to the frame, each retention clamp has a quick release to allow a oxygen tank to be removably coupled to the retention clamp;

a manifold fluidly coupled to each oxygen tank by a tube network and configured to fluidly couple with one or more medical devices;

a plurality of mounting studs coupled to a rear surface of the frame and arranged on the rear surface to removably couple the oxygen tank mount to the quick mount track; and one or more track releases coupled to the frame and having a release handle and one or more locking pins biased in a locked position, each locking pin slidably couples with a locking pin aperture of the quick mount track and the release handle configured to pull a locking pin from the locking pin aperture to release the oxygen tank mount from the quick mount track.

14. The equipment mounting system of claim 1, further comprising a defibrillator mount removably coupled to the quick mount track and comprising:

a c-frame having an top end and a bottom end;

a base coupled to the bottom end of the c-frame and has one or more retention block and a retention lip, each retention block is used to slidably couple with and secure a defibrillator to the base and the retention lip is used to restrain the defibrillator from lateral motion and serve as a guide when placing the defibrillator in the defibrillator mount;

a jaw clamp is coupled to the top end and configured to capture and retain a handle of the defibrillator, the jaw clamp comprises an upper jaw, a lower jaw, a release button, a bar, and a j-latch wherein the bar is coupled to the lower jaw and the release button and the j-latch are coupled to the upper jaw, the j-latch is configured to capture and retain the bar in a latched position and the release button is configured to actuate the j-latch to release the bar in an unlatched position; and wherein the mount is coupled to the c-frame and configured to removably couple the defibrillator mount to the quick mount track.

15. The equipment mounting system of claim 1, further comprising a compression defibrillator mount removably coupled to the quick mount track and comprising:

a c-frame having structural bracing to reinforce the compression defibrillator mount and make it crash-ready;

a base coupled to a bottom end of the c-frame and has one or more retention block and a retention lip, each retention block is used to slidably couple with and secure a defibrillator to the base and the retention lip is used to restrain the defibrillator from lateral motion and serve as a guide when placing the defibrillator in a defibrillator mount;

a defibrillator latch coupled to an upper end and comprising an actuator handle and a device interface, the actuator handle transitions the defibrillator latch between a locked position and an unlocked position and the device interface is contoured to a defibrillator surface such that the device interface exerts a uniform force on the defibrillator and secures the defibrillator between the defibrillator latch and the base; and wherein the mount is coupled to the c-frame and configured to removably couple the compression defibrillator mount to the quick mount track.

* * * * *

UNITED STATES PATENT AND TRADEMARK OFFICE
CERTIFICATE OF CORRECTION

PATENT NO. : 10,307,313 B2  
APPLICATION NO. : 15/326819  
DATED : June 4, 2019  
INVENTOR(S) : Timothy Paul Schroeder et al.

It is certified that error appears in the above-identified patent and that said Letters Patent is hereby corrected as shown below:

On the Title Page

In Page 2, item (56), References Cited, U.S. Patent Documents, Cite No. 76, delete "3,636,154 A1" and insert --8,636,154 B2--, therefor.

In the Specification

In Column 3, Line 7, delete "depicts" and insert --depict--, therefor.

In Column 3, Line 20, delete "depicts" and insert --depict--, therefor.

In Column 19, Line 67, after "13.", delete "the" and insert --The--, therefor.

Signed and Sealed this  
Twenty-sixth Day of November, 2019

Andrei Iancu  
*Director of the United States Patent and Trademark Office*